United States Patent
Miyamoto et al.

(10) Patent No.: US 10,961,405 B2
(45) Date of Patent: Mar. 30, 2021

(54) FLUORINE-CONTAINING ACETOPHENONE DERIVATIVE, FLUROINE BASED ADDITIVE, CURABLE COMPOSITION INCLUDING SAME, AND CURED PRODUCT THEREOF

(71) Applicant: DIC Corporation, Tokyo (JP)

(72) Inventors: Masanori Miyamoto, Sakura (JP); Yu Asano, Sakura (JP)

(73) Assignee: DIC Corporation, Tokyo (JP)

( * ) Notice: Subject to any disclaimer, the term of this patent is extended or adjusted under 35 U.S.C. 154(b) by 16 days.

(21) Appl. No.: 16/564,349

(22) Filed: Sep. 9, 2019

(65) Prior Publication Data

US 2020/0002554 A1    Jan. 2, 2020

Related U.S. Application Data

(63) Continuation-in-part of application No. PCT/JP2017/017497, filed on May 9, 2017.

(30) Foreign Application Priority Data

Mar. 10, 2017  (JP) .............................. JP2017-046072

(51) Int. Cl.
| | |
|---|---|
| *C08F 2/46* | (2006.01) |
| *C08F 2/50* | (2006.01) |
| *C08G 61/04* | (2006.01) |
| *C09D 7/65* | (2018.01) |
| *C09D 7/45* | (2018.01) |
| *C08G 65/333* | (2006.01) |
| *C09D 175/14* | (2006.01) |

(52) U.S. Cl.
CPC .......... *C09D 7/65* (2018.01); *C08G 65/33396* (2013.01); *C09D 7/45* (2018.01); *C09D 175/14* (2013.01)

(58) Field of Classification Search
CPC ............ C08G 65/33396; C08G 65/333; C08G 18/5015; C08G 18/8116; C08G 18/242; C09D 7/65; C09D 7/63; C09D 7/45; C09D 175/14; C08K 5/07; C08K 5/02
USPC ............... 522/92, 90, 1, 113; 520/1
See application file for complete search history.

(56) References Cited

FOREIGN PATENT DOCUMENTS

| | | |
|---|---|---|
| JP | 2011-089052 A | 5/2011 |
| JP | 2012-092308 A | 5/2012 |
| JP | 2013-032443 A | 2/2013 |

*Primary Examiner* — Jessica Whiteley
(74) *Attorney, Agent, or Firm* — Locke Lord LLP

(57) ABSTRACT

The invention provides a fluorine-containing acetophenone derivative which is useful as an additive that can impart excellent antifouling properties and scratch resistance to the surface of a cured coating and that also offers high transparency of the coating; a fluoroadditive and an active energy ray curable composition which each include the above derivative; a cured product of the composition; and an article having a cured coating of the composition. Specifically, this object is achieved by using a fluorine-containing acetophenone derivative, typically represented by the structural formula below, that is obtained by introducing an acryloyl group into a poly(perfluoroalkylene ether) chain and thereafter introducing, using Michael addition reaction, an α-aminoacetophenone-based structural unit capable of generating radical species by photocleavage (1)

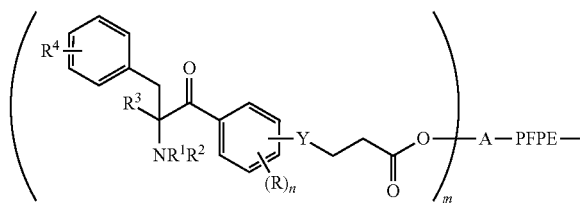

(2)

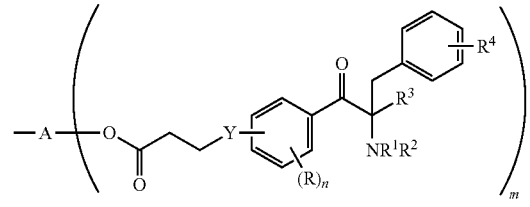

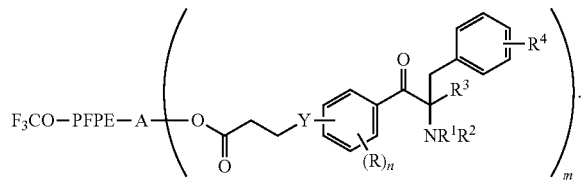

20 Claims, 5 Drawing Sheets

[Fig. 1]
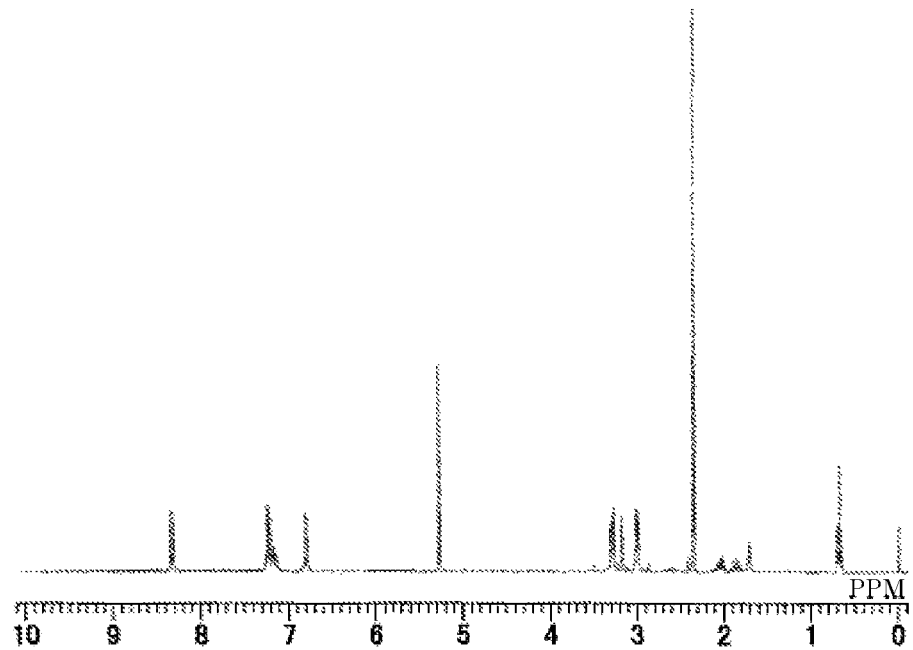
[Fig. 2]
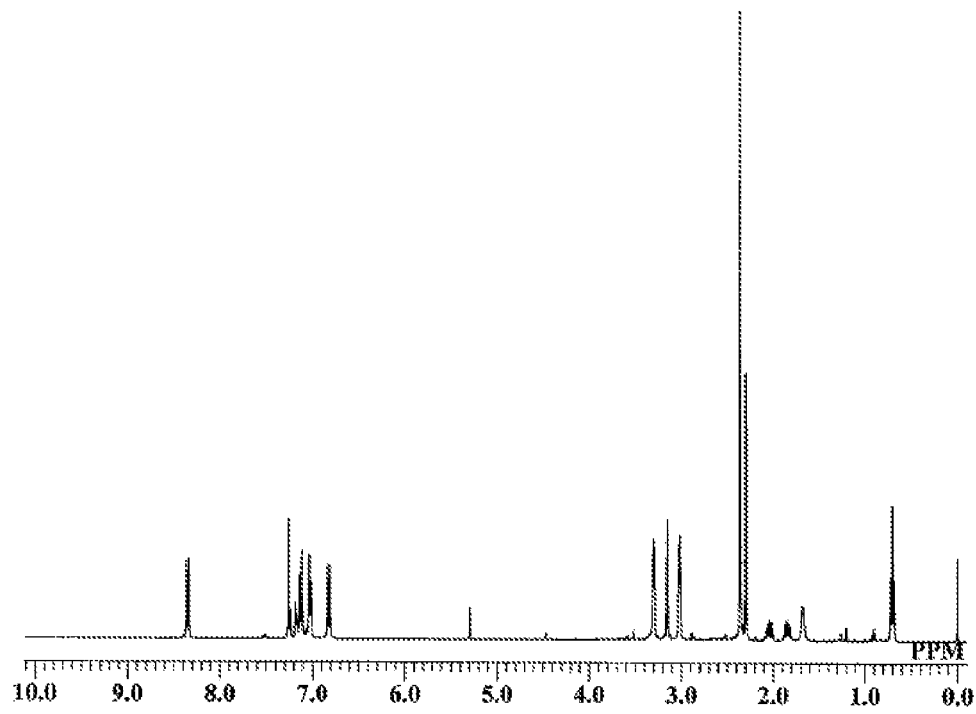

[Fig. 3]
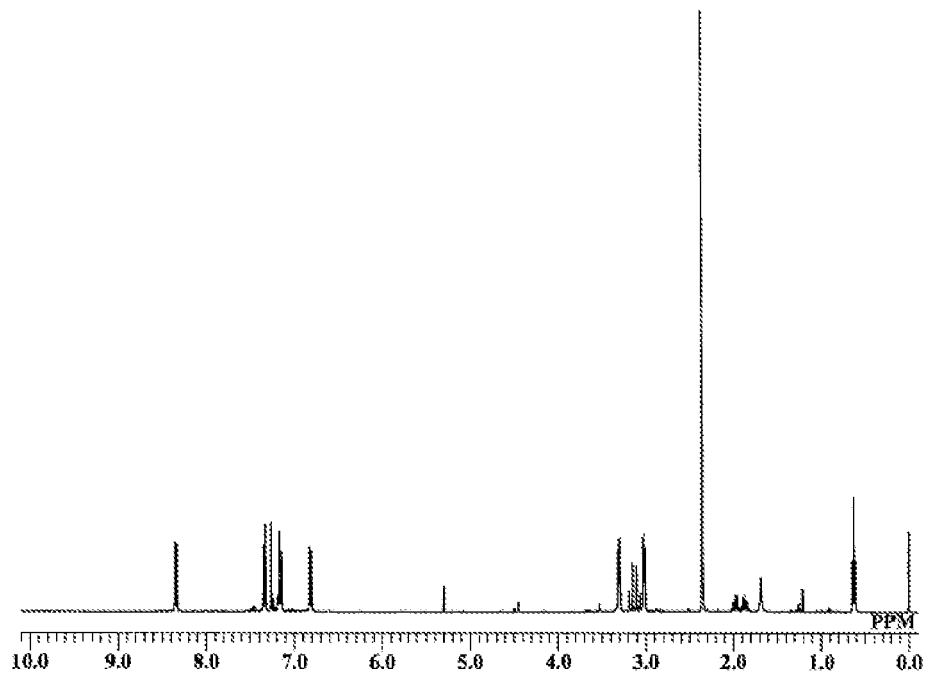
[Fig. 4]
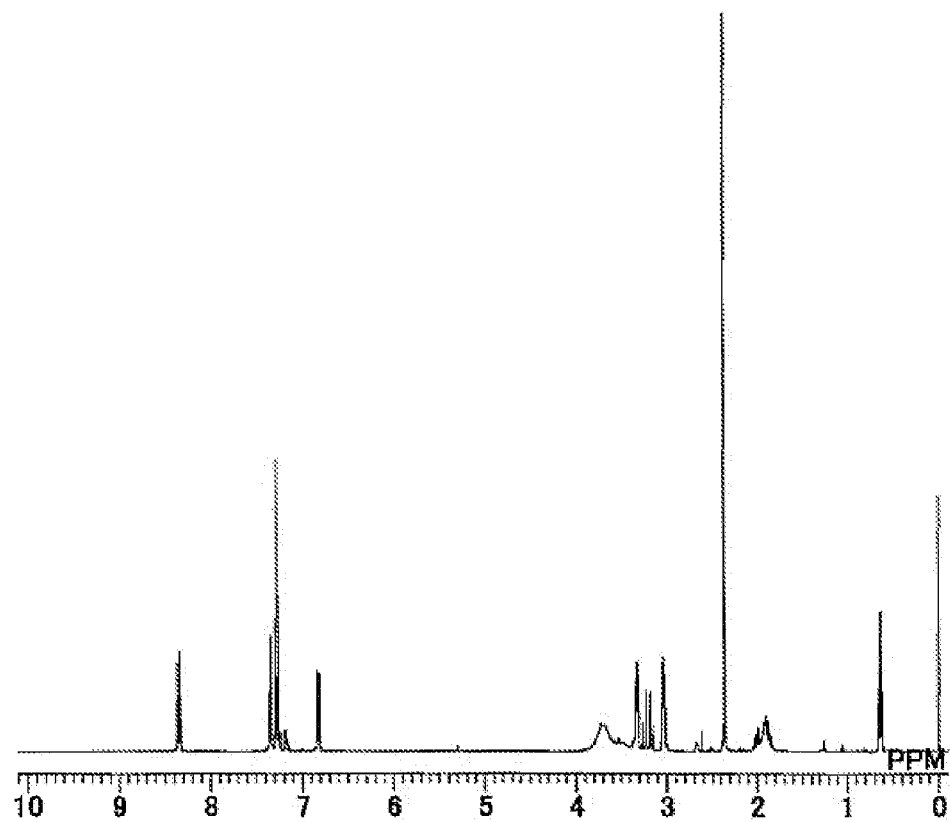

[Fig. 5]
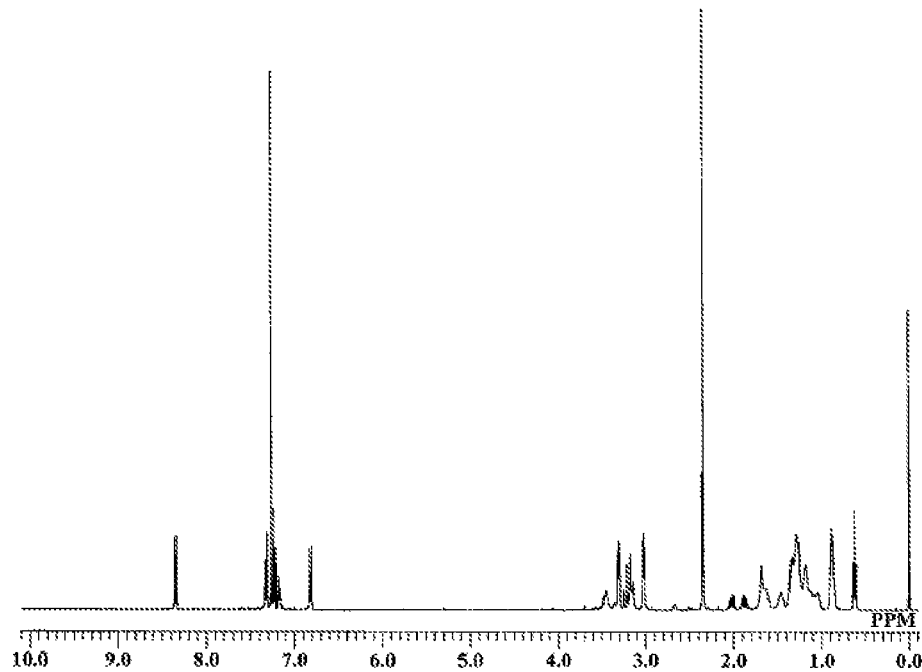
[Fig. 6]
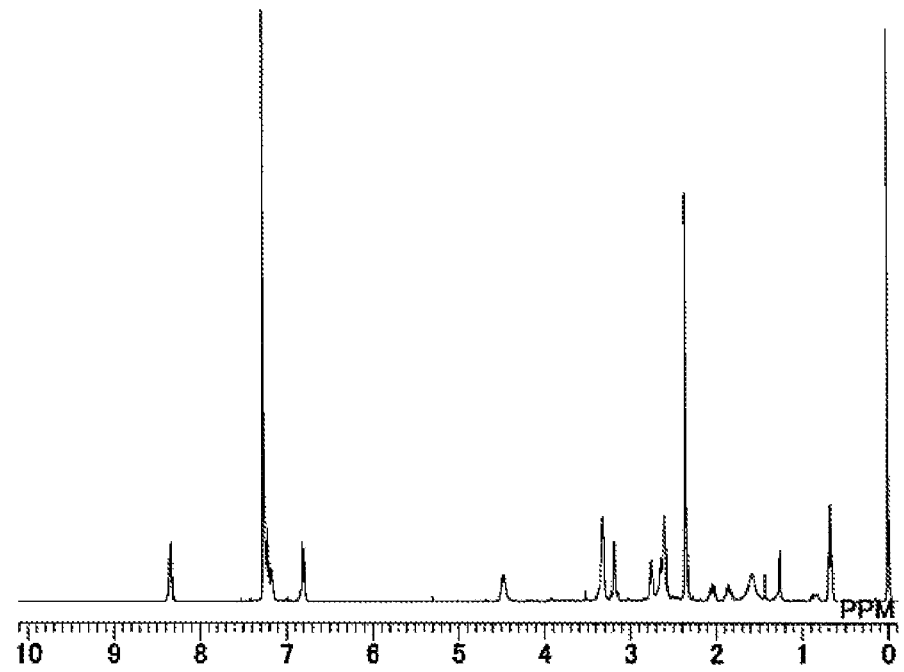

[Fig. 7]
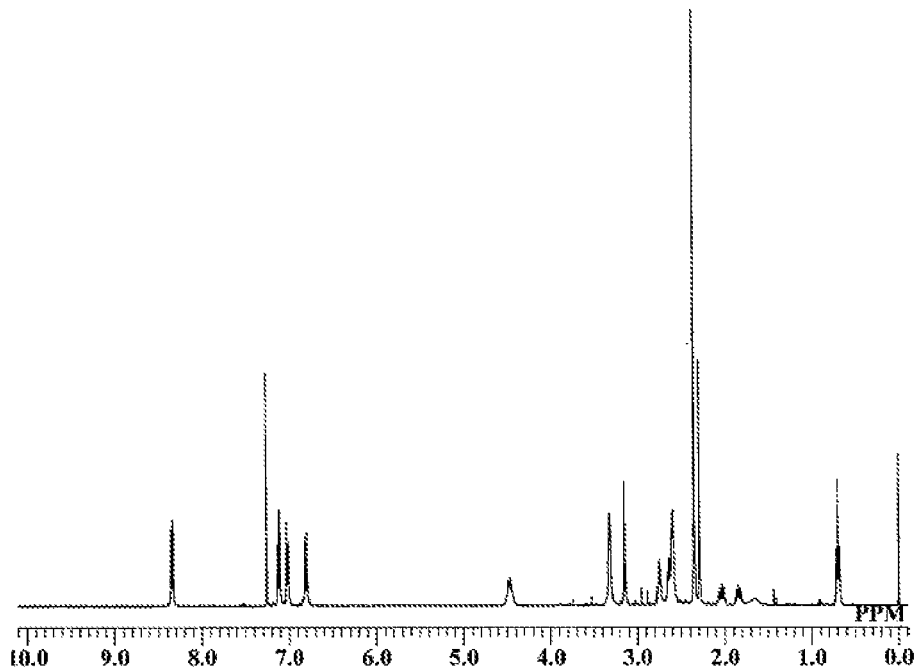
[Fig. 8]
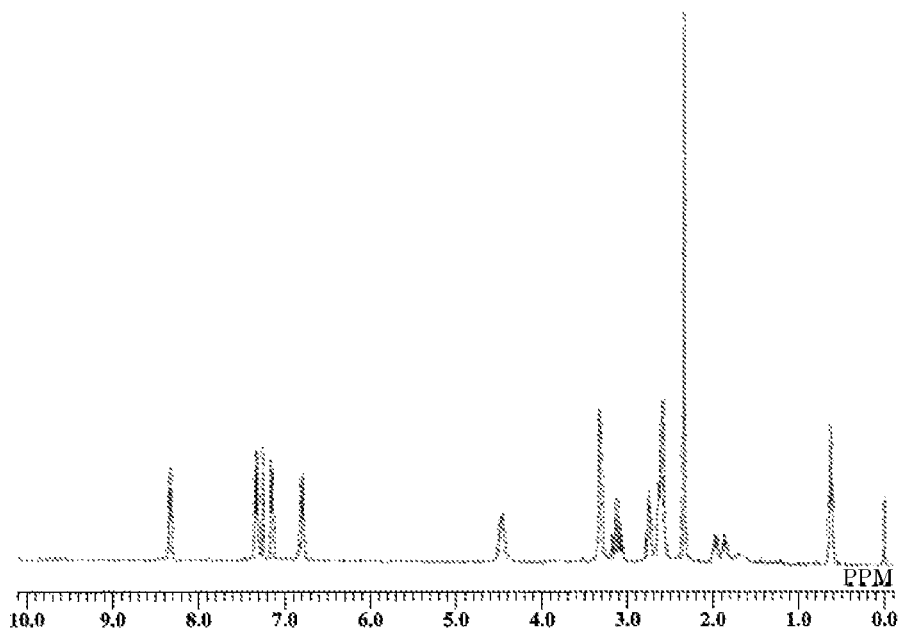

[Fig. 9]
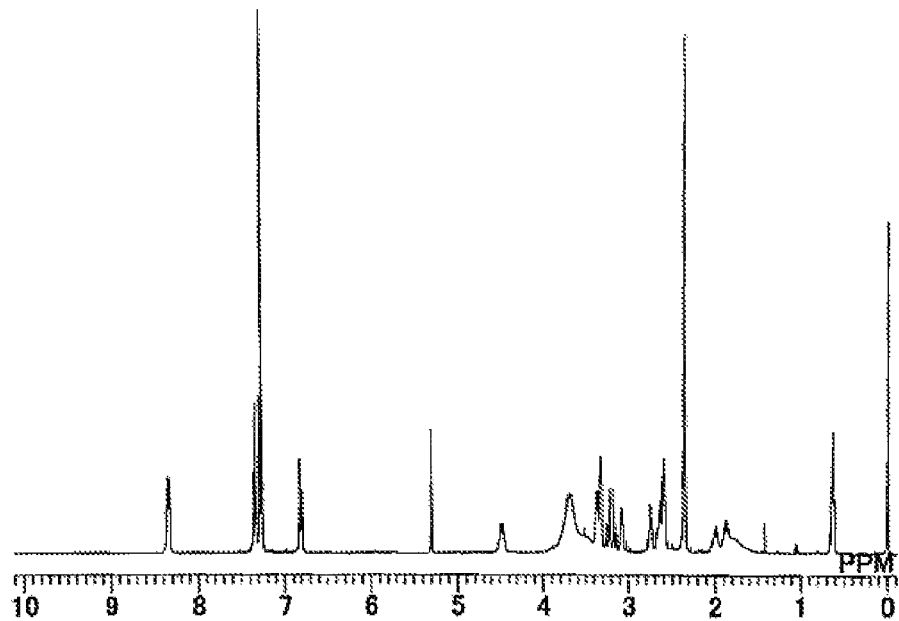
[Fig. 10]
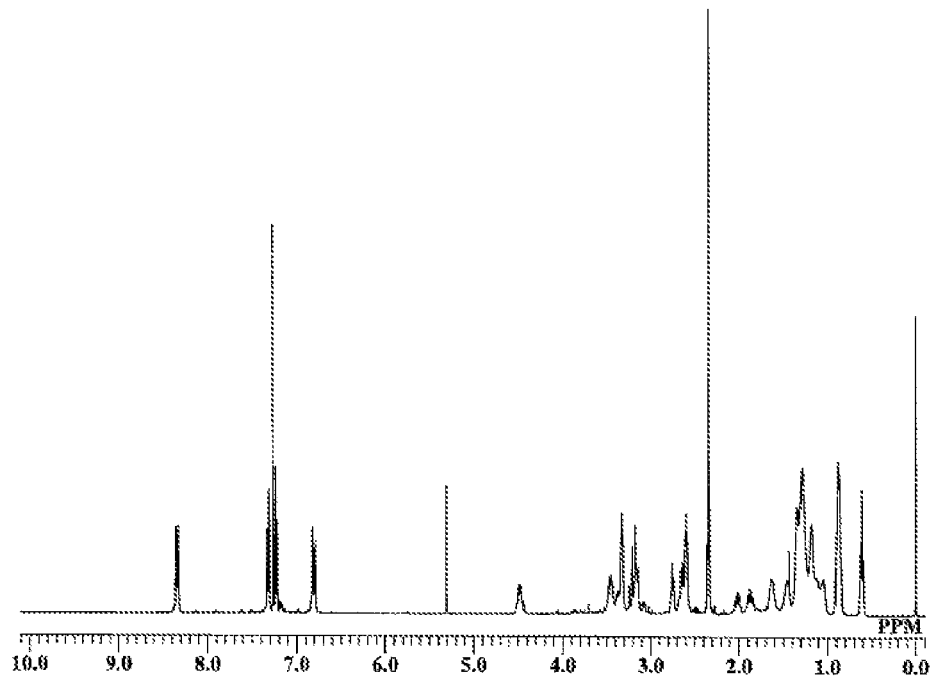

FLUORINE-CONTAINING ACETOPHENONE DERIVATIVE, FLUROINE BASED ADDITIVE, CURABLE COMPOSITION INCLUDING SAME, AND CURED PRODUCT THEREOF

TECHNICAL FIELD

The present invention relates to a fluorine-containing acetophenone derivative which may be added to a curable composition to impart excellent antifouling properties, slip properties and scratch resistance to the surface of a cured product obtained from the composition. The invention also relates to a fluoroadditive and an active energy ray curable composition which each contain the fluorine-containing acetophenone derivative, and to an article having a cured coating of the composition.

BACKGROUND ART

Plastic films produced using polyethylene terephthalate resins (PET), acrylic resins, polycarbonate resins, acetyl cellulose resins and the like have found wide applications in industry such as polarizer protective films included in flat panel displays, and surface protective films for touch panels. These plastic films themselves are prone to scratches on the surface, are low in workability, and are easily broken or cracked. To make up for such poor performance, the surface is usually provided with a coating layer which is formed from, for example, an active energy ray curable resin. A coating obtained by the application of such a material serves as a skin layer, and thus needs scratch resistance. A known approach to enhancing scratch resistance is to coat the surface of a substrate with a crosslinked coating obtained using a hard coating agent including a polyfunctional monomer such as a polyfunctional (meth)acrylate. Methods have been also proposed which further add, to the hard coating agent, a silicone or fluorine leveling agent, inorganic compound particles such as silicon dioxide or aluminum oxide, carbon, or synthetic resin particles such as polyurethane resin, polystyrene resin or acrylic resin.

A specific example of the hard coating agents that is known is an active energy ray curable composition which includes a silicone compound having a radically polymerizable unsaturated group in the molecule (see, for example, Patent Literature 1).

As known in the art, fluorine-containing curable resins which are polymers having a poly(perfluoroalkylene ether) chain, a photopolymerization initiating functional group and a polymerizable unsaturated group are added as surface modifiers to photopolymerizable compositions to impart long-lasting antifouling properties to the surface of coatings that are obtained (see, for example, Patent Literature 2). It is also known that fluorine-containing polymerizable resins which are polymers having a poly(perfluoroalkylene ether) chain and containing an adamantyl group and a polymerizable unsaturated group as structural constituents are added as surface modifiers to active energy ray curable compositions to impart excellent antifouling properties, liquid repellency and scratch resistance to the surface of coatings that are obtained (see, for example, Patent Literature 3).

CITATION LIST

Patent Literature

PTL 1: Japanese Unexamined Patent Application Publication No. 2013-32443

PTL 2: Japanese Unexamined Patent Application Publication No. 2011-89052

PTL 3: Japanese Unexamined Patent Application Publication No. 2012-92308

SUMMARY OF INVENTION

Technical Problem

The silicone-containing surface modifier provided by Patent Literature 1 gives coatings which are unsatisfactory in surface scratch resistance. The fluorine-containing surface modifiers provided by Patent Literatures 2 and 3 are effective to a degree in antifouling properties and scratch resistance. In these surface modifiers, however, a polar group is present in the vicinity of the poly(perfluoroalkylene ether) chain in order to ensure compatibility with a fluorine-free active energy ray curable compound and also due to the molecular design. This fact affects the shape of the poly (perfluoroalkylene ether) chains on the coating surface so as to make it difficult for the perfluoroalkylene ether chains to fully produce their inherent performance such as slip properties. Further, the polymerizable unsaturated group is attached via a structure derived from an additional monomer. Due to this structural problem, fluorine-free moieties represent a high proportion of the compound and consequently the density of fluorine atoms in the uppermost portion of a cured coating is limited. Thus, it is difficult to meet the recent high-level requirements for further enhancements in scratch resistance, antifouling properties or cured coating transparency.

In light of the circumstances discussed above, an object of the present invention is to provide a fluorine-containing acetophenone derivative which may be suitably used as a fluoroadditive that can impart excellent antifouling properties, slip properties and scratch resistance to the surface of a cured coating and that also offers high transparency of the coating. Other objects of the invention are to provide a fluoroadditive and an active energy ray curable composition which each include the above derivative, to provide a cured product of the composition, and to provide an article having a cured coating of the composition.

Solution to Problem

The present inventors carried out extensive studies directed to achieving the above objects. As a result, the present inventors have developed a fluorine-containing acetophenone derivative obtained by introducing an α-aminoacetophenone-based structural unit capable of generating radical species by photocleavage into a poly(perfluoroalkylene ether) chain having a (meth)acryloyl group, the structural unit being introduced using Michael addition reaction. The present inventors have found that the fluorine-containing acetophenone derivative enriches a cured product with fluorine atoms in an uppermost portion thereof while ensuring that good slip properties inherent to the perfluoroalkylene ether chains will be exhibited, and also allows the cured product to attain marked enhancements in antifouling properties and scratch resistance. Further, the compound before cleavage contains a sufficient proportion of fluorine-free moieties enough to attain excellent compatibility with a fluorine-free polymerizable compound, and thus ensures that a cured coating that is obtained is highly transparent. Based on these and other findings, the present inventors have completed the present invention.

Specifically, the present invention provides a fluorine-containing acetophenone derivative represented by the following general formula (1) or (2):

[Chem. 1]

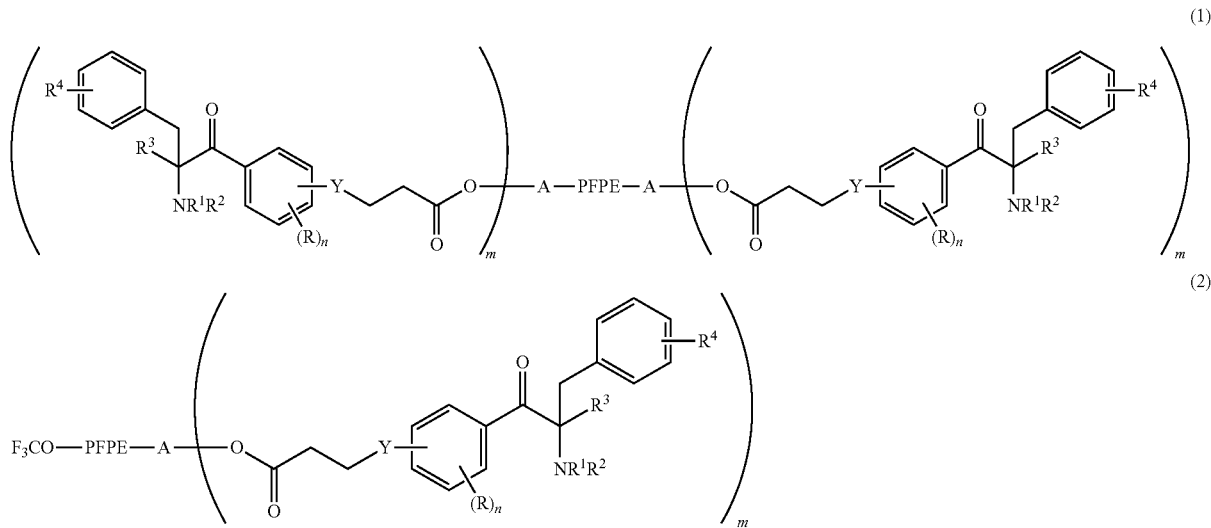

[in the formulae (1) and (2), A is a direct bond, or a divalent or trivalent linking group; m is 1 when A is a direct bond or a divalent linking group, and is 2 when A is a trivalent linking group; Y is represented by the following general formula (3) or (4):

[Chem. 2]

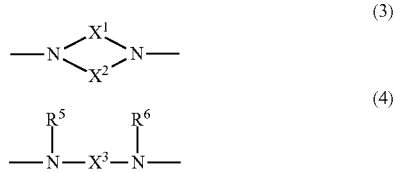

($X^1$ and $X^2$ are each independently an optionally substituted C2-C6 linear or branched, alkylene or oxyalkylene group; the carbon atoms constituting $X^1$ and $X^2$ may be bonded to one another directly or via an optionally substituted C2-C6 linear or branched alkylene group; $X^3$ is an optionally substituted C2-C6 linear or branched, alkylene or oxyalkylene group; and $R^5$ and $R^6$ are each independently an optionally substituted aliphatic group or an optionally substituted aryl group);

R independently at each occurrence is a hydrogen atom, a halogen atom or an optionally substituted aliphatic group; n independently at each occurrence is an integer of 0 to 4; $R^1$ and $R^2$ are each independently an optionally substituted aliphatic group or an optionally substituted aryl group; $R^1$ and $R^2$ may be bonded together to form a ring; $R^3$ is an optionally substituted aliphatic group or an optionally substituted aryl group; $R^4$ is a hydrogen atom, a halogen atom or a monovalent organic group; and PFPE is a poly(perfluoroalkylene ether) chain]. The present invention also provides curable compositions including the above derivative, and cured products thereof.

Advantageous Effects of Invention

When an active energy ray curable composition containing the fluorine-containing acetophenone derivative of the present invention is applied onto a substrate, fluorine atoms act to offer minimized surface free energy and the derivative is segregated near the surface, thus imparting marked antifouling properties, scratch resistance and slip properties to the uppermost portion of the cured product. Further, the derivative contains a sufficient amount of structural units enough to be compatibilized with a fluorine-free compound, and thus does not deteriorate the transparency of the cured coating. Further, the fluorine-containing acetophenone derivative of the present invention is cleaved by an active energy ray to generate radicals, which then bond to other curable components in the curable composition. Consequently, the perfluoroalkylene ether chains in the fluorine-containing acetophenone derivative of the invention are more strongly fixed to the uppermost portion of the cured coating, and deteriorations in properties such as antifouling properties and scratch resistance after long storage can be lessened. Furthermore, there are no polar groups in the vicinity of the perfluoroalkylene ether chains to make it possible to avoid a structural change in the polymer chains which will impair the slip properties inherent to the perfluoroalkylene ether chains. Such coatings are very useful as, for example, hardcoat layers for front protective plates disposed on the outermost surface of liquid crystal displays.

BRIEF DESCRIPTION OF DRAWINGS

FIG. 1 is a $^1$H-NMR chart of Michael donor product (D1) obtained in SYNTHETIC EXAMPLE 1.

FIG. 2 is a $^1$H-NMR chart of Michael donor product (D2) obtained in SYNTHETIC EXAMPLE 2.

FIG. 3 is a $^1$H-NMR chart of Michael donor product (D9) obtained in SYNTHETIC EXAMPLE 3.

FIG. 4 is a $^1$H-NMR chart of Michael donor product (D18) obtained in SYNTHETIC EXAMPLE 6.

FIG. 5 is a $^1$H-NMR chart of Michael donor product (D20) obtained in SYNTHETIC EXAMPLE 7.

FIG. 6 is a $^1$H-NMR chart of Compound (M1) obtained in EXAMPLE 1.

FIG. 7 is a $^1$H-NMR chart of Compound (M2) obtained in EXAMPLE 2.

FIG. 8 is a $^1$H-NMR chart of Compound (M9) obtained in EXAMPLE 3.

FIG. 9 is a $^1$H-NMR chart of Compound (M18) obtained in EXAMPLE 6.

FIG. 10 is a $^1$H-NMR chart of Compound (M20) obtained in EXAMPLE 7.

DESCRIPTION OF EMBODIMENTS

A fluorine-containing acetophenone derivative of the present invention is a compound with a structure represented by the following general formula (1) or (2):

[Chem. 3]

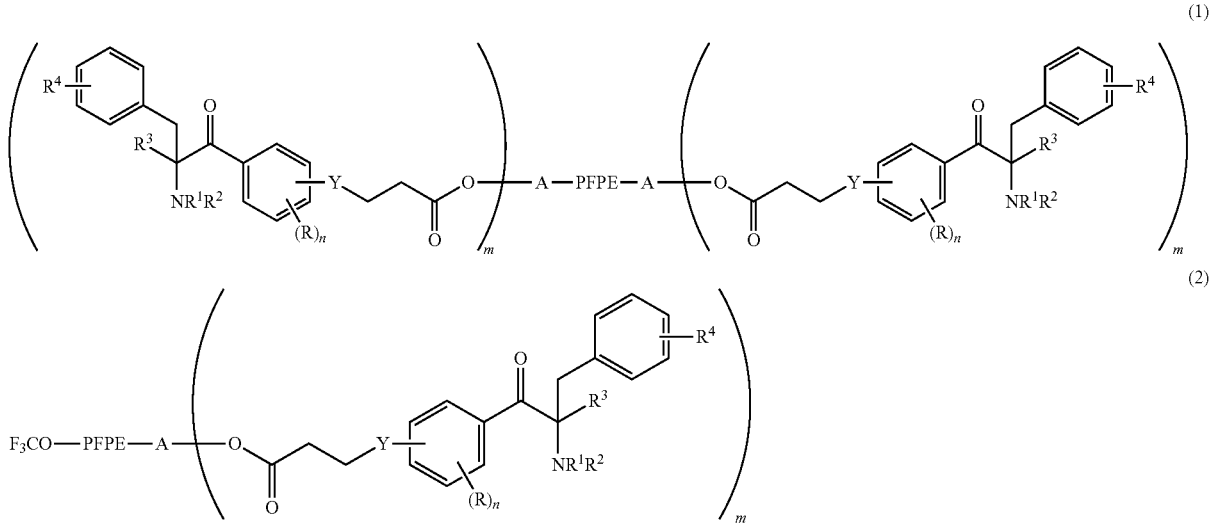

[In the formulae (1) and (2), A is a direct bond, or a divalent or trivalent linking group; m is 1 when A is a direct bond or a divalent linking group, and is 2 when A is a trivalent linking group; Y is represented by the following general formula (3) or (4):

[Chem. 4]

(3)

(4)

($X^1$ and $X^2$ are each independently an optionally substituted C2-C6 linear or branched, alkylene or oxyalkylene group; the carbon atoms constituting $X^1$ and $X^2$ may be bonded to one another directly or via an optionally substituted C2-C6 linear or branched alkylene group; $X^3$ is an optionally substituted C2-C6 linear or branched, alkylene or oxyalkylene group; and $R^5$ and $R^6$ are each independently an optionally substituted aliphatic group or an optionally substituted aryl group);

R independently at each occurrence is a hydrogen atom, a halogen atom or an optionally substituted aliphatic group; n independently at each occurrence is an integer of 0 to 4; $R^1$ and $R^2$ are each independently an optionally substituted aliphatic group or an optionally substituted aryl group; $R^1$ and $R^2$ may be bonded together to form a ring; $R^3$ is an optionally substituted aliphatic group or an optionally substituted aryl group; $R^4$ is a hydrogen atom, a halogen atom or a monovalent organic group; and PFPE is a poly(perfluoroalkylene ether) chain.]

The compound represented by the general formula (1) or (2) is characterized in that the constituent elements include a poly(perfluoroalkylene ether) chain (hereinafter, also written as the PFPE chain), and a moiety which is cleaved by a stimulus such as active energy rays to generate radicals. By virtue of having such a molecular structure, the compound, when added to, for example, an active energy ray curable composition, migrates to the gas-liquid interface during the curing reaction due to the surface segregation function of fluorine atoms. The compound that has migrated to the uppermost portion generates radicals, and the compound resulting from the cleavage (PFPE chain-containing compound) strongly bonds to other curable components to impart marked antifouling properties, scratch resistance and slip properties to the surface of the cured coating. To take more advantage of these effects, the compound of the general formula (1) is more preferable.

The compound represented by the general formula (1) or (2) contains a high proportion of fluorine-free moieties and thus exhibits good solubility (compatibility) in a fluorine-free active energy ray curable compound and an organic solvent. Thus, the composition or solution attains excellent storage stability, and a cured coating obtained therefrom exhibits good transparency. Further, the compound is compatible also with other fluorinated surfactants and may be mixed together with an additional fluorinated surfactant and stored as a fluoroadditive.

The fluorine-containing acetophenone derivative of the invention represented by the general formula (1) or (2) may be synthesized from a PFPE chain-containing acryloyl compound by the Michael addition reaction on the acryloyl group. The constituent element other than the Michael acceptor, i.e., other than the PFPE chain-containing acryloyl compound, may be any compound which can function as a Michael donor and also has an acetophenone analogue structure cleavable by a stimulus such as active energy rays.

In the general formulae (1) and (2), Y is represented by the general formula (3) or the general formula (4). In the general formula (3), $X^1$ and $X^2$ are each independently an optionally substituted C2-C6 linear or branched, alkylene or oxyalkylene group. The carbon atoms constituting $X^1$ and $X^2$ may be bonded to one another directly or via an optionally substituted C2-C6 linear or branched alkylene group.

Examples of the substituents in the above groups include monovalent substituents formed of nonmetallic atoms, except hydrogen atoms. Specific examples include halogen atoms (—F, —Br, —Cl, —I), hydroxyl groups, alkoxy groups, aryloxy groups, mercapto groups, alkylthio groups, arylthio groups, alkyldithio groups, aryldithio groups, amino groups, N-alkylamino groups, N,N-dialkylamino groups, N-arylamino groups, N,N-diarylamino groups, N-alkyl-N-arylamino groups, acyloxy groups, carbamoyloxy groups, N-alkylcarbamoyloxy groups, N-arylcarbamoyloxy groups, N,N-dialkylcarbamoyloxy groups, N,N-diarylcarbamoyloxy groups, N-alkyl-N-arylcarbamoyloxy groups, alkylsulfoxy groups, arylsulfoxy groups, acylthio groups, acylamino groups, N-alkylacylamino groups, N-arylacylamino groups, ureido groups, N'-alkylureido groups, N',N'-dialkylureido groups, N'-arylureido groups, N',N'-diarylureido groups, N'-alkyl-N'-arylureido groups, N-alkylureido groups, N-arylureido groups, N'-alkyl-N-alkylureido groups, N'-alkyl-N-arylureido groups, N',N'-dialkyl-N-alkylureido groups, N',N'-dialkyl-N-arylureido groups, N'-aryl-N-alkylureido groups, N'-aryl-N-arylureido groups, N',N'-diaryl-N-alkylureido groups, N',N'-diaryl-N-arylureido groups, N'-alkyl-N'-aryl-N-alkylureido groups, N'-alkyl-N'-aryl-N-arylureido groups, alkoxycarbonylamino groups, aryloxycarbonylamino groups, N-alkyl-N-alkoxycarbonylamino groups, N-alkyl-N-aryloxycarbonylamino groups, N-aryl-N-alkoxycarbonylamino groups, N-aryl-N-aryloxycarbonylamino groups, formyl groups, acyl groups, carboxyl groups, alkoxycarbonyl groups, aryloxycarbonyl groups, carbamoyl groups, N-alkylcarbamoyl groups, N,N-dialkylcarbamoyl groups, N-arylcarbamoyl groups, N,N-diarylcarbamoyl groups, N-alkyl-N-arylcarbamoyl groups, alkylsulfinyl groups, arylsulfinyl groups, alkylsulfonyl groups, arylsulfonyl groups, sulfo groups (—$SO_3H$) and conjugated base groups thereof (referred to as sulfonato groups), alkoxysulfonyl groups, aryloxysulfonyl groups, sulfinamoyl groups, N-alkylsulfinamoyl groups, N,N-dialkylsulfinamoyl groups, N-arylsulfinamoyl groups, N,N-diarylsulfinamoyl groups, N-alkyl-N-arylsulfinamoyl groups, sulfamoyl groups, N-alkylsulfamoyl groups, N,N-dialkylsulfamoyl groups, N-arylsulfamoyl groups, N,N-diarylsulfamoyl groups, N-alkyl-N-arylsulfamoyl groups, phosphono groups (—$PO_3H_2$) and conjugated base groups thereof (referred to as phosphonato groups), dialkylphosphono groups (—$PO_3$(alkyl)$_2$) (alkyl=alkyl group, the same applies hereinafter), diarylphosphono groups (—$PO_3$(aryl)$_2$) (aryl=aryl group, the same applies hereinafter), alkylarylphosphono groups (—$PO_3$(alkyl) (aryl)), monoalkylphosphono groups (—$PO_3$H(alkyl)) and conjugated base groups thereof (referred to as alkylphosphonato groups), monoarylphosphono groups (—$PO_3$H(aryl)) and conjugated base groups thereof (referred to as arylphosphonato groups), phosphonoxy groups (—$OPO_3H_2$) and conjugated base groups thereof (referred to as phosphonatoxy groups), dialkylphosphonoxy groups (—$OPO_3$(alkyl)$_2$), diarylphosphonoxy groups (—$OPO_3$(aryl)$_2$), alkylarylphosphonoxy groups (—$OPO_3$(alkyl) (aryl)), monoalkylphosphonoxy groups (—$OPO_3$H(alkyl)) and conjugated base groups thereof (referred to as alkylphosphonatoxy groups), monoarylphosphonoxy groups (—$OPO_3$H(aryl)) and conjugated base groups thereof (referred to as arylphosphonatoxy groups), cyano groups, nitro groups, aryl groups, alkenyl groups, alkynyl groups, heterocyclic groups and silyl groups.

Specific examples of the alkyl groups in these substituents include linear, branched or cyclic, C1-C18 alkyl groups, for example, linear or branched alkyl groups such as methyl group, ethyl group, propyl group, n-butyl group, t-butyl group, s-butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, isopropyl group, sec-butyl group, isobutyl group, tert-butyl group, 2-ethylbutyl group, isopentyl group, 1-methylpentyl group, 1,3-dimethylbutyl group, 1-methylhexyl group, isoheptyl group, 1,1,3,3-tetramethylbutyl group, 2,2,4,4-tetramethylbutyl group, 1-methylheptyl group, 3-methylheptyl group, 2-ethylhexyl group, 1,1,3-trimethylhexyl group, 1,1,3,3-tetramethylpentyl group, isodecyl group, 1-methylundecyl group or 1,1,3,3,5,5-hexamethylhexyl group, dodecyl group, tetradecyl group and octadecyl group, and cycloalkyl groups such as cycloheptyl group, cyclohexyl group and cyclopentyl group.

Specific examples of the aryl groups in the substituents include phenyl group, biphenyl group, naphthyl group, tolyl group, xylyl group, mesityl group, cumenyl group, chlorophenyl group, bromophenyl group, chloromethylphenyl group, hydroxyphenyl group, methoxyphenyl group, ethoxyphenyl group, phenoxyphenyl group, acetoxyphenyl group, benzoyloxyphenyl group, methylthiophenyl group, phenylthiophenyl group, methylaminophenyl group, dimethylaminophenyl group, acetylaminophenyl group, carboxyphenyl group, methoxycarbonylphenyl group, ethoxyphenylcarbonyl group, phenoxycarbonylphenyl group, N-phenylcarbamoylphenyl group, cyanophenyl group, sulfophenyl group, sulfonatophenyl group, phosphonophenyl group and phosphonatophenyl group.

Examples of the alkenyl groups include vinyl group, 1-propenyl group, 1-butenyl group, cinnamyl group and 2-chloro-1-ethenyl group. Examples of the alkynyl groups include ethynyl group, 1-propynyl group, 1-butynyl group and trimethylsilylethynyl group.

Specific examples of the C2-C6 linear or branched, alkylene or oxyalkylene groups include linear or branched methylene group, propylene group, butylene group, oxymethylene group, oxypropylene group and oxybutylene group.

Specific examples of the general formula (3) include the following structures.

[Chem. 5]

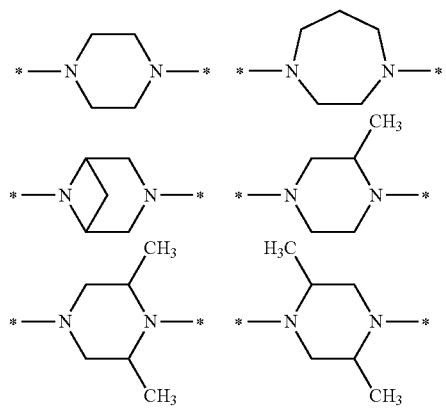

In the general formula (4), $R^5$ and $R^6$ are each independently an optionally substituted aliphatic group or an optionally substituted aryl group. Examples of the optionally substituted aliphatic groups include alkyl groups, alkenyl groups and alkynyl groups which are optionally substituted. Examples of the substituents include those mentioned above. Examples of the alkyl groups, the alkenyl groups and the alkynyl groups include those mentioned above.

Examples of the aryl groups in the optionally substituted aryl groups include condensed rings composed of 1 to 3 benzene rings, and condensed rings composed of a benzene ring and a five-membered unsaturated ring. Specific examples include phenyl group, methoxyphenyl group, ethoxyphenyl group, fluorophenyl group, chlorophenyl group, bromophenyl group, tolyl group, xylyl group, naphthyl group, benzyl group, α-methylbenzyl group, α,α-dimethylbenzyl group, phenethyl group, naphthyl group, anthryl group, phenanthryl group, indenyl group, acenaphthenyl group and fluorenyl group. Of these, phenyl group and naphthyl group are more preferable.

The substituent in the substituted aryl group is present on a carbon atom constituting the ring in the aryl group. Examples of the substituents include the monovalent substituents mentioned above which are formed of nonmetallic atoms, except hydrogen atoms.

Specifically, preferred examples of the substituted aryl groups include biphenyl group, tolyl group, xylyl group, mesityl group, cumenyl group, chlorophenyl group, bromophenyl group, fluorophenyl group, chloromethylphenyl group, trifluoromethylphenyl group, hydroxyphenyl group, methoxyphenyl group, methoxyethoxyphenyl group, allyloxyphenyl group, phenoxyphenyl group, methylthiophenyl group, tolylthiophenyl group, ethylaminophenyl group, diethylaminophenyl group, morpholinophenyl group, acetyloxyphenyl group, benzoyloxyphenyl group, N-cyclohexylcarbamoyloxyphenyl group, N-phenylcarbamoyloxyphenyl group, acetylaminophenyl group, N-methylbenzoylaminophenyl group, carboxyphenyl group, methoxycarbonylphenyl group, allyloxycarbonylphenyl group, chlorophenoxycarbonylphenyl group, carbamoylphenyl group, N-methylcarbamoylphenyl group, N,N-dipropylcarbamoylphenyl group, N-(methoxyphenyl)carbamoylphenyl group, N-methyl-N-(sulfophenyl) carbamoylphenyl group, sulfophenyl group, sulfonatophenyl group, sulfamoylphenyl group, N-ethylsulfamoylphenyl group, N,N-dipropylsulfamoylphenyl group, N-tolylsulfamoylphenyl group, N-methyl-N-(phosphonophenyl) sulfamoylphenyl group, phosphonophenyl group, phosphonatophenyl group, diethylphosphonylphenyl group, diphenylphosphonophenyl group, methylphosphonophenyl group, methylphosphonatophenyl group, tolylphosphonophenyl group, tolylphosphonatophenyl group, allylphenyl group, 1-propenylmethylphenyl group, 2-butenylphenyl group, 2-methylallylphenyl group, 2-methylpropenylphenyl group, 2-propynylphenyl group, 2-butynylphenyl group and 3-butynylphenyl group.

In the general formulae (1) and (2), $R^1$ and $R^2$ are each independently an optionally substituted aliphatic group or an optionally substituted aryl group, and $R^1$ and $R^2$ may be bonded together to form a ring. Examples of the "optionally substituted aliphatic groups or optionally substituted aryl groups" represented by $R^1$ and $R^2$ include those mentioned hereinabove, with C1-C12 linear alkyl groups being preferable, and C1-C6 linear alkyl groups being more preferable.

In the general formulae (1) and (2), $R^3$ is an optionally substituted aliphatic group or an optionally substituted aryl group. Examples of these groups include those mentioned hereinabove, with C1-C12 linear alkyl groups being preferable, and C1-C6 linear alkyl groups being more preferable.

In the general formulae (1) and (2), $R^4$ is a hydrogen atom, a halogen atom or a monovalent organic group. The monovalent organic group is preferably a C1-C6 alkyl group, a C1-C6 alkyloxy group, an aryl group, an aryloxy group, or an organic group represented by —$X^4$—$X^5$—$X^6$ [wherein $X^4$ is a single bond or an optionally substituted C1-C6 alkylene chain, $X^5$ is a carbonyl group, a thiocarbonyl group, —OCONH—, —NHCOO— or —NHCONH—, and $X^6$ is —$NR^7R^8$ (wherein $R^7$ and $R^8$ are each independently an optionally substituted aliphatic group or an optionally substituted aryl group) or the following general formula (5):

[Chem. 6]

(5)

(wherein $X^7$ and $X^8$ are each independently an optionally substituted C2-C6 linear or branched, alkylene or oxyalkylene group; the carbon atoms constituting $X^7$ and $X^8$ may be bonded to one another directly or via an optionally substituted C2-C6 linear or branched alkylene group; and $X^9$ is a single bond, an oxygen atom or —$NR^9$— <wherein $R^9$ is an optionally substituted C2-C6 linear or branched alkyl group>)].

Examples of the substituents in the optionally substituted C1-C6 alkylene chains represented by $X^4$ include those mentioned hereinabove. The optionally substituted aliphatic groups or the optionally substituted aryl groups represented by $R^7$ and $R^8$ are the same as described hereinabove. $X^7$ and $X^8$ in the general formula (5) are similar to $X^8$ and $X^2$ in the aforementioned general formula. Examples of the substituents in $R^9$ include those mentioned hereinabove.

In the general formulae (1) and (2), R denotes a hydrogen atom or a substituent on a carbon atom in the benzene ring. Examples of the substituents include those mentioned hereinabove. The four substituents on the benzene ring may be the same as or different from one another.

In particular, the fluorine-containing acetophenone derivatives of the invention represented by the general formulae (1) and (2) are preferably such that in the general formulae (1) and (2), Y is represented by the following formula (6):

(6)

R is a hydrogen atom, $R^1$ and $R^2$ are methyl groups, $R^3$ is a C1-C4 alkyl group, $R^4$ is a hydrogen atom, a methyl group, an ethyl group, a chloro group, a brome group or any of the following formulae (7) to (9):

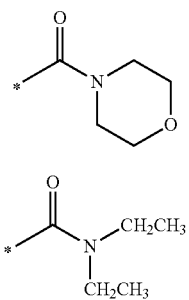

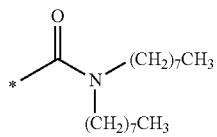

Such fluorine-containing acetophenone derivatives are advantageous in terms of the availability of raw materials used in the production process described later, the ease of production, and excellent performance of cured coatings obtained using the compounds. The compounds having the following combinations are more preferable.

TABLE 1

| Ex. Compd. | Genl. Fmla | *—A—* | *—Y—* | (R)n ring | *—X⁴—* | *—X⁵—* | *—X⁶—* |
|---|---|---|---|---|---|---|---|
| M1 | (1) | *—CH₂—* | piperazine | phenyl-C(O)-C(CH₃)(CH₂-)N(CH₃)₂ | *—H | — | — |
| M2 | (1) | *—CH₂—* | piperazine | phenyl-C(O)-C(CH₃)(CH₂-)N(CH₃)₂ | *—CH₃ | — | — |
| M3 | (1) | *—CH₂—* | piperazine | phenyl-C(O)-C(CH₃)(CH₂-)N(CH₃)₂ | *—(CH₂)₃CH₃ | — | — |
| M4 | (1) | *—CH₂—* | piperazine | phenyl-C(O)-C(CH₃)(CH₂-)N(CH₃)₂ | *—CH(CH₃)CH₃ | — | — |
| M5 | (1) | *—CH₂—* | piperazine | phenyl-C(O)-C(CH₃)(CH₂-)N(CH₃)₂ | *—C(CH₃)₃ | — | — |

TABLE 1-continued

Structure header: *—C₆H₄(R)ₙ—C(=O)—C(R³)(NR¹R²)—*

| Ex. Compd. | Genl. Fmla | *—A—* | *—Y—* | (R)ₙ structure | *—X⁴—* | *—X⁵—* | *—X⁶ |
|---|---|---|---|---|---|---|---|
| M6 | (1) | *—CH₂—* | *—N(piperazine)N—* | phenyl with H's, C(=O), CH₂CH₃, C(CH₃)(N(CH₃)₂) | *—phenyl | — | — |
| M7 | (1) | *—CH₂—* | *—N(piperazine)N—* | phenyl with H's, C(=O), CH₂CH₃, C(CH₃)(N(CH₃)₂) | *—F | — | — |
| M8 | (1) | *—CH₂—* | *—N(piperazine)N—* | phenyl with H's, C(=O), CH₂CH₃, C(CH₃)(N(CH₃)₂) | *—Cl | — | — |
| M9 | (1) | *—CH₂—* | *—N(piperazine)N—* | phenyl with H's, C(=O), CH₂CH₃, C(CH₃)(N(CH₃)₂) | *—Br | — | — |
| M10 | (1) | *—CH₂—* | *—N(piperazine)N—* | phenyl with H's, C(=O), CH₂CH₃, C(CH₃)(N(CH₃)₂) | *—I | — | — |

TABLE 2

Structure header: *—C₆H₄(R)ₙ—C(=O)—C(R³)(NR¹R²)—*

| Ex. Compd. | Genl. Fmla | *—A—* | *—Y—* | (R)ₙ structure | *—X⁴—* | *—X⁵—* | *—X⁶ |
|---|---|---|---|---|---|---|---|
| M11 | (1) | *—CH₂—* | *—N(piperazine)N—* | phenyl with H's, C(=O), CH₂CH₃, C(CH₃)(N(CH₃)₂) | *—CF₃ | — | — |
| M12 | (1) | *—CH₂—* | *—N(piperazine)N—* | phenyl with H's, C(=O), CH₂CH₃, C(CH₃)(N(CH₃)₂) | *—OMe | — | — |

TABLE 2-continued

| Ex. Compd. | Genl. Fmla | *—A—* | *—Y—* | (structure with (R)n) | *—X⁴—* | *—X⁵—* | *—X⁶ |
|---|---|---|---|---|---|---|---|
| M13 | (1) | *—CH₂—* | piperazine | benzoyl-C(CH₃)(CH₂)N(CH₃)₂ | *—OCF₃ | — | — |
| M14 | (1) | *—CH₂—* | piperazine | benzoyl-C(CH₃)(CH₂)N(CH₃)₂ | *—O-phenyl | — | — |
| M15 | (1) | *—CH₂—* | 2,5-dimethylpiperazine | benzoyl-C(CH₃)(CH₂)N(CH₃)₂ | *—H | — | — |
| M16 | (1) | *—CH₂—* | *—N(CH₃)CH₂CH₂N(CH₃)—* | benzoyl-C(CH₃)(CH₂)N(CH₃)₂ | *—H | — | — |
| M17 | (1) | *—CH₂—* | piperazine | benzoyl-C(CH₃)(CH₂)N(CH₃)₂ | *—H | — | — |
| M18 | (1) | *—CH₂—* | piperazine | benzoyl-C(CH₃)(CH₂)N(CH₃)₂ | Single bond | *—C(=O)—* | *—N-morpholine |
| M19 | (1) | *—CH₂—* | piperazine | benzoyl-C(CH₃)(CH₂)N(CH₃)₂ | Single bond | *—C(=O)—* | *—N(Et)₂ |
| M20 | (1) | *—CH₂—* | piperazine | benzoyl-C(CH₃)(CH₂)N(CH₃)₂ | Single bond | *—C(=O)—* | *—N((CH₂)₇CH₃)₂ |

TABLE 3

| Ex. Compd. | Genl. Fmla | *—A—* | *—Y—* | (with R group benzene structure) | *—X⁴—* | *—X⁵—* | *—X⁶ |
|---|---|---|---|---|---|---|---|
| M21 | (1) | *—CH₂—* | *—N(piperazine)N—* | benzoyl-C(CH₃)(CH₂-)N(CH₃)₂ | Single bond | *—C(=O)—* | *—N((CH₂)₁₁—CH₃)((CH₂)₁₁—CH₃) |
| M22 | (1) | *—CH₂—* | *—N(piperazine)N—* | benzoyl-C(CH₃)(CH₂-)N(CH₃)₂ | *—CH₂—* | *—C(=O)—* | *—N(morpholine)O |
| M23 | (1) | *—CH₂—* | *—N(piperazine)N—* | benzoyl-C(CH₃)(CH₂-)N(CH₃)₂ | *—CH(CH₃)—* | *—C(=O)—* | *—N(morpholine)O |
| M24 | (1) | *—CH₂—* | *—N(piperazine)N—* | benzoyl-C(CH₃)(CH₂-)N(CH₃)₂ | *—CH(CH₃)—* | *—C(=O)—* | *—N((CH₂)₇—CH₃)((CH₂)₇—CH₃) |
| M25 | (1) | *—CH₂—* | *—N(piperazine)N—* | benzoyl-C(CH₃)(CH₂-)N(CH₃)₂ | *—C(CH₃)(CH₃)—* | *—C(=O)—* | *—N(Et)(Et) |
| M26 | (1) | *—CH₂—* | *—N(piperazine)N—* | benzoyl-C(CH₃)(CH₂-)N(CH₃)₂ | *—CH₂—CH₂—* | *—C(=O)—* | *—N(morpholine)O |
| M27 | (1) | *—CH₂—* | *—N(piperazine)N—* | benzoyl-C(CH₃)(CH₂-)N(CH₃)₂ | Single bond | *—C(=O)—* | *—OCH₂CH₃ |
| M28 | (1) | *—CH₂—* | *—N(piperazine)N—* | benzoyl-C(CH₃)(CH₂-)N(CH₃)₂ | Single bond | *—C(=O)—* | *—OCH(CH₃)CH₃ |
| M29 | (1) | *—CH₂—* | *—N(piperazine)N—* | benzoyl-C(CH₃)(CH₂-)N(CH₃)₂ | Single bond | *—C(=O)—* | *—O—C(CH₃)(CH₃)CH₃ |
| M30 | (1) | *—CH₂—* | *—N(piperazine)N—* | benzoyl-C(CH₃)(CH₂-)N(CH₃)₂ | Single bond | *—C(=O)—* | *—O—(CH₂)₇CH₃ |

TABLE 4

| Ex. Compd. | Genl. Fmla | *—A—* | *—Y—* | ![Ar group with (R)n and C(O)C(R3)(NR1R2)] | *—X4—* | *—X5—* | *—X6 |
|---|---|---|---|---|---|---|---|
| M31 | (1) | *—CH2—* | *—N(piperazine)N—* | H,H-phenyl-C(O)-C(CH3)(CH2*)-N(CH3)2 | Single bond | *—C(O)—* | *—O-cyclohexyl |
| M32 | (1) | *—CH2—* | *—N(piperazine)N—* | H,H-phenyl-C(O)-C(CH3)(CH2*)-N(CH3)2 | Single bond | *—C(O)—* | *—O—(CH2CH2O)2CH3 |
| M33 | (1) | *—CH2—* | *—N(piperazine)N—* | H,H-phenyl-C(O)-C(CH3)(CH2*)-N(CH3)2 | Single bond | *—C(O)—* | *-phenyl |
| M34 | (1) | *—CH2—* | *—N(piperazine)N—* | H,H-phenyl-C(O)-C(CH3)(CH2*)-N(CH3)2 | Single bond | *—C(O)—* | *-C6H4-N(CH3)2 |
| M35 | (1) | *—CH2—* | *—N(piperazine)N—* | H,H-phenyl-C(O)-C(CH3)(CH2*)-N(CH3)2 | Single bond | *—C(O)—* | *—SCH3 |
| M36 | (1) | *—CH2—* | *—N(piperazine)N—* | H,H-phenyl-C(O)-C(CH3)(CH2*)-N(CH3)2 | Single bond | *—S(O)2—* | *—OCH3 |
| M37 | (1) | *—CH2—O—C(O)—N(H)—C(CH3)(CH2-*)(CH2-*) | *—N(piperazine)N—* | H,H-phenyl-C(O)-C(CH3)(CH2*)-N(CH3)2 | *—H | | |
| M38 | (1) | *—CH2—O—C(O)—N(H)—C(CH3)(CH2-*)(CH2-*) | *—N(piperazine)N—* | H,H-phenyl-C(O)-C(CH3)(CH2*)-N(CH3)2 | *—CH3 | | |
| M39 | (1) | *—CH2—O—C(O)—N(H)—C(CH3)(CH2-*)(CH2-*) | *—N(piperazine)N—* | H,H-phenyl-C(O)-C(CH3)(CH2*)-N(CH3)2 | *-phenyl | — | — |
| M40 | (1) | *—CH2—O—C(O)—N(H)—C(CH3)(CH2-*)(CH2-*) | *—N(piperazine)N—* | H,H-phenyl-C(O)-C(CH3)(CH2*)-N(CH3)2 | *—F | — | — |

TABLE 5

| Ex. Compd | Genl. Fmla. | *—A—* | *—Y—* | (R)n structure | *—X⁴—* | *—X⁵—* | *—X⁶ |
|---|---|---|---|---|---|---|---|
| M41 | (1) | *—CH₂—O—C(=O)—N(H)—C(CH₃)(CH₂—*)(CH₂—*) | *—N(piperazine)N—* | dimethylamino isopropyl benzoyl | *—Cl | — | — |
| M42 | (1) | *—CH₂—O—C(=O)—N(H)—C(CH₃)(CH₂—*)(CH₂—*) | *—N(piperazine)N—* | dimethylamino isopropyl benzoyl | *—Br | — | — |
| M43 | (1) | *—CH₂—O—C(=O)—N(H)—C(CH₃)(CH₂—*)(CH₂—*) | *—N(piperazine)N—* | dimethylamino isopropyl benzoyl | *—CF₃ | — | — |
| M44 | (1) | *—CH₂—O—C(=O)—N(H)—C(CH₃)(CH₂—*)(CH₂—*) | *—N(piperazine)N—* | dimethylamino isopropyl benzoyl | *—OMe | — | — |
| M45 | (1) | *—CH₂—O—C(=O)—N(H)—C(CH₃)(CH₂—*)(CH₂—*) | *—N(piperazine)N—* | dimethylamino isopropyl benzoyl | *—OCF₃ | — | — |
| M46 | (1) | *—CH₂—O—C(=O)—N(H)—C(CH₃)(CH₂—*)(CH₂—*) | *—N(piperazine)N—* | dimethylamino isopropyl benzoyl | *—O—phenyl | — | — |
| M47 | (1) | *—CH₂—O—C(=O)—N(H)—C(CH₃)(CH₂—*)(CH₂—*) | *—N(piperazine)N—* | dimethylamino isopropyl benzoyl | Single bond | *—C(=O)—* | *—N(morpholine) |
| M48 | (1) | *—CH₂—O—C(=O)—N(H)—C(CH₃)(CH₂—*)(CH₂—*) | *—N(piperazine)N—* | dimethylamino isopropyl benzoyl | Single bond | *—C(=O)—* | *—N(C₂H₅)₂ |
| M49 | (1) | *—CH₂—O—C(=O)—N(H)—C(CH₃)(CH₂—*)(CH₂—*) | *—N(piperazine)N—* | dimethylamino isopropyl benzoyl | Single bond | *—C(=O)—* | *—N((CH₂)₇—CH₃)₂ |

TABLE 5-continued

Structure header: *—C₆H₄(R)ₙ—C(=O)—C(R³)(NR¹R²)—*

| Ex. Compd | Genl. Fmla. | *—A—* | *—Y—* | (aryl ketone amine group shown in header) | *—X⁴—* | *—X⁵—* | *—X⁶ |
|---|---|---|---|---|---|---|---|
| M50 | (1) | *—CH₂—O—C(=O)—N(H)—C(CH₃)(CH₂—*)(CH₂—*) | *—N(piperazine)N—* | phenyl with *—C(=O)—C(CH₃)(CH₂—*)—N(CH₃)₂ | Single bond | *—C(=O)—* | *—N((CH₂)₁₁—CH₃)((CH₂)₁₁—CH₃) |

TABLE 6

Structure header: *—C₆H₄(R)ₙ—C(=O)—C(R³)(NR¹R²)—*

| Ex. Compd | Genl. Fmla. | *—A—* | *—Y—* | (aryl ketone amine group) | *—X⁴—* | *—X⁵—* | *—X⁶ |
|---|---|---|---|---|---|---|---|
| M51 | (1) | *—CH₂—O—C(=O)—N(H)—C(CH₃)(CH₂—*)(CH₂—*) | *—N(piperazine)N—* | phenyl—C(=O)—C(CH₃)(CH₂—*)—N(CH₃)₂ | *—CH₂—* | *—C(=O)—* | *—N(morpholine) |
| M52 | (1) | *—CH₂—O—C(=O)—N(H)—C(CH₃)(CH₂—*)(CH₂—*) | *—N(piperazine)N—* | phenyl—C(=O)—C(CH₃)(CH₂—*)—N(CH₃)₂ | *—CH(CH₃)—* | *—C(=O)—* | *—N(morpholine) |
| M53 | (1) | *—CH₂—O—C(=O)—N(H)—C(CH₃)(CH₂—*)(CH₂—*) | *—N(piperazine)N—* | phenyl—C(=O)—C(CH₃)(CH₂—*)—N(CH₃)₂ | *—CH(CH₃)—* | *—C(=O)—* | *—N((CH₂)₇—CH₃)((CH₂)₇—CH₃) |
| M54 | (1) | *—CH₂—O—C(=O)—N(H)—C(CH₃)(CH₂—*)(CH₂—*) | *—N(piperazine)N—* | phenyl—C(=O)—C(CH₃)(CH₂—*)—N(CH₃)₂ | *—C(CH₃)₂—* | *—C(=O)—* | *—N(ethyl)₂ |
| M55 | (1) | *—CH₂—O—C(=O)—N(H)—C(CH₃)(CH₂—*)(CH₂—*) | *—N(piperazine)N—* | phenyl—C(=O)—C(CH₃)(CH₂—*)—N(CH₃)₂ | *—CH₂—CH₂—* | *—C(=O)—* | *—N(morpholine) |
| M56 | (1) | *—CH₂—O—C(=O)—N(H)—C(CH₃)(CH₂—*)(CH₂—*) | *—N(piperazine)N—* | phenyl—C(=O)—C(CH₃)(CH₂—*)—N(CH₃)₂ | Single bond | *—C(=O)—* | *—phenyl |
| M57 | (1) | *—CH₂—O—C(=O)—N(H)—C(CH₃)(CH₂—*)(CH₂—*) | *—N(piperazine)N—* | phenyl—C(=O)—C(CH₃)(CH₂—*)—N(CH₃)₂ | Single bond | *—C(=O)—* | *—C₆H₄—N(CH₃)₂ (para) |

TABLE 6-continued
| Ex. Compd | Genl. Fmla. | *—A—* | *—Y—* | 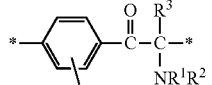(R)n | *—X⁴—* | *—X⁵—* | *—X⁶ |
|---|---|---|---|---|---|---|---|
| M58 | (1) | 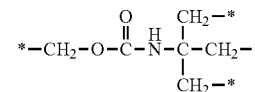 |  | 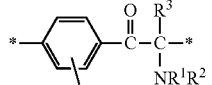 | *—H | — | — |
| M59 | (1) | 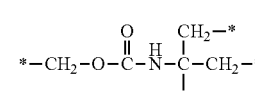 |  | 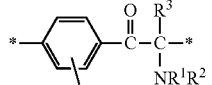 | *—CH₃ | — | — |
| M60 | (2) | *—CH₂—* |  | 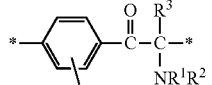 | *—H | — | — |
TABLE 7
| Ex. Compd | Genl. Fmla. | *—A—* | *—Y—* | 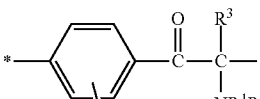(R)n | *—X⁴—* | *—X⁵—* | *—X⁶ |
|---|---|---|---|---|---|---|---|
| M61 | (2) | *—CH₂—* |  | 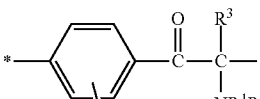 | *—CH₃ | — | — |
| M62 | (2) | *—CH₂—* |  | 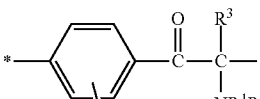 | *—(CH₂)₃CH₃ | — | — |
| M63 | (2) | *—CH₂—* |  | 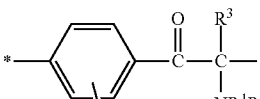 | *—CH(CH₃)CH₃ | — | — |

TABLE 7-continued

| Ex. Compd | Genl. Fmla. | *—A—* | *—Y—* | (R)$_n$ central group | *—X$^4$—* | *—X$^5$—* | *—X$^6$* |
|---|---|---|---|---|---|---|---|
| M64 | (2) | *—CH$_2$—* | *—N(piperazine)N—* | phenyl-C(=O)-C(CH$_3$)(CH$_2$*)-N(CH$_3$)$_2$ | *—C(CH$_3$)$_3$ | — | — |
| M65 | (2) | *—CH$_2$—* | *—N(piperazine)N—* | phenyl-C(=O)-C(CH$_3$)(CH$_2$*)-N(CH$_3$)$_2$ | *—phenyl | — | — |
| M66 | (2) | *—CH$_2$—* | *—N(piperazine)N—* | phenyl-C(=O)-C(CH$_3$)(CH$_2$*)-N(CH$_3$)$_2$ | *—F | — | — |
| M67 | (2) | *—CH$_2$—* | *—N(piperazine)N—* | phenyl-C(=O)-C(CH$_3$)(CH$_2$*)-N(CH$_3$)$_2$ | *—Cl | — | — |
| M68 | (2) | *—CH$_2$—* | *—N(piperazine)N—* | phenyl-C(=O)-C(CH$_3$)(CH$_2$*)-N(CH$_3$)$_2$ | *—Br | — | — |
| M69 | (2) | *—CH$_2$—* | *—N(piperazine)N—* | phenyl-C(=O)-C(CH$_3$)(CH$_2$*)-N(CH$_3$)$_2$ | *—I | — | — |
| M70 | (2) | *—CH$_2$—* | *—N(piperazine)N—* | phenyl-C(=O)-C(CH$_3$)(CH$_2$*)-N(CH$_3$)$_2$ | *—CF$_3$ | — | — |

TABLE 8

| Ex. Compd | Genl. Fmla. | *—A—* | *—Y—* | (R)n structure | *—X⁴—* | *—X⁵—* | *—X⁶ |
|---|---|---|---|---|---|---|---|
| M71 | (2) | *—CH₂—* | *—N(piperazine)N—* | phenyl-C(=O)-C(CH₃)(CH₂*)-N(CH₃)₂ | *—OMe | — | — |
| M72 | (2) | *—CH₂—* | *—N(piperazine)N—* | phenyl-C(=O)-C(CH₃)(CH₂*)-N(CH₃)₂ | *—OCF₃ | — | — |
| M73 | (2) | *—CH₂—* | *—N(piperazine)N—* | phenyl-C(=O)-C(CH₃)(CH₂*)-N(CH₃)₂ | *—O-phenyl | — | — |
| M74 | (2) | *—CH₂—* | *—N(2,5-dimethylpiperazine)N—* | phenyl-C(=O)-C(CH₃)(CH₂*)-N(CH₃)₂ | *—H | — | — |
| M75 | (2) | *—CH₂—* | *—N(CH₃)-CH₂CH₂-N(CH₃)—* | phenyl-C(=O)-C(CH₃)(CH₂*)-N(CH₃)₂ | *—H | — | — |
| M76 | (2) | *—CH₂—* | *—N(piperazine)N—* | phenyl-C(=O)-C(CH₃)(CH₂*)-N(CH₃)((CH₂)₁₁CH₃) | *—H | — | — |
| M77 | (2) | *—CH₂—* | *—N(piperazine)N—* | phenyl-C(=O)-C(CH₃)(CH₂*)-N(CH₃)₂ | Single bond | *—C(=O)—* | *—N(morpholine)O |
| M78 | (2) | *—CH₂—* | *—N(piperazine)N—* | phenyl-C(=O)-C(CH₃)(CH₂*)-N(CH₃)₂ | Single bond | *—C(=O)—* | *—N(Et)₂ |
| M79 | (2) | *—CH₂—* | *—N(piperazine)N—* | phenyl-C(=O)-C(CH₃)(CH₂*)-N(CH₃)₂ | Single bond | *—C(=O)—* | *—N((CH₂)₇CH₃)₂ |

TABLE 8-continued

| Ex. Compd | Genl. Fmla. | *—A—* | *—Y—* | (structure with R, R¹, R², R³, NR¹R²) | *—X⁴—* | *—X⁵—* | *—X⁶ |
|---|---|---|---|---|---|---|---|
| M80 | (2) | *—CH₂—* | *—N(piperazine)N—* | phenyl ketone with C(CH₃)(CH₂)N(CH₃)₂ | Single bond | *—C(=O)—* | *—N((CH₂)₁₁—CH₃)₂ |

TABLE 9

| Ex. Compd | Genl. Fmla. | *—A—* | *—Y—* | (structure) | *—X⁴—* | *—X⁵—* | *—X⁶ |
|---|---|---|---|---|---|---|---|
| M81 | (2) | *—CH₂—* | *—N(piperazine)N—* | phenyl ketone with C(CH₃)(CH₂)N(CH₃)₂ | *—CH₂—* | *—C(=O)—* | *—N(morpholine) |
| M82 | (2) | *—CH₂—* | *—N(piperazine)N—* | phenyl ketone with C(CH₃)(CH₂)N(CH₃)₂ | *—CH(CH₃)—* | *—C(=O)—* | *—N(morpholine) |
| M83 | (2) | *—CH₂—* | *—N(piperazine)N—* | phenyl ketone with C(CH₃)(CH₂)N(CH₃)₂ | *—CH(CH₃)—* | *—C(=O)—* | *—N((CH₂)₇—CH₃)₂ |
| M84 | (2) | *—CH₂—* | *—N(piperazine)N—* | phenyl ketone with C(CH₃)(CH₂)N(CH₃)₂ | *—C(CH₃)₂—* | *—C(=O)—* | *—N(Et)₂ |
| M85 | (2) | *—CH₂—* | *—N(piperazine)N—* | phenyl ketone with C(CH₃)(CH₂)N(CH₃)₂ | *—CH₂—CH₂—* | *—C(=O)—* | *—N(morpholine) |

TABLE 9-continued

| Ex. Compd | Genl. Fmla. | *—A—* | *—Y—* | (R)n | *—X⁴—* | *—X⁵—* | *—X⁶ |
|---|---|---|---|---|---|---|---|
| M86 | (2) | *—CH₂—* | *—N(piperazine)N—* | phenyl ketone with C(CH₃)(CH₂)N(CH₃)₂ | Single bond | *—C(=O)—* | *—OCH₂CH₃ |
| M87 | (2) | *—CH₂—* | *—N(piperazine)N—* | phenyl ketone with C(CH₃)(CH₂)N(CH₃)₂ | Single bond | *—C(=O)—* | *—OCH(CH₃)CH₃ |
| M88 | (2) | *—CH₂—* | *—N(piperazine)N—* | phenyl ketone with C(CH₃)(CH₂)N(CH₃)₂ | Single bond | *—C(=O)—* | *—OC(CH₃)₃ |
| M89 | (2) | *—CH₂—* | *—N(piperazine)N—* | phenyl ketone with C(CH₃)(CH₂)N(CH₃)₂ | Single bond | *—C(=O)—* | *—O—(CH₂)₇CH₃ |
| M90 | (2) | *—CH₂—* | *—N(piperazine)N—* | phenyl ketone with C(CH₃)(CH₂)N(CH₃)₂ | Single bond | *—C(=O)—* | *—O-cyclohexyl |

TABLE 10

| Ex. Compd | Genl. Fmla | *—A—* | *—Y—* | (R)n | *—X⁴—* | *—X⁵—* | *—X⁶ |
|---|---|---|---|---|---|---|---|
| M91 | (2) | *—CH₂—* | *—N(piperazine)N—* | phenyl ketone with C(CH₃)(CH₂)N(CH₃)₂ | Single bond | *—C(=O)—* | *—O—(CH₂CH₂O)₂CH₃ |

TABLE 10-continued

Structure header:

$$*-\text{Ar}(R)_n-\underset{O}{\overset{\|}{C}}-\underset{NR^1R^2}{\overset{R^3}{\underset{|}{C}}}-*$$

| Ex. Compd | Genl. Fmla | *—A—* | *—Y—* | (R)n structure | *—X⁴—* | *—X⁵—* | *—X⁶ |
|---|---|---|---|---|---|---|---|
| M92 | (2) | *—CH₂—* | *—N(piperazine)N—* | phenyl-C(=O)-C(CH₃)(CH₂-*)-N(CH₃)₂ | Single bond | *—C(=O)—* | *-phenyl |
| M93 | (2) | *—CH₂—* | *—N(piperazine)N—* | phenyl-C(=O)-C(CH₃)(CH₂-*)-N(CH₃)₂ | Single bond | *—C(=O)—* | *-C₆H₄-N(CH₃)₂ |
| M94 | (2) | *—CH₂—* | *—N(piperazine)N—* | phenyl-C(=O)-C(CH₃)(CH₂-*)-N(CH₃)₂ | Single bond | *—C(=O)—* | *—SCH₃ |
| M95 | (2) | *—CH₂—* | *—N(piperazine)N—* | phenyl-C(=O)-C(CH₃)(CH₂-*)-N(CH₃)₂ | Single bond | *—S(=O)₂—* | *—OCH₃ |
| M96 | (2) | *—CH₂—O—C(=O)—NH—C(CH₃)(CH₂-*)(CH₂-*) | *—N(piperazine)N—* | phenyl-C(=O)-C(CH₃)(CH₂-*)-N(CH₃)₂ | *—H | — | — |
| M97 | (2) | *—CH₂—O—C(=O)—NH—C(CH₃)(CH₂-*)(CH₂-*) | *—N(piperazine)N—* | phenyl-C(=O)-C(CH₃)(CH₂-*)-N(CH₃)₂ | *—CH₃ | — | — |
| M98 | (2) | *—CH₂—O—C(=O)—NH—C(CH₃)(CH₂-*)(CH₂-*) | *—N(piperazine)N—* | phenyl-C(=O)-C(CH₃)(CH₂-*)-N(CH₃)₂ | *-phenyl | — | — |
| M99 | (2) | *—CH₂—O—C(=O)—NH—C(CH₃)(CH₂-*)(CH₂-*) | *—N(piperazine)N—* | phenyl-C(=O)-C(CH₃)(CH₂-*)-N(CH₃)₂ | *—F | — | — |
| M100 | (2) | *—CH₂—O—C(=O)—NH—C(CH₃)(CH₂—O—*)(CH₂—O—*) | *—N(piperazine)N—* | phenyl-C(=O)-C(CH₃)(CH₂-*)-N(CH₃)₂ | *—Cl | — | — |

TABLE 11

| Ex. Compd | Genl. Fmla. | *—A—* | *—Y—* | (R)ₙ structure | *—X⁴—* | *—X⁵—* | *—X⁶ |
|---|---|---|---|---|---|---|---|
| M101 | (2) | *—CH₂—O—C(=O)—N(H)—C(CH₃)(CH₂—*)(CH₂—*) | *—N(piperazine)N—* | dimethylamino propiophenone | *—Br | — | — |
| M102 | (2) | *—CH₂—O—C(=O)—N(H)—C(CH₃)(CH₂—*)(CH₂—*) | *—N(piperazine)N—* | dimethylamino propiophenone | *—CF₃ | — | — |
| M103 | (2) | *—CH₂—O—C(=O)—N(H)—C(CH₃)(CH₂—*)(CH₂—*) | *—N(piperazine)N—* | dimethylamino propiophenone | *—OMe | — | — |
| M104 | (2) | *—CH₂—O—C(=O)—N(H)—C(CH₃)(CH₂—*)(CH₂—*) | *—N(piperazine)N—* | dimethylamino propiophenone | *—OCF₃ | — | — |
| M105 | (2) | *—CH₂—O—C(=O)—N(H)—C(CH₃)(CH₂—*)(CH₂—*) | *—N(piperazine)N—* | dimethylamino propiophenone | *—O—phenyl | — | — |
| M106 | (2) | *—CH₂—O—C(=O)—N(H)—C(CH₃)(CH₂—*)(CH₂—*) | *—N(piperazine)N—* | dimethylamino propiophenone | Single bond | *—C(=O)—* | *—N(morpholine) |
| M107 | (2) | *—CH₂—O—C(=O)—N(H)—C(CH₃)(CH₂—*)(CH₂—*) | *—N(piperazine)N—* | dimethylamino propiophenone | Single bond | *—C(=O)—* | *—N(Et)₂ |
| M108 | (2) | *—CH₂—O—C(=O)—N(H)—C(CH₃)(CH₂—*)(CH₂—*) | *—N(piperazine)N—* | dimethylamino propiophenone | Single bond | *—C(=O)—* | *—N((CH₂)₇—CH₃)₂ |
| M109 | (2) | *—CH₂—O—C(=O)—N(H)—C(CH₃)(CH₂—*)(CH₂—*) | *—N(piperazine)N—* | dimethylamino propiophenone | Single bond | *—C(=O)—* | *—N((CH₂)₁₁—CH₃)₂ |

TABLE 11-continued

| Ex. Compd | Genl. Fmla. | *—A—* | *—Y—* | ![structure with (R)n, C=O, C with R³ and NR¹R²] | *—X⁴—* | *—X⁵—* | *—X⁶ |
|---|---|---|---|---|---|---|---|
| M110 | (2) | *—CH₂—O—C(=O)—N(H)—C(CH₃)(CH₂-*)(CH₂-*) | *—N(piperazine)N—* | phenyl-C(=O)—C(CH₃)(CH₂-*)(N(CH₃)₂) | *—CH₂—* | *—C(=O)—* | *—N(morpholine) |

TABLE 12

| Ex. Compd | Genl. Fmla | *—A—* | *—Y—* | ![structure with (R)n, C=O, C with R³ and NR¹R²] | *—X⁴—* | *—X⁵—* | *—X⁶ |
|---|---|---|---|---|---|---|---|
| M111 | (2) | *—CH₂—O—C(=O)—N(H)—C(CH₃)(CH₂-*)(CH₂-*) | *—N(piperazine)N—* | phenyl-C(=O)—C(CH₃)(CH₂-*)(N(CH₃)₂) | *—CH(CH₃)—* | *—C(=O)—* | *—N(morpholine) |
| M112 | (2) | *—CH₂—O—C(=O)—N(H)—C(CH₃)(CH₂-*)(CH₂-*) | *—N(piperazine)N—* | phenyl-C(=O)—C(CH₃)(CH₂-*)(N(CH₃)₂) | *—CH(CH₃)—* | *—C(=O)—* | *—N((CH₂)₇—CH₃)((CH₂)₇—CH₃) |
| M113 | (2) | *—CH₂—O—C(=O)—N(H)—C(CH₃)(CH₂-*)(CH₂-*) | *—N(piperazine)N—* | phenyl-C(=O)—C(CH₃)(CH₂-*)(N(CH₃)₂) | *—C(CH₃)₂—* | *—C(=O)—* | *—N(Et)₂ |
| M114 | (2) | *—CH₂—O—C(=O)—N(H)—C(CH₃)(CH₂-*)(CH₂-*) | *—N(piperazine)N—* | phenyl-C(=O)—C(CH₃)(CH₂-*)(N(CH₃)₂) | *—CH₂—CH₂—* | *—C(=O)—* | *—N(morpholine) |
| M115 | (2) | *—CH₂—O—C(=O)—N(H)—C(CH₃)(CH₂-*)(CH₂-*) | *—N(piperazine)N—* | phenyl-C(=O)—C(CH₃)(CH₂-*)(N(CH₃)₂) | Single bond | *—C(=O)—* | *—phenyl |
| M116 | (2) | *—CH₂—O—C(=O)—N(H)—C(CH₃)(CH₂-*)(CH₂-*) | *—N(piperazine)N—* | phenyl-C(=O)—C(CH₃)(CH₂-*)(N(CH₃)₂) | Single bond | *—C(=O)—* | *—(4-N(CH₃)₂-phenyl) |
| M117 | (2) | *—CH₂—O—C(=O)—N(H)—C(CH₂-*)(CH₂-*)(CH₂-*) | *—N(piperazine)N—* | phenyl-C(=O)—C(CH₃)(CH₂-*)(N(CH₃)₂) | *—H | — | — |

TABLE 12-continued

| Ex. Compd | Genl. Fmla | *—A—* | *—Y—* | 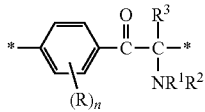 | *—X⁴—* | *—X⁵—* | *—X⁶ |
|---|---|---|---|---|---|---|---|
| M118 | (2) | 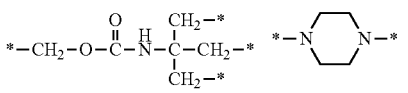 |  | 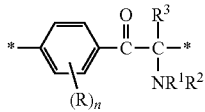 | *—CH₃ | — | — |

In the fluorine-containing acetophenone derivative of the invention, the PFPE chain may have a structure in which C1-C3 divalent fluorocarbon groups and oxygen atoms are alternately bonded together. The C1-C3 divalent fluorocarbon groups may be of a single kind or may be a mixture of two or more kinds of such groups. A specific example is represented by the following structural formula 1.

[Chem. 7]

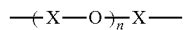     1

(In the structural formula 1, X is any of the structural formulae a to f below. The structures X in the structural formula 1 may be all the same, and a plurality of structures may be arranged randomly or blockwise. The letter n indicates the number of repeating units, and is 1 or greater.)

[Chem. 8]

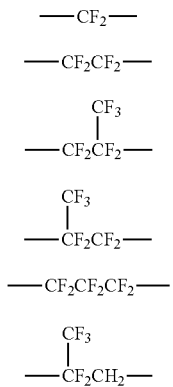

For the reason that cured coatings that are obtained exhibit higher antifouling properties, in particular, the PFPE chain preferably includes both a perfluoromethylene structure represented by the structural formula a, and a perfluoroethylene structure represented by the structural formula b. In this case, the molar ratio (structures a/structures b) of the perfluoromethylene structures of the structural formula a to the perfluoroethylene structures of the structural formula b is more preferably 1/4 to 4/1 from the point of view of antifouling properties, and the value of n in the structural formula 1 is preferably in the range of 3 to 40, and particularly preferably in the range of 6 to 30.

To improve the balance between antifouling properties and slip properties and to attain easily enhanced compatibility with a fluorine-free active energy ray curable compound, the PFPE chains are preferably such that the total number of fluorine atoms in a single PFPE chain is in the range of 18 to 200, and particularly preferably in the range of 25 to 80. The weight average molecular weight (Mw) of the PFPE chain is preferably in the range of 400 to 10,000, and more preferably 500 to 5,000.

The number average molecular weight (Mn) and the weight average molecular weight (Mw) are polystyrene-equivalent values based on gel permeation chromatography (hereinafter, abbreviated as "GPC") measurement. The GPC measurement conditions are as follows.

[GPC Measurement Conditions]

Measurement device: "HLC-8220 GPC" manufactured by TOSOH CORPORATION

Columns: Guard column "HHR-H" (6.0 mm I.D.×4 cm) manufactured by TOSOH CORPORATION+"TSK-GEL GMHHR-N" (7.8 mm I.D.×30 cm) manufactured by TOSOH CORPORATION+"TSK-GEL GMHHR-N" (7.8 mm I.D.×30 cm) manufactured by TOSOH CORPORATION+"TSK-GEL GMHHR-N" (7.8 mm I.D.×30 cm) manufactured by TOSOH CORPORATION+"TSK-GEL GMHHR-N" (7.8 mm I.D.×30 cm) manufactured by TOSOH CORPORATION Detector: ELSD ("ELSD 2000" manufactured by Alltech)

Data processing: "GPC-8020 Model II Data Analysis Version 4.30" manufactured by TOSOH CORPORATION Measurement Conditions:

Column temperature: 40° C.

Developing solvent: tetrahydrofuran (THF)

Flow rate: 1.0 ml/min

Sample: Tetrahydrofuran solution with 1.0 mass % resin solid concentration was filtered through a microfilter (100 μl).

Standard samples: In accordance with the measurement manual of the "GPC-8020 Model II Data Analysis Version 4.30", the following monodisperse polystyrenes with known molecular weights were used.

(Monodisperse Polystyrenes)

"A-500" manufactured by TOSOH CORPORATION
"A-1000" manufactured by TOSOH CORPORATION
"A-2500" manufactured by TOSOH CORPORATION
"A-5000" manufactured by TOSOH CORPORATION
"F-1" manufactured by TOSOH CORPORATION
"F-2" manufactured by TOSOH CORPORATION
"F-4" manufactured by TOSOH CORPORATION
"F-10" manufactured by TOSOH CORPORATION
"F-20" manufactured by TOSOH CORPORATION
"F-40" manufactured by TOSOH CORPORATION "F-80" manufactured by TOSOH CORPORATION
"F-128" manufactured by TOSOH CORPORATION
"F-288" manufactured by TOSOH CORPORATION
"F-550" manufactured by TOSOH CORPORATION In the general formula (1), A is a direct bond, or a divalent or trivalent linking group which is a structure derived from a PFPE chain-containing compound described later or a raw material used to introduce an acryloyl group into the PFPE chain-containing compound. For example, the following linking groups may be mentioned.

[Chem. 9]

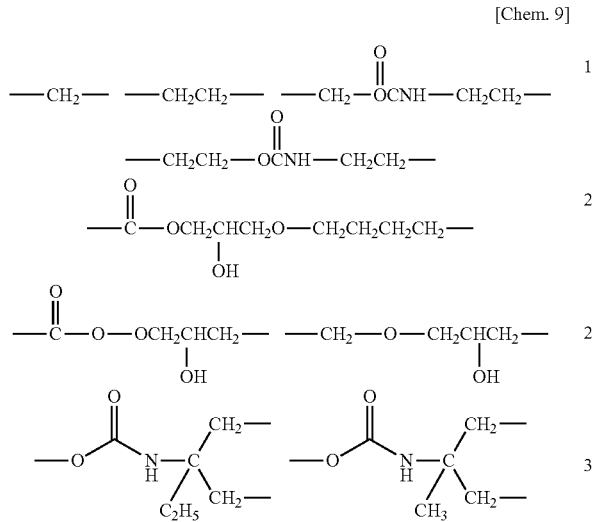

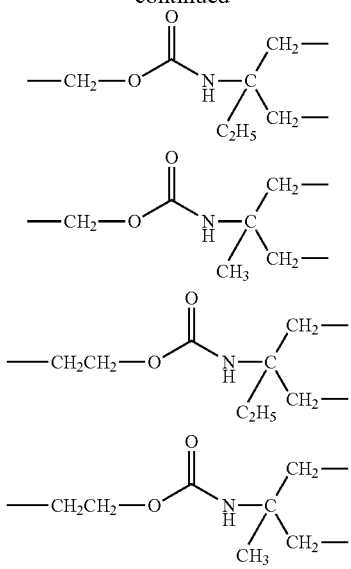

As mentioned earlier, the fluorine-containing acetophenone derivative of the present invention may be obtained by Michael addition reaction in which a compound that can function as a Michael donor and also has an acetophenone analogue structure cleavable by active energy rays is added to a PFPE chain-containing acryloyl compound.

Examples of the PFPE chain-containing acryloyl compounds include the following compounds.

[Chem. 10]

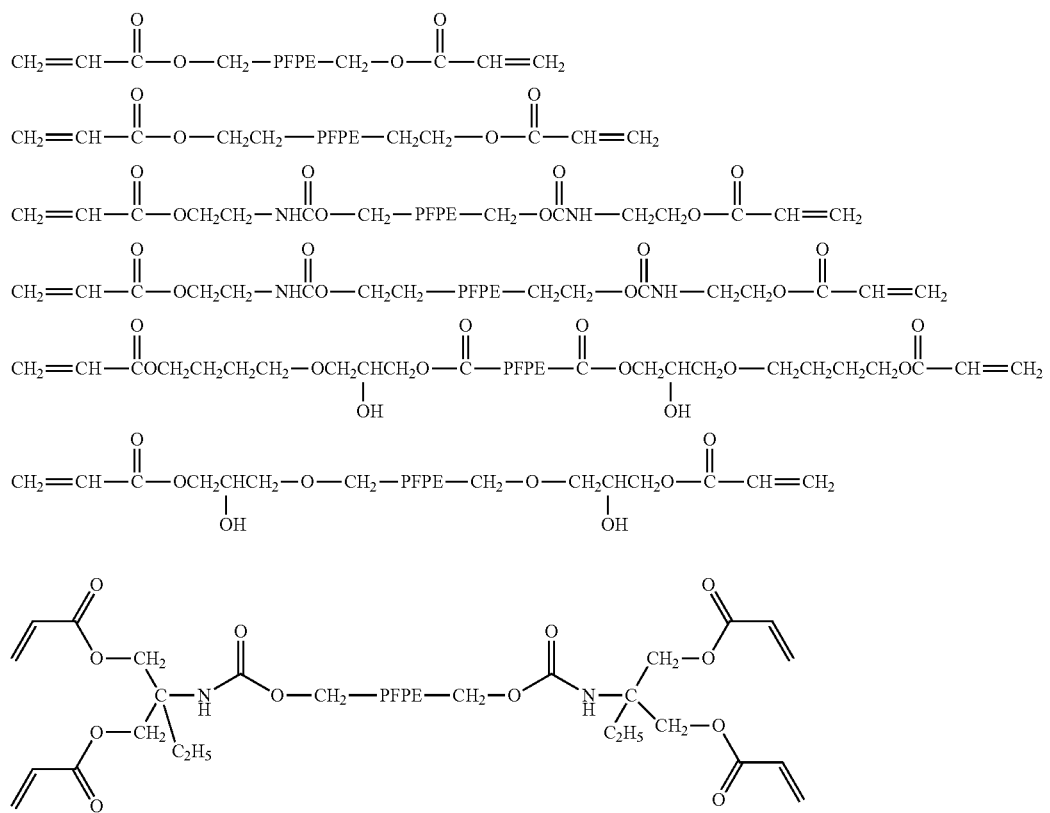

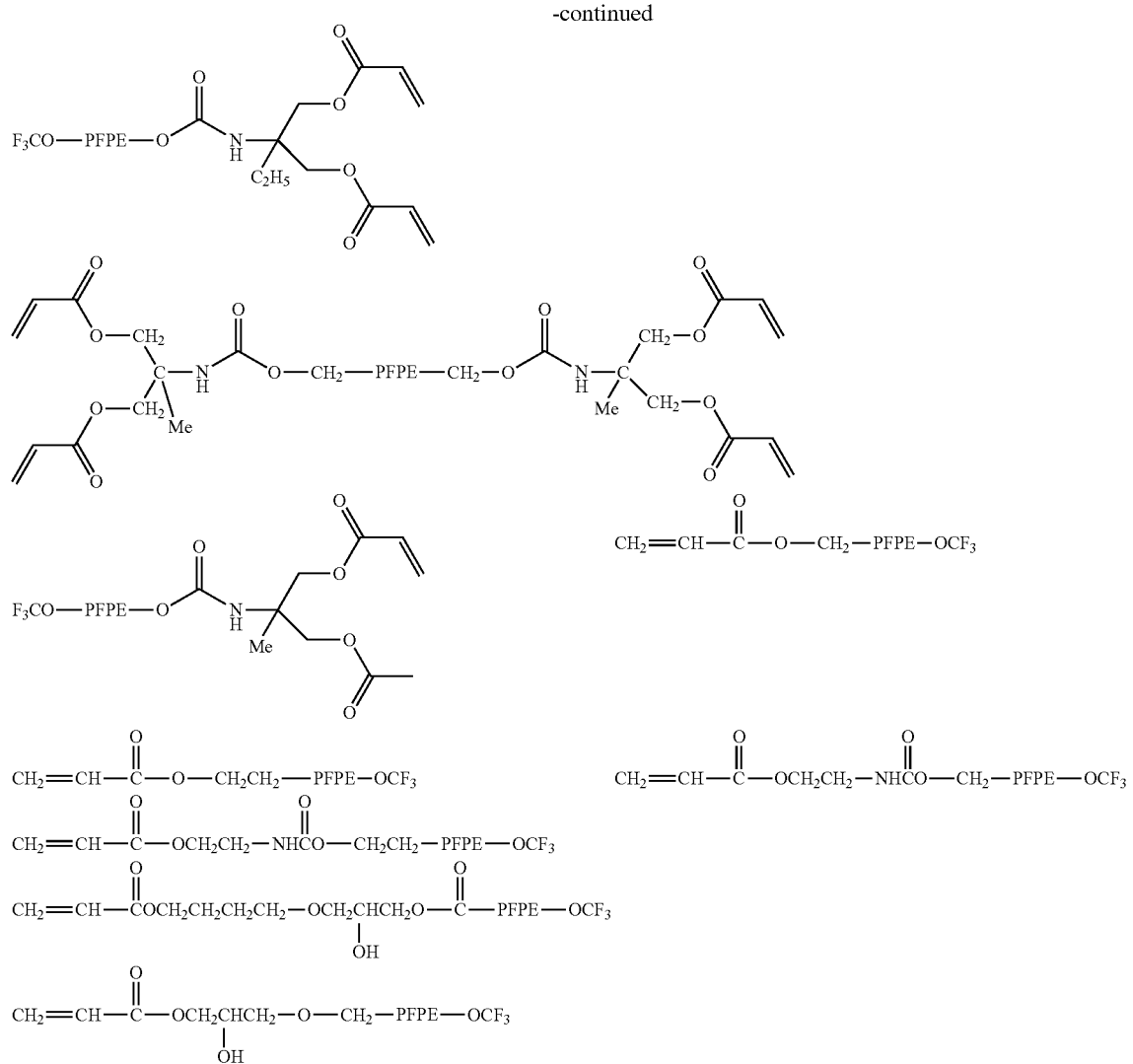

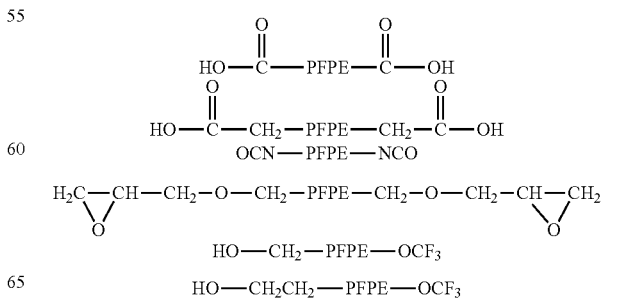

For example, the above PFPE chain-containing compounds having an acryloyl group at a terminal may be obtained by subjecting a compound having a hydroxyl group at a terminal of a PFPE chain to reaction with acryloyl chloride, to dehydration with acrylic acid, to urethane-forming reaction with 2-acryloyloxyethyl isocyanate, to urethane-forming reaction with 1,1-(bisacryloyloxymethyl) ethyl isocyanate, or to esterification with itaconic anhydride; by subjecting a compound having a carboxyl group at a terminal of a PFPE chain to esterification with 4-hydroxybutyl acrylate glycidyl ether; by subjecting a compound having an isocyanate group at a terminal of a PFPE chain to reaction with 2-hydroxyethyl acrylamide; or by subjecting a compound having an epoxy group at a terminal of a PFPE chain to reaction with acrylic acid. Of these methods, the production by the reaction of a compound having a hydroxyl group at a terminal of a PFPE chain with acryloyl chloride, or by the urethane-forming reaction of the compound with 2-acryloyloxyethyl isocyanate or 1,1-(bisacryloyloxymethyl) ethyl isocyanate is particularly preferable because the reaction is easy.

Examples of the compounds having a hydroxyl group at a terminal of a poly(perfluoroalkylene ether) chain, the compounds having a carboxyl group at a terminal of a poly(perfluoroalkylene ether) chain, the compounds having an isocyanate group at a terminal of a poly(perfluoroalkylene ether) chain, and the compounds having an epoxy group at a terminal of a poly(perfluoroalkylene ether) chain include those compounds having the following structures.

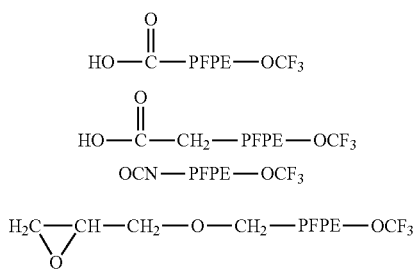

In the present invention, the Michael donor compounds may be any compounds which can function as Michael donors on the PFPE chain-containing acryloyl compounds and have an acetophenone analogue structure cleavable by active energy rays. Examples thereof include the following formulae (D1) to (D36). (In the following structural formulae, C, CH and CH$_2$ are sometimes omitted.)

[Chem. 12]

(D1)

[Chem. 13]

(D2)

[Chem. 14]

(D3)

[Chem. 15]

(D4)

[Chem. 16]

(D5)

[Chem. 17]

(D6)

[Chem. 18]

(D7)

[Chem. 19]

(D8)
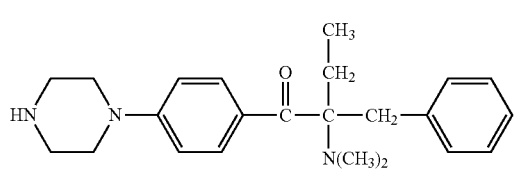

[Chem. 20]

(D9)
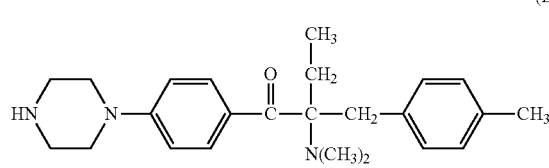

[Chem. 21]

(D10)
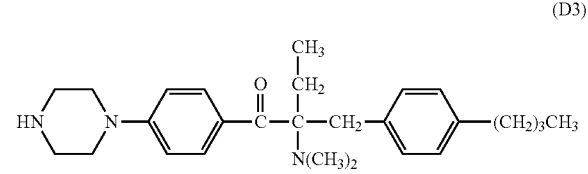

[Chem. 22]

(D11)
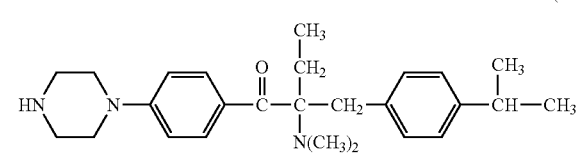

[Chem. 23]

(D12)
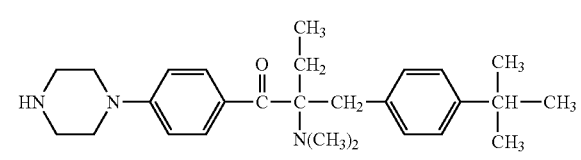

[Chem. 24]
(D13)
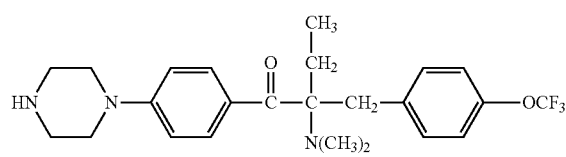
[Chem. 25]
(D14)
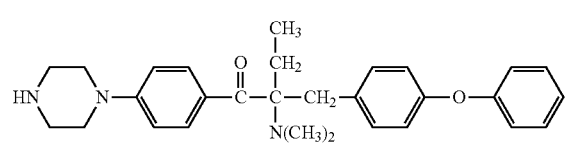
[Chem. 26]
(D15)
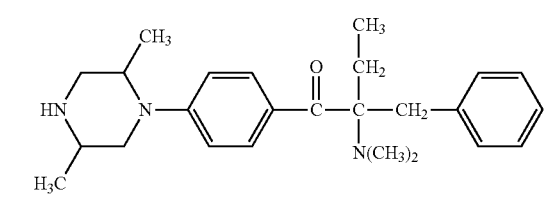
[Chem. 27]
(D16)
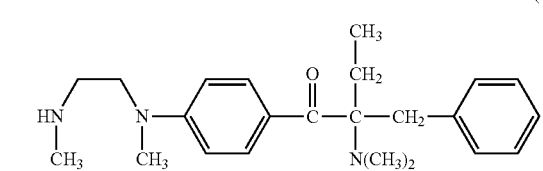
[Chem. 28]
(D17)
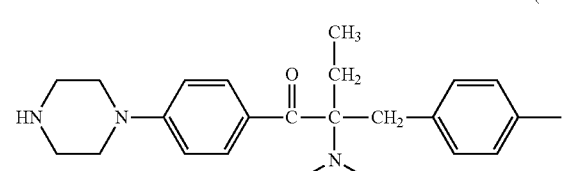
[Chem. 29]
(D18)
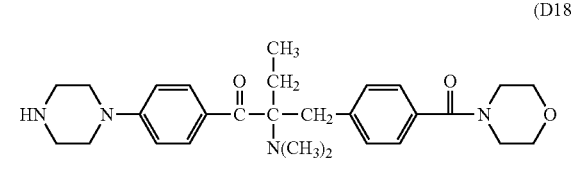
[Chem. 30]
(D19)
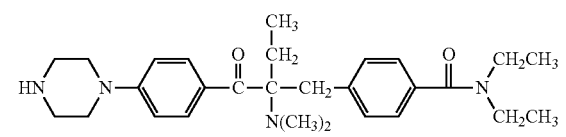
[Chem. 31]
(D20)
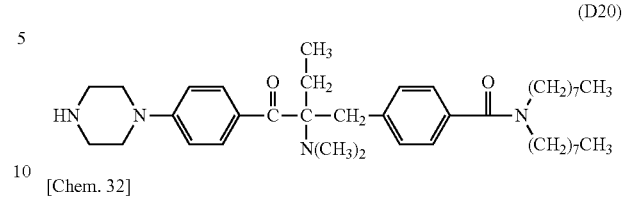
[Chem. 32]
(D21)
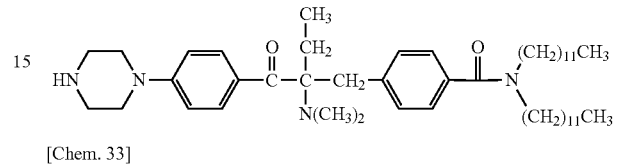
[Chem. 33]
(D22)
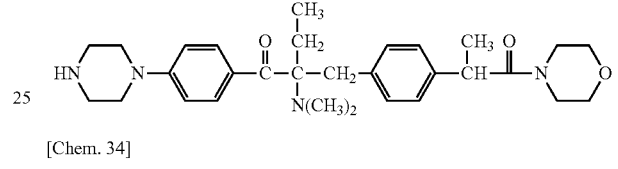
[Chem. 34]
(D23)
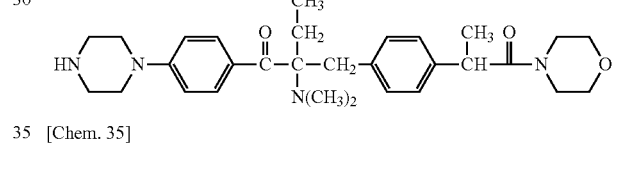
[Chem. 35]
(D24)
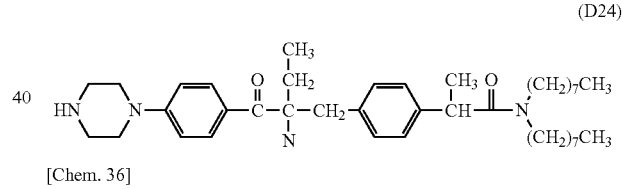
[Chem. 36]
(D25)
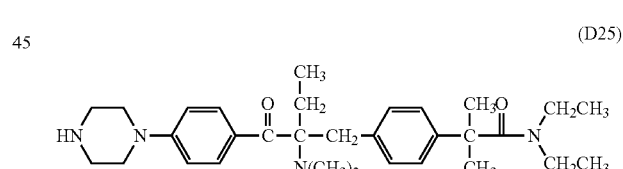
[Chem. 37]
(D26)
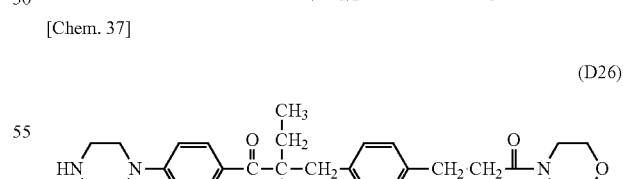
[Chem. 38]
(D27)
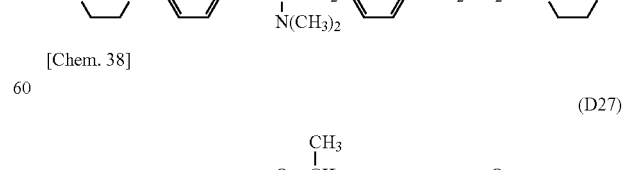
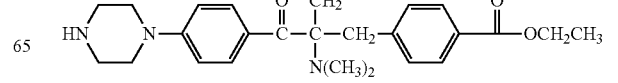

-continued

[Chem. 39]

(D28)
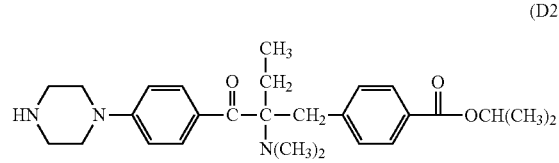

[Chem. 40]

(D29)
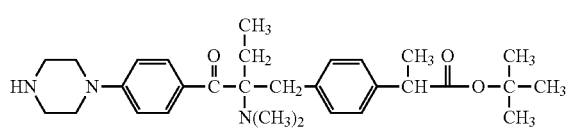

[Chem. 41]

(D30)
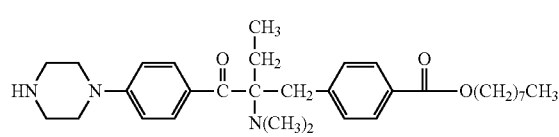

[Chem. 42]

(D31)
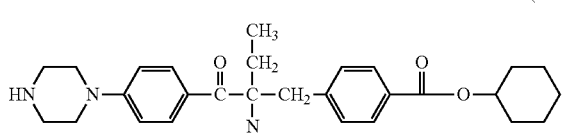

[Chem. 43]

(D32)
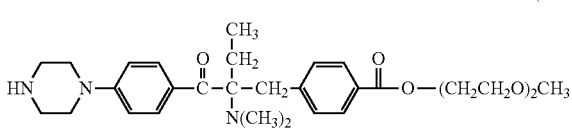

[Chem. 44]

(D33)
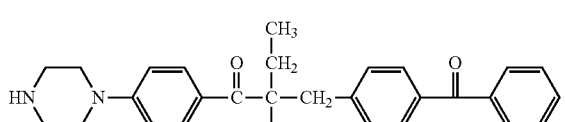

[Chem. 45]

(D34)
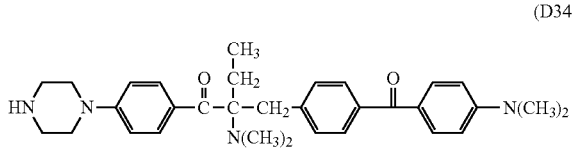

[Chem. 46]

(D35)
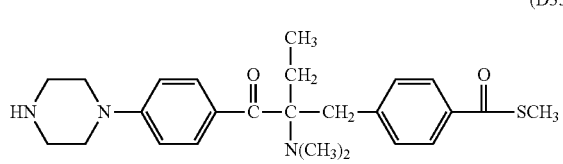

-continued

[Chem. 47]

(D36)
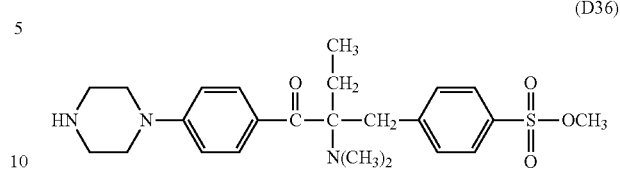

For example, these α-aminoacetophenone derivatives may be obtained by the following method. A halogenated benzene and a fatty acid halide compound are reacted together to synthesize an alkylacetophenone (a). Next, the α-position of the ketone moiety is halogenated and is subsequently reacted with a secondary monoamine compound $(HN(R^1)(R^2))$ to synthesize an intermediate (c) having an aminated α-position. Next, the intermediate is reacted with a benzyl bromide compound, and the product is treated with an alkali to give an intermediate (d). Further, the halogen substituent on the aromatic ring is replaced by a divalent amino group-containing compound (H—Y—H). The target α-aminoacetophenone skeleton-containing compound (f) may be thus produced.

When the benzyl bromide compound used above is a benzyl bromide compound having an ester or a carboxylic acid on the aromatic ring of the benzyl bromide ($X^6$ is a carbonyl group, and $X^7$ is $OR^{10}$ wherein $R^{10}$ is an alkyl group or hydrogen), the above alkali treatment results in a compound (d) having a carboxylic group at the terminal of the benzyl group. This compound may be subjected to amidation or esterification with an amino group-containing compound or a hydroxyl group-containing compound to give an intermediate (e), which is then reacted with a divalent amino group-containing compound (H—Y—H) to substitute for the halogen substituent on the aromatic ring. Thus, an α-aminoacetophenone skeleton-containing compound (f) having an amide group or an ester group on the aromatic ring of the benzyl group may be produced.

[Chem. 48]

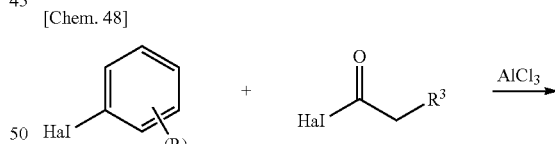

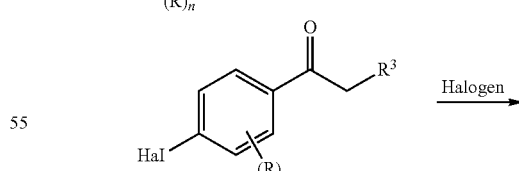

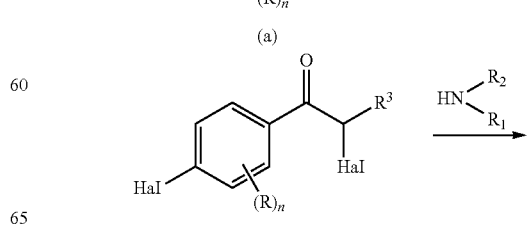

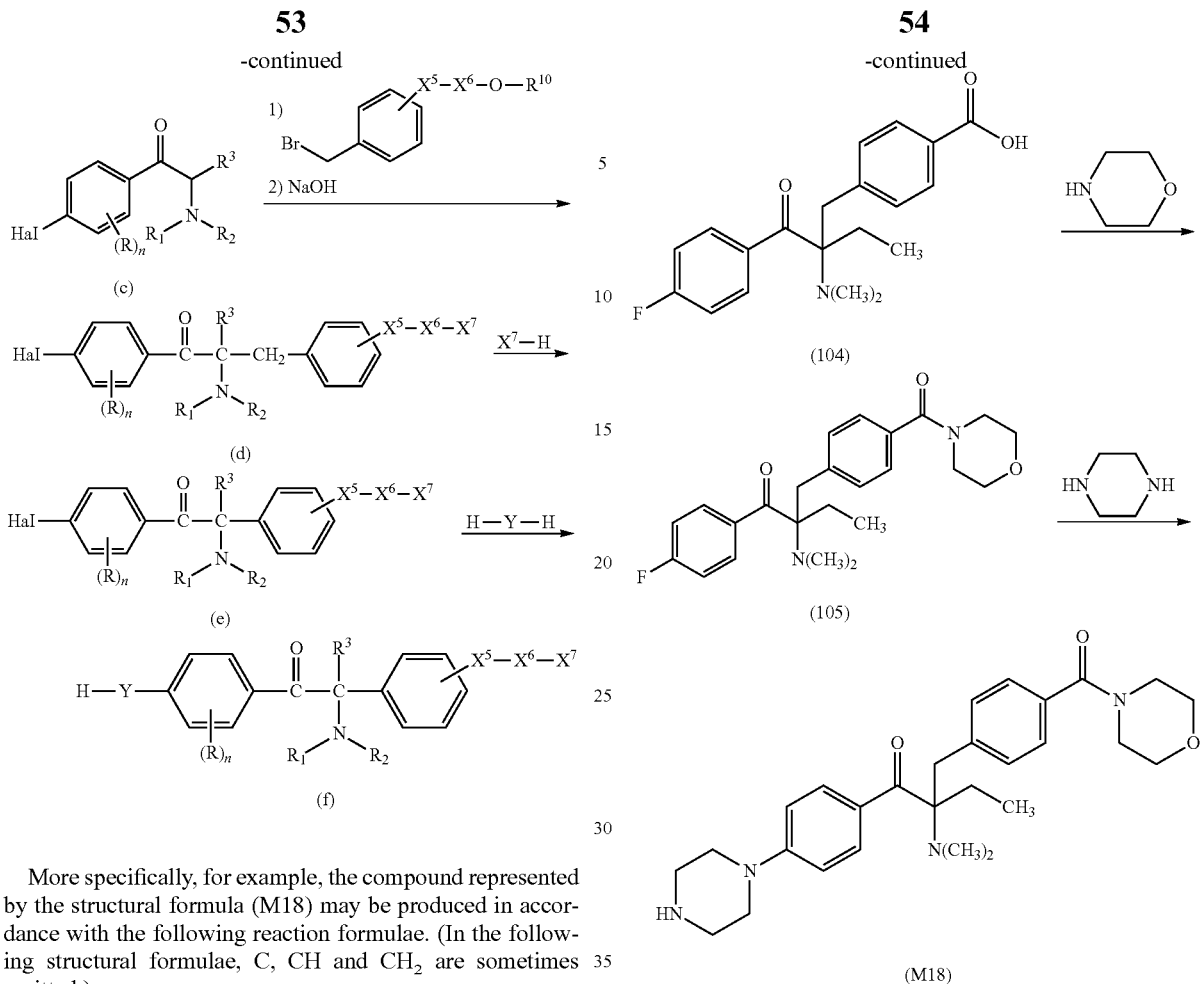

More specifically, for example, the compound represented by the structural formula (M18) may be produced in accordance with the following reaction formulae. (In the following structural formulae, C, CH and $CH_2$ are sometimes omitted.)

[Chem. 49]

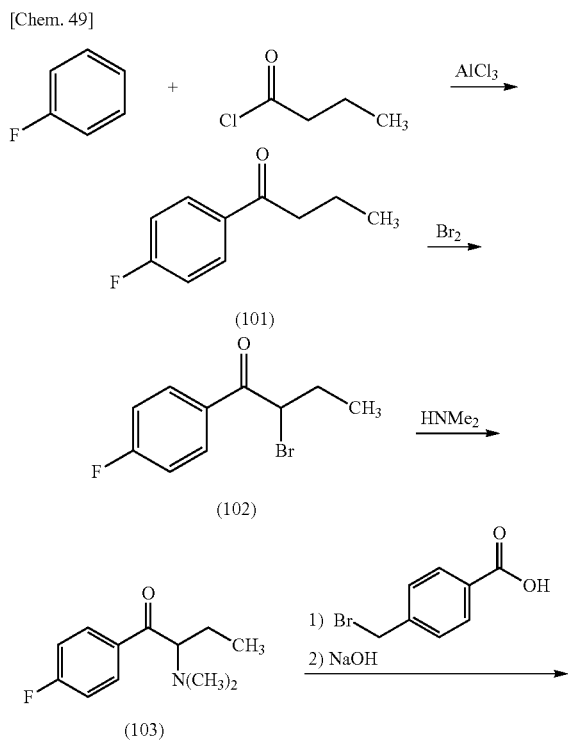

Specifically, the Friedel-Crafts acylation of benzene fluoride and butyryl chloride gives an acyl derivative (101), which is then reacted with bromine to synthesize a bromide (102). Subsequently, the bromine moiety is substituted with dimethylamine. The resultant dimethylamino compound (103) is further reacted with a benzyl bromide derivative having an ester substituent at the 4-position (methyl p-bromomethylbenzoate) to give a quaternary ammonium chloride. The chloride is subjected to 1,2-rearrangement reaction (Stevens rearrangement) with sodium hydroxide to afford an intermediate (104) having an α-aminoacetophenone skeleton. Thereafter, the intermediate is reacted with an amine such as morpholine by active esterification or acid chlorination to give an amide compound (105), which is further reacted with piperazine at 60° C. to 160° C. The target compound (M18) is thus produced in which the Michael addition donor moiety is the piperazino group.

In the reaction formulae discussed above, $R^1$ to $R^4$, $X^5$ to $X^7$ and Y are the same as defined in the general formula (1), and Hal denotes a halogen atom such as fluorine atom, bromine atom or chlorine atom.

Examples of the secondary monoamine compounds (HN($R^1$)($R^2$)) in the above production method include dimethylamine, diethylamine, methylbutylamine, methyloctylamine, methyldodecylamine, ethylhexylamine, diethanolamine, 2,2'-diethoxydiethylamine, diisopropanolamine, morpholine, pyrrolidine, piperidine, N-methylpiperazine and 2,6-dimethylmorpholine. Examples of the benzyl bromide compounds having the substituent (—$X^5$—$X^6$—OR) on the aromatic nucleus include methyl bromomethylbenzoate, methyl 2-[4-(bromomethyl)phenyl]] propionate, ethyl 2-[4-(bromomethyl)phenyl]]acetate, methyl bromomethylthiobenzoate and methyl 2-[4-(bromomethyl)phenyl]]thiopropionate.

The fluorine-containing acetophenone derivative of the invention may be produced by the Michael addition reaction under known reaction conditions without limitation. In a general method, the acetophenone derivative and the PFPE chain-containing compound having an acryloyl group at a terminal may be mixed together in a reaction vessel at 0 to 150° C. A catalyst and a solvent may be optionally used.

Examples of the catalysts which may be used include tetraethylammonium fluoride, tetrabutylammonium hydroxide, potassium hydroxide, tetramethylguanidine, diazabicycloundecene, sodium t-butyrate, tri-n-octylphosphine and triphenylphosphine.

Examples of the organic solvents include saturated hydrocarbons such as pentane, hexane, heptane and cyclohexane, aromatic hydrocarbons such as toluene and xylene, alcohols such as methanol, ethanol, isopropanol, 2-butanol, t-butanol, ethylene glycol and carbitol, ethers such as dimethyl ether, diethyl ether, 1,4-dioxane and tetrahydrofuran (THF), nitrile solvents such as acetonitrile, amides such as dimethylformamide (DMF), halogenated solvents such as chloroform and dichloromethane, and dimethylsulfoxide (DMSO).

While the acetophenone derivative and the acryloyl-terminated, PFPE chain-containing compound may be mixed together in any ratio without limitation, the ratio of the count of the Michael accepting groups to the count of the Michael donating groups (Michael donating groups/Michael accepting groups) is preferably 10/1 to 1/10. In particular, the ratio is preferably 1/2 to 2/1 from the point of view of the balance between the capability of the obtainable fluorine-containing acetophenone derivative to segregate to the gas-liquid interface, and the decomposability by active energy rays.

The fluorine-containing acetophenone derivative of the present invention [hereinafter, written as the fluorine-containing acetophenone derivative (I)] may be used singly as a so-called fluorine-based surface modifier, and may be added to, for example, a curable composition for various applications such as coating applications to impart effective characteristics such as antifouling properties, scratch resistance and slip properties to the surface of cured products that are obtained.

To take advantage of the performance of the fluorine-containing acetophenone derivative (I) more effectively, it is preferable that the derivative be used as an additive to an active energy ray curable composition. When an active energy ray curable composition is cured by the application of an active energy ray, the fluorine-containing acetophenone derivative (I) is cleaved by the irradiation in the similar manner as a general photoinitiator and is strongly anchored to an active energy ray curable compound in the composition.

When added to, in particular, a composition including a fluorine-free active energy ray curable compound, the fluorine-containing acetophenone derivative (I) migrates to the gas-liquid interface (the uppermost portion) of a cured product by the surface segregation function of the fluorine atoms in the PFPE chains, and the derivative that has been thus concentrated on the surface of the cured product is irradiated with the active energy ray. Consequently, the derivative is bonded to other curable components in the uppermost portion and the PFPE chains are arranged with a high density to offer marked effects such as antifouling properties, scratch resistance and slip properties.

To take advantage of the functions inherent to the PFPE chains more effectively, it is preferable that the derivative be used in combination with an additional fluorinated surfactant. Such an additional fluorinated surfactant will help the fluorine-containing acetophenone derivative (I) migrate to the surface more effectively, and will also serve as a compatibilizer between the fluorine-free active energy ray curable compound and the fluorine-containing acetophenone derivative (I) and will thereby enhance the bonding properties with respect to the curable compound upon irradiation with the active energy ray. By such synergetic effects, the antifouling properties, scratch resistance and slip properties of the surface of cured coatings are markedly enhanced.

Examples of the fluorinated surfactants which may be used above include compounds having a C1-C6 perfluoroalkyl group to which fluorine atoms are directly bonded, and compounds having a PFPE chain similar to the PFPE chain in the fluorine-containing acetophenone derivative (I). Such surfactants may be synthesized or purchased in the market. Examples of commercial products include MEGAFACE series F-251, F-253, F-477, F-553, F-554, F-556, F-558, F-559, F-560, F-561, F-562, F-568, F-569, F-574, R-40, RS-75, RS-56, RS-76-E, RS-78 and RS-90 [all manufactured by DIC Corporation], FLUORAD series FC430, FC431 and FC171 (all manufactured by Sumitomo 3M Limited), and SURFLON series S-382, SC-101, SC-103, SC-104, SC-105, SC1068, SC-381, SC-383, 5393 and KH-40 [all manufactured by AGC Inc.]. Of these, PFPE chain-containing surfactants are preferable from the point of view of the compatibility with the fluorine-containing acetophenone derivative (I). Compounds (II) having a poly(perfluoroalkylene ether) chain and a polymerizable unsaturated group are preferably used because such surfactants are resistant to detachment from the surface of cured coatings and offer long-term performance on the surface of cured coatings.

The compounds (II) having a poly(perfluoroalkylene ether) chain and a polymerizable unsaturated group may be synthesized or purchased from the market. For example, those disclosed in literature such as WO 2009/133770 may be used.

Specifically, the compound (II) having a PFPE chain and a polymerizable unsaturated group is preferably a product of the reaction of a copolymer from monomers essentially including a compound (II-1) which has a structural moiety including a PFPE chain and, at a terminal thereof, a polymerizable unsaturated group, and a polymerizable unsaturated monomer (II-2) having a reactive functional group ($\alpha$), with a compound (II-3) having a polymerizable unsaturated group and a reactive functional group ($\beta$) that is reactive to the reactive functional group ($\alpha$).

In the compound (II-1) which has a structural moiety including a PFPE chain and, at a terminal thereof, a polymerizable unsaturated group, the PFPE chain may be one having a structure in which C1-C3 divalent fluorocarbon groups and oxygen atoms are alternately bonded together. Such a PFPE chain is similar to as described hereinabove.

The compound (II-1) may be produced by introducing a polymerizable unsaturated group to a terminal of a PFPE chain. The raw material compound before the introduction of a polymerizable unsaturated group may be any of the compounds described hereinabove which have a hydroxyl group, a carboxyl group, an isocyanate group or an epoxy group at a terminal of a PFPE chain.

In the compound (II-1) having a PFPE chain and a polymerizable unsaturated group, the polymerizable unsaturated group may be, for example, any of the polymerizable unsaturated groups represented by the following structural formulae U-1 to U-5.

[Chem. 50]

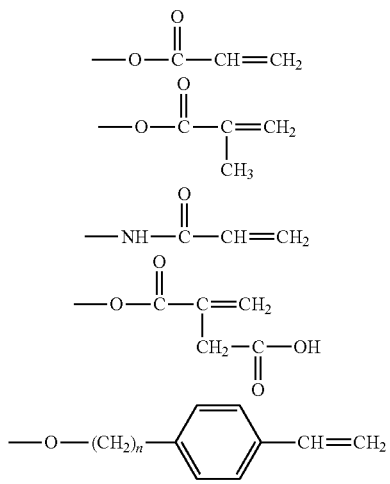

Of the above polymerizable unsaturated groups, the acryloyloxy group or the methacryloyloxy group is preferable because of the availability of the raw materials and the ease of production, or on account of the high copolymerizability with the polymerizable unsaturated monomer (II-2) having a reactive functional group ($\alpha$) which will be described later.

For example, the compound (II-1) having a PFPE chain and a polymerizable unsaturated group may be produced by subjecting a compound having a hydroxyl group at a terminal of a PFPE chain to dehydrochlorination with (meth)acryloyl chloride, dehydration with (meth)acrylic acid, urethane-forming reaction with 2-(meth)acryloyloxyethyl isocyanate or 1,1-(bisacryloyloxymethyl)ethyl isocyanate, esterification with itaconic anhydride, or reaction with chloromethylstyrene in the presence of a base; by subjecting a compound having a carboxyl group at a terminal of a PFPE chain to esterification with 4-hydroxybutyl acrylate glycidyl ether or esterification with glycidyl (meth)acrylate; or by subjecting a compound having an isocyanate group at a terminal of a PFPE chain to reaction with 2-hydroxyethyl (meth)acrylate or reaction with 2-hydroxyethyl (meth)acrylamide. In particular, easy synthesis is taken advantage of by adopting a method in which a compound having one hydroxyl group at both terminals of a PFPE chain is subjected to dehydrochlorination with (meth)acryloyl chloride or to urethane-forming reaction with 2-(meth)acryloyloxyethyl isocyanate.

In the present invention, the term "(meth)acryloyl group" means either or both of methacryloyl group and acryloyl group, the term "(meth)acrylate" means either or both of methacrylate and acrylate, and the term "(meth)acrylic acid" means either or both of methacrylic acid and acrylic acid.

Specific examples of the compounds (II-1) having a PFPE chain and a polymerizable unsaturated group include those represented by the following structural formulae. In the structural formulae below, "—PFPE-" denotes a poly(perfluoroalkylene ether) chain.

[Chem. 51]

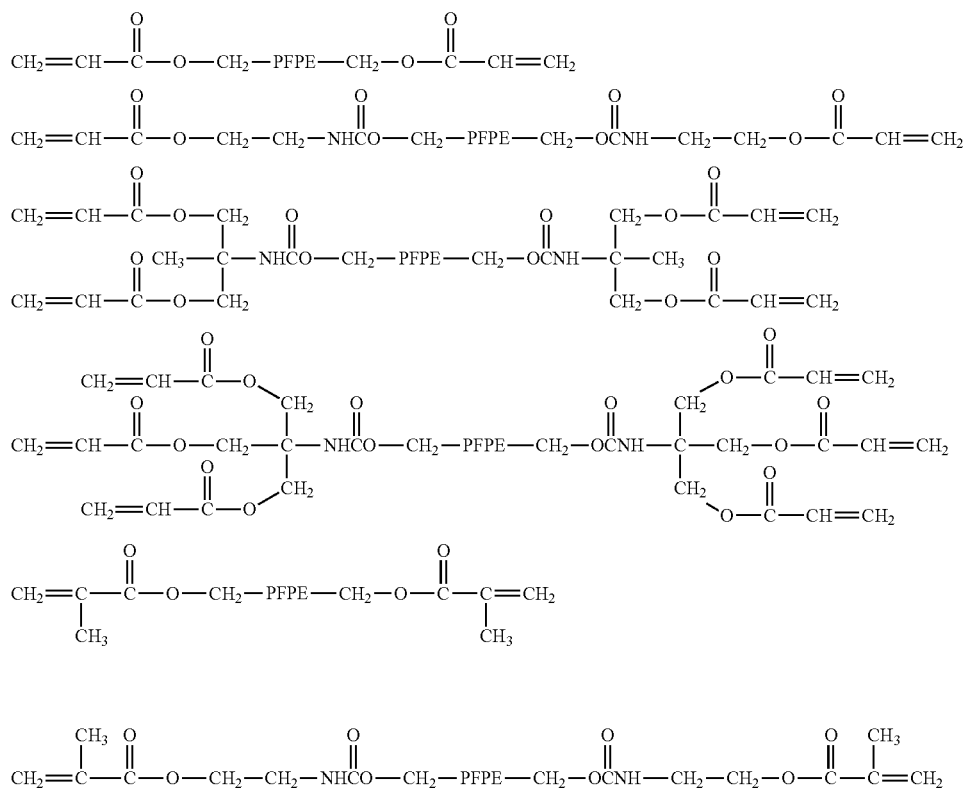

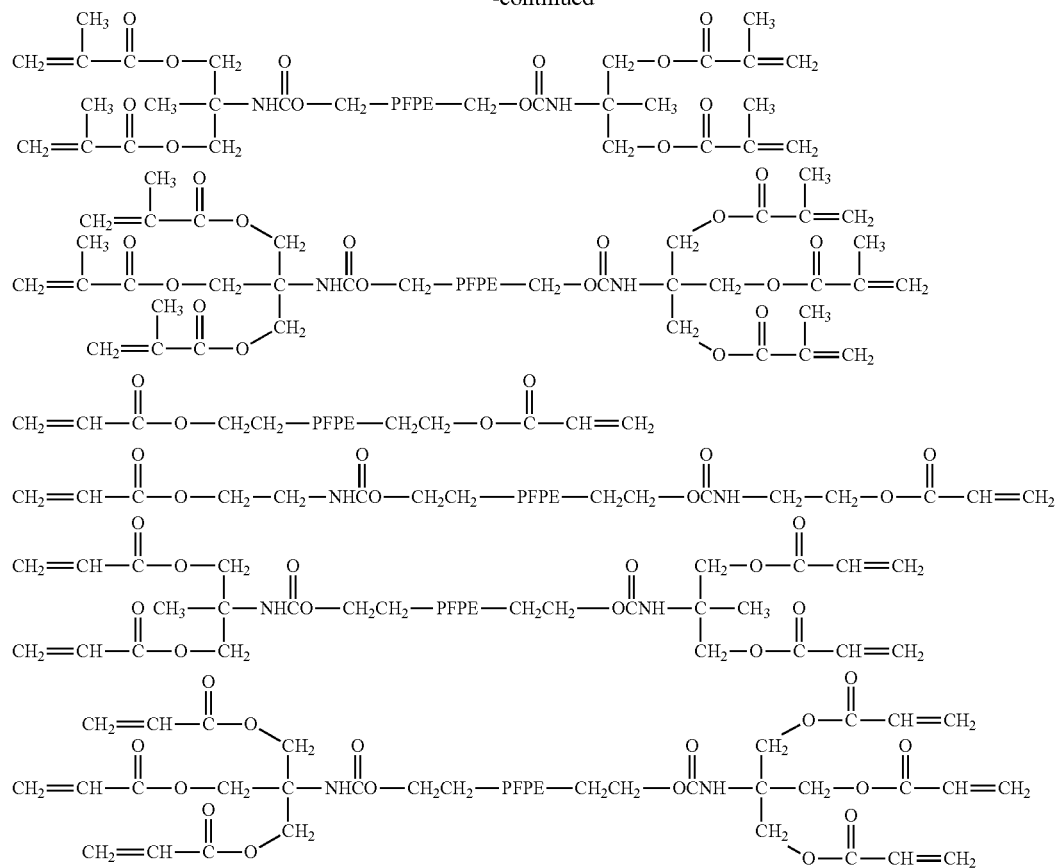
[Chem. 52]
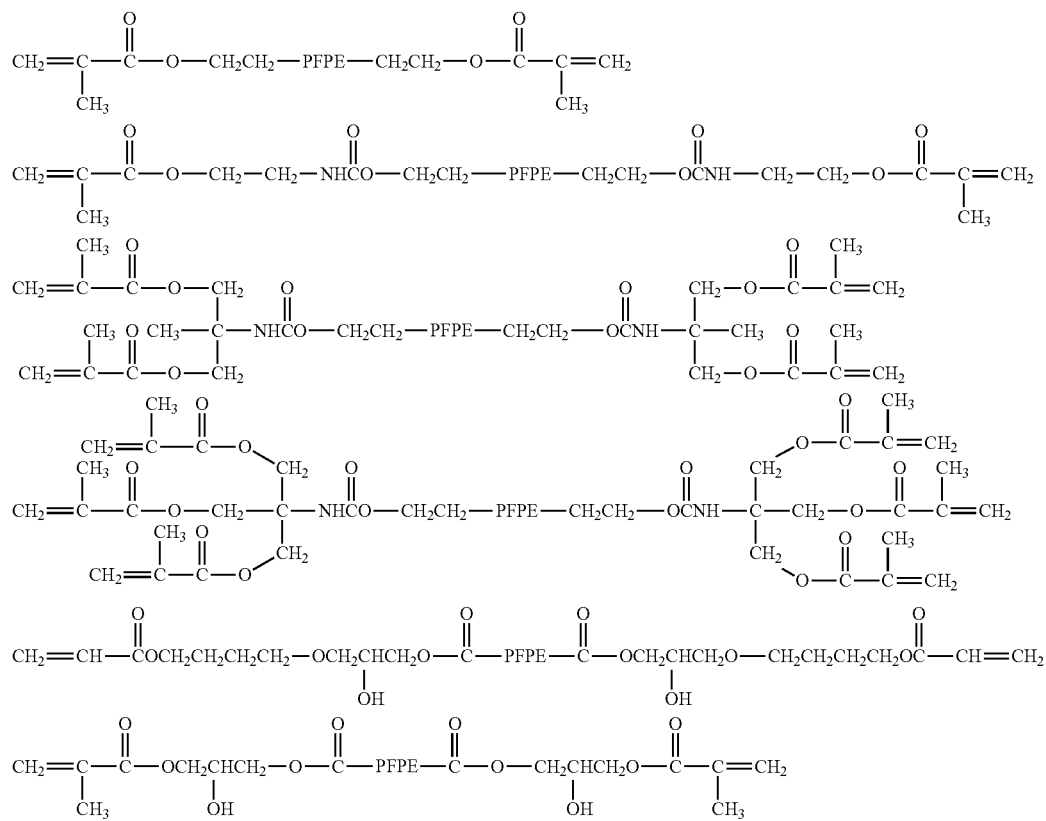

-continued

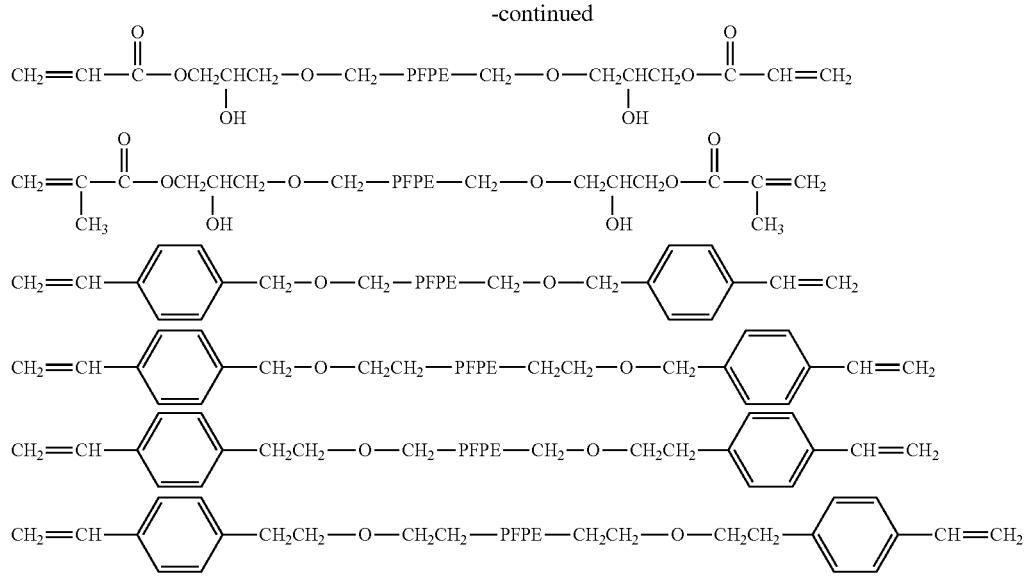

Of the above compounds, those having a (meth)acryloyl group at both terminals of the PFPE chain are more preferable because of easy industrial production of the compounds (II).

Examples of the polymerizable unsaturated monomers (II-2) having a reactive functional group (α) include acrylic monomers, aromatic vinyl monomers, vinyl ester monomers and maleimide monomers each having a reactive functional group (α).

Examples of the reactive functional groups (α) include hydroxyl group, isocyanate group, epoxy group and carboxyl group. Examples of the polymerizable unsaturated monomers (II-2) having such a reactive functional group (α) include hydroxyl group-containing unsaturated monomers such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 1,4-cyclohexanedimethanol mono(meth)acrylate, N-(2-hydroxyethyl) (meth)acrylamide, glycerol mono(meth)acrylate, polyethylene glycol mono(meth)acrylate, polypropylene glycol mono(meth)acrylate, 2-hydroxy-3-phenoxypropyl (meth)acrylate, 2-(meth)acryloyloxyethyl-2-hydroxyethyl phthalate, and hydroxyl-terminated lactone-modified (meth)acrylate; isocyanate group-containing unsaturated monomers such as 2-(meth)acryloyloxyethyl isocyanate, 2-(2-(meth)acryloyloxyethoxy)ethyl isocyanate and 1,1-bis((meth)acryloyloxymethyl)ethyl isocyanate; epoxy group-containing unsaturated monomers such as glycidyl methacrylate and 4-hydroxybutyl acrylate glycidyl ether; carboxyl group-containing unsaturated monomers such as (meth)acrylic acid, 2-(meth)acryloyloxyethylsuccinic acid, 2-(meth)acryloyloxyethylphthalic acid, maleic acid and itaconic acid; and acid anhydrides having an unsaturated double bond such as maleic anhydride and itaconic anhydride.

Other polymerizable unsaturated monomers which may be copolymerized with the compounds (II-1), (II-2) may be used. Examples of such monomers include (meth)acrylate esters such as methyl (meth)acrylate, ethyl (meth)acrylate, n-propyl (meth)acrylate, n-butyl (meth)acrylate, isobutyl (meth)acrylate, n-pentyl (meth)acrylate, n-hexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, cyclohexyl (meth)acrylate and isobornyl (meth)acrylate; aromatic vinyls such as styrene, α-methylstyrene, p-methylstyrene and p-methoxystyrene; and maleimides such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide.

The copolymer which is essentially formed from the compound (II-1) with a structural moiety including a PFPE chain and, at a terminal thereof, a polymerizable unsaturated group, and the polymerizable unsaturated monomer (II-2) having a reactive functional group (α), may be obtained by, for example, polymerizing the compound (II-1), the polymerizable unsaturated monomer (II-2) having a reactive functional group (α), and optionally other polymerizable unsaturated monomers in an organic solvent using a radical polymerization initiator. The organic solvent used here is preferably a ketone, an ester, an amide, a sulfoxide, an ether or a hydrocarbon. Specific examples include acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethylsulfoxide, diethyl ether, diisopropyl ether, tetrahydrofuran, dioxane, toluene and xylene. The solvent may be selected appropriately in consideration of boiling point, compatibility and polymerizability. Examples of the radical polymerization initiators include peroxides such as benzoyl peroxide, and azo compounds such as azobisisobutyronitrile. Where necessary, chain transfer agents such as lauryl mercaptan, 2-mercaptoethanol, thioglycerol, ethylthioglycolic acid and octylthioglycolic acid may be used.

The molecular weight of the copolymer that is obtained should be such that crosslinking insolubilization does not occur during the polymerization. If the molecular weight is excessively high, the polymer may be crosslinked and insolubilized. To ensure that the molecular weight is not excessively high while the final compound (II) will have many polymerizable unsaturated groups per molecule, the number average molecular weight (Mn) of the copolymer is preferably in the range of 800 to 3,000, particularly 1,000 to 2,500, and the weight average molecular weight (Mw) thereof is preferably in the range of 1,500 to 40,000, particularly 2,000 to 30,000.

The copolymer obtained as described above may be reacted with a compound (II-3) having a polymerizable unsaturated group and a reactive functional group (β) which is reactive to the reactive functional group (α). The target compound (II) may be thus obtained.

Examples of the reactive functional groups ((3) reactive to the reactive functional group (α) include hydroxyl group, isocyanate group, epoxy group and carboxyl group. When the reactive functional group (α) is a hydroxyl group, the functional group (β) may be an isocyanate group, a carboxyl group, a carboxylic acid halide group or an epoxy group. When the reactive functional group (α) is an isocyanate group, the functional group (β) may be a hydroxyl group. When the reactive functional group (α) is an epoxy group, the functional group (β) may be a carboxyl group or a hydroxyl group. When the reactive functional group (α) is a carboxyl group, the functional group (β) may be an epoxy group or a hydroxyl group.

Specific examples of such compounds (II-3) include those mentioned above as the polymerizable unsaturated monomers (II-2) having a reactive functional group (α), and also include 2-hydroxy-3-acryloyloxypropyl methacrylate, pentaerythritol triacrylate and dipentaerythritol pentaacrylate.

In particular, 2-hydroxyethyl acrylate, 2-hydroxypropyl acrylate, 3-hydroxypropyl acrylate, 2-hydroxybutyl acrylate, 4-hydroxybutyl acrylate, 1,4-cyclohexanedimethanol monoacrylate, N-(2-hydroxyethyl)acrylamide, 2-acryloyloxyethyl isocyanate, 4-hydroxybutyl acrylate glycidyl ether and acrylic acid are preferable because of excellent polymerization curability by UV irradiation.

The copolymer may be reacted with the compound (II-3) under any conditions which do not induce the polymerization of the polymerizable unsaturated groups in the compound (II-3). For example, the reaction is preferably performed while controlling the temperature conditions in the range of 30 to 120° C. The reaction is preferably performed in the presence of a catalyst and a polymerization inhibitor, optionally in the presence of an organic solvent.

When, for example, the functional group (α) is a hydroxyl group and the functional group (β) is an isocyanate group, or when the functional group (α) is an isocyanate group and the functional group (β) is a hydroxyl group, the reaction is preferably performed using as a polymerization inhibitor p-methoxyphenol, hydroquinone, 2,6-di-t-butyl-4-methylphenol or the like in the presence of dibutyltin dilaurate, dibutyltin diacetate, tin octylate, zinc octylate or the like as a urethane-forming reaction catalyst, at a reaction temperature of 40 to 120° C., particularly at 60 to 90° C. When the functional group (α) is an epoxy group and the functional group (β) is a carboxyl group, or when the functional group (α) is a carboxyl group and the functional group (β) is an epoxy group, the reaction is preferably performed using as a polymerization inhibitor p-methoxyphenol, hydroquinone, 2,6-di-t-butyl-4-methylphenol or the like in the presence of an esterification catalyst, for example, a tertiary amine such as triethylamine, a quaternary ammonium such as tetramethylammonium chloride, a tertiary phosphine such as triphenylphosphine, or a quaternary phosphonium such as tetrabutylphosphonium chloride, at a reaction temperature of 80 to 130° C., particularly at 100 to 120° C.

The organic solvent used in the reaction is preferably a ketone, an ester, an amide, a sulfoxide, an ether or a hydrocarbon. Specific examples include acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethylsulfoxide, diethyl ether, diisopropyl ether, tetrahydrofuran, dioxane, toluene and xylene. The solvent may be selected appropriately in consideration of boiling point and compatibility.

The compound (II) described above preferably has a number average molecular weight (Mn) in the range of 500 to 10,000, and more preferably in the range of 1,000 to 6,000, and preferably has a weight average molecular weight (Mw) in the range of 3,000 to 80,000, and more preferably in the range of 4,000 to 60,000. By controlling the Mn and Mw of the compound (II) in these ranges, gelation during the production of the radically polymerizable resin (I) may be prevented, and a cured coating that is highly crosslinked and excellent in antifouling properties may be obtained easily. The Mn and the Mw are values measured based on the GPC measurement described hereinabove.

From the point of view of the antifouling properties of cured coatings, the content of fluorine atoms in the compound (II) is preferably in the range of 2 to 35 mass %. For the reason that cured coatings attain excellent antifouling properties, the content of the polymerizable unsaturated groups in the compound (II) in terms of the equivalent of the polymerizable unsaturated groups is preferably in the range of 200 to 5,000 g/eq, and particularly preferably in the range of 500 to 3,000 g/eq.

For example, the compound (II) having a PFPE chain and a polymerizable unsaturated group may be one having an adamantyl group that is disclosed in Japanese Unexamined Patent Application Publication No. 2012-92308. The use of such a compound is advantageous in that the surface hardness of cured coatings can be further enhanced. The compound (II) may be one disclosed in Japanese Unexamined Patent Application Publication No. 2011-74248 which is obtained by the reaction of a copolymer from monomer components essentially including a compound (II-1) which has a PFPE chain and, at both terminals thereof, a polymerizable unsaturated group, and a polymerizable unsaturated monomer (II-2) which has a reactive functional group (α), with a compound (II-3') having a functional group (β) reactive to the functional group (α) and two or more polymerizable unsaturated groups.

A fluoroadditive of the present invention includes the fluorine-containing acetophenone derivative (I) described above, and a fluorinated surfactant other than the fluorine-containing acetophenone derivative (I). As already mentioned, the fluorinated surfactant is particularly preferably a compound (II) having a poly(perfluoroalkylene ether) chain and a polymerizable unsaturated group. From the point of view of the compatibility into a fluorine-free active energy ray curable composition, the amounts in which the fluorine-containing acetophenone derivative (I) and the fluorinated surfactant are added are preferably such that the mass ratio represented by fluorine-containing acetophenone derivative/ fluorinated surfactant is in the range of 1/1 to 1/1000. When, in particular, the fluorinated surfactant that is used is a compound (II) having a poly(perfluoroalkylene ether) chain and a polymerizable unsaturated group, the amounts are preferably such that the mass ratio (I)/(II) is in the range of 1/5 to 1/500.

The fluoroadditive of the present invention is soluble even into a fluorine-free solvent, and thus may be prepared as a solution. Examples of the solvents which may be used here include acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethylsulfoxide, diethyl ether, diisopropyl ether, tetrahydrofuran, dioxane, toluene and xylene. It is also possible to dissolve the additive into a monomer to be added into an active energy ray curable composition that will be described later. Examples of such monomers include alkyl (meth)acrylate esters such as methyl acrylate, ethyl acrylate, butyl acrylate and 2-ethylhexyl acrylate; hydroxyalkyl (meth)acrylates such as 2-hydroxyethyl acrylate and 2-hydroxypropyl acrylate; alkoxyalkyl (meth)acrylates such as butoxyethyl acrylate and methoxybutyl (meth)acrylate; polyalkylene glycol (meth)acrylates such as polyethylene glycol mono(meth)acrylate, methoxydiethylene glycol (meth)acrylate, phenoxypolyethylene glycol (meth)acrylate, polypropylene glycol mono(meth)acrylate, methoxypolypropylene glycol (meth)acrylate and nonylphenoxypolypropylene glycol (meth)acrylate; cycloalkyl (meth)acrylates such as cyclohexyl (meth)acrylate, dicyclopentadienyl (meth)acrylate and isobornyl (meth)acrylate; (meth)acrylates such as benzyl (meth) acrylate, 2-hydroxyethyl (meth)acryloyl phosphate, tetrahydrofurfuryl (meth) acrylate, diethylaminoethyl (meth)acrylate and dimethylaminomethyl (meth)acrylate; (meth)acrylamides such as diacetone (meth)acrylamide and acryloylmorpholine; difunctional acrylates such as diethylene glycol di(meth)acrylate, dipropylene glycol di(meth)acrylate, tripropylene glycol di(meth)acrylate, 3-methyl-1,5-pentanediol di(meth)acrylate, hexanediol di(meth)acrylate and neopentyl glycol di(meth)acrylate, polyfunctional (meth)acrylates such as trimethylolpropane tri(meth)acrylate and alkylene oxide-modified products thereof such as ethylene oxide and propylene oxide thereof, pentaerythritol tri- or tetra(meth)acrylate and alkylene oxide-modified products thereof such as ethylene oxide and propylene oxide thereof, ditrimethylolpropane tetra(meth)acrylate and alkylene oxide-modified products thereof such as ethylene oxide and propylene oxide thereof, and dipentaerythritol tetra-, penta- or hexa(meth)acrylate and caprolactone-modified products thereof, epoxy (meth)acrylates obtained by the reaction of a polyglycidyl ether such as bisphenol A diglycidyl ether or trimethylolpropane triglycidyl ether with (meth)acrylic acid, urethane (meth)acrylates obtained by the reaction of a polyisocyanate compound such as isophorone diisocyanate or hexamethylene diisocyanate trimer with a hydroxyl-containing acrylate such as hydroxyethyl (meth) acrylate or pentaerythritol tri(meth)acrylate, polyester (meth)acrylates obtained by the reaction of a polybasic acid such as trimellitic acid or succinic acid, a polyol such as ethylene glycol or neopentyl glycol, and a hydroxyl-containing (meth)acrylate such as hydroxyethyl (meth)acrylate or pentaerythritol tri(meth)acrylate, and high-molecular poly(meth)acrylates obtained by the reaction of a polymer of glycidyl (meth)acrylate and a monofunctional (meth)acrylate, with (meth)acrylic acid. The fluoroadditive may be dissolved into any of these monomers with a concentration of about 1% and may be added as such to an active energy ray curable composition.

A curable composition of the present invention includes the fluorine-containing acetophenone derivative (I) of the invention or the fluoroadditive of the invention. The content of the fluorine-containing acetophenone derivative (I) in the curable composition may vary depending on factors such as the type of a curable resin, the application method and the desired performance. To take high advantage of the effects of the present invention, the content is preferably 0.000001 to 10 parts by mass per 100 parts by mass of the solids in the curable composition, and is more preferably 0.00001 to 5 parts by mass, and still more preferably 0.01 to 2 parts by mass.

The content of the fluoroadditive in the curable composition may vary depending on factors such as the type of a curable resin, the application method and the desired coating thickness, but is preferably 0.0001 to 10 parts by mass per 100 parts by mass of the solids in the curable composition, and is more preferably 0.001 to 5 parts by mass, and still more preferably 0.01 to 2 parts by mass.

The curable composition may be a paint. Examples thereof include paints using natural resins such as petroleum resin paints, shellac paints, rosin paints, cellulosic paints, rubber paints, lacquer paints, cashew resin paints and oil vehicle paints; and paints using synthetic resins such as phenolic resin paints, alkyd resin paints, unsaturated polyester resin paints, amino resin paints, epoxy resin paints, vinyl resin paints, acrylic resin paints, polyurethane resin paints, silicone resin paints and fluororesin paints.

As required, additives may be added appropriately to the curable composition, with examples including organic solvents; colorants such as pigments, dyes and carbon; inorganic powders such as silica, titanium oxide, zinc oxide, aluminum oxide, zirconium oxide, calcium oxide and calcium carbonate; various resin fine powders such as higher fatty acids, polystyrene resins, urea resins, melamine resins, polyamide resins, polycarbonate resins, polyethylenes and polypropylenes; antistatic agents, viscosity modifiers, light stabilizers, weather stabilizers, heat stabilizers, antioxidants, antirust agents, slip agents, waxes, luster modifiers, release agents, compatibilizers, conductive modifiers, dispersants, dispersion stabilizers, thickeners, antisettling agents, and silicone or hydrocarbon surfactants.

The organic solvent is useful for controlling appropriately the solution viscosity of the curable composition, and facilitates controlling the coating thickness particularly in a thin coating process. Examples of the organic solvents which may be used here include aromatic hydrocarbons such as toluene and xylene; alcohols such as methanol, ethanol, isopropanol and t-butanol; esters such as ethyl acetate and propylene glycol monomethyl ether acetate; and ketones such as methyl ethyl ketone, methyl isobutyl ketone and cyclohexanone. The solvents may be used singly, or two or more may be used in combination.

The curable composition may be applied by various methods in accordance with the purpose of use. For example, the composition may be applied using a gravure coater, a roll coater, a comma coater, a knife coater, an air knife coater, a curtain coater, a kiss coater, a shower coater, a whirler coater, a spin coater, dipping, screen printing, spraying, an applicator, a bar coater or an electrostatic coating process, or may be shaped using various molds.

The fluorine-containing acetophenone derivative (I) of the invention or the fluoroadditive of the invention can produce marked effects when added to an active energy ray curable composition. Such an active energy ray curable composition contains an active energy ray curable compound as a main component, and the curable compound may be a single or a plurality of resins or monomers. To take advantage of higher effects of the present invention, in particular, the composition preferably contains a fluorine-free active energy ray curable compound as a main component.

Examples of the active energy ray curable resins include urethane (meth)acrylate resins, unsaturated polyester resins, epoxy (meth)acrylate resins, polyester (meth)acrylate resins, acrylic (meth)acrylate resins and maleimide group-containing resins.

Examples of the urethane (meth)acrylate resins used here include resins having a urethane bond and a (meth)acryloyl group which are obtained by reacting an aliphatic polyisocyanate or an aromatic polyisocyanate with a hydroxyl group-containing (meth)acrylate.

Examples of the aliphatic polyisocyanates include tetramethylene diisocyanate, pentamethylene diisocyanate, hexamethylene diisocyanate, heptamethylene diisocyanate, octamethylene diisocyanate, decamethylene diisocyanate, 2-methyl-1,5-pentane diisocyanate, 3-methyl-1,5-pentane diisocyanate, dodecamethylene diisocyanate, 2-methylpentamethylene diisocyanate, 2,2,4-trimethylhexamethylene diisocyanate, 2,4,4-trimethylhexamethylene diisocyanate, isophorone diisocyanate, norbornane diisocyanate, hydrogenated diphenylmethane diisocyanate, hydrogenated tolylene diisocyanate, hydrogenated xylylene diisocyanate, hydrogenated tetramethylxylylene diisocyanate and cyclohexyl diisocyanate. Examples of the aromatic polyisocyanate compounds include tolylene diisocyanate, 4,4'-diphenylmethane diisocyanate, xylylene diisocyanate, 1,5-naphthalene diisocyanate, tolidine diisocyanate and p-phenylene diisocyanate.

Examples of the hydroxyl group-containing acrylates include 2-hydroxyethyl (meth) acrylate, 2-hydroxypropyl (meth)acrylate, 2-hydroxybutyl (meth)acrylate, 4-hydroxybutyl (meth)acrylate, mono(meth)acrylates of dihydric alcohols such as 1,5-pentanediol mono(meth)acrylate, 1,6-hexanediol mono(meth)acrylate, neopentyl glycol mono(meth)acrylate and hydroxypivalic acid neopentyl glycol mono(meth)acrylate; mono- or di(meth)acrylates of trihydric alcohols such as trimethylolpropane di(meth)acrylate, ethoxylated trimethylolpropane (meth) acrylate, propoxylated trimethylolpropane di(meth)acrylate, glycerol di(meth)acrylate and bis(2-(meth)acryloyloxyethyl)hydroxyethyl isocyanurate, and hydroxyl group-containing mono- and di(meth)acrylates obtained by modifying part of the alcoholic hydroxyl groups in the above acrylates with ε-caprolactone; compounds having a monofunctional hydroxyl group and trifunctional or polyfunctional (meth)acryloyl groups such as pentaerythritol tri(meth)acrylate, ditrimethylolpropane tri(meth)acrylate and dipentaerythritol penta (meth)acrylate, and hydroxyl group-containing polyfunctional (meth)acrylates obtained by modifying the above compounds with ε-caprolactone; (meth)acrylates having an oxyalkylene chain such as dipropylene glycol mono(meth)acrylate, diethylene glycol mono(meth)acrylate, polypropylene glycol mono(meth)acrylate and polyethylene glycol mono(meth)acrylate; (meth)acrylates having a block oxyalkylene chain such as polyethylene glycol-polypropylene glycol mono(meth)acrylate and polyoxybutylene-polyoxypropylene mono(meth)acrylate; and (meth)acrylates having a random oxyalkylene chain such as poly(ethylene glycol-tetramethylene glycol) mono(meth)acrylate and poly(propylene glycol-tetramethylene glycol) mono(meth)acrylate.

For example, the reaction described above between the aliphatic polyisocyanate or the aromatic polyisocyanate, and the hydroxyl group-containing acrylate may be performed by a common method in the presence of a urethane-forming catalyst. Specific examples of the urethane-forming catalysts which may be used here include amines such as pyridine, pyrrole, triethylamine, diethylamine and dibutylamine; phosphines such as triphenylphosphine and triethylphosphine; organotin compounds such as dibutyltin dilaurate, octyltin trilaurate, octyltin diacetate, dibutyltin diacetate and tin octoate; and organometallic compounds such as zinc octoate.

Of the urethane acrylate resins, those obtained by reacting an aliphatic polyisocyanate with a hydroxyl group-containing (meth)acrylate are particularly preferable for the reasons that excellent transparency of cured coatings is obtained and that the resins exhibit good sensitivity and curability with active energy rays.

Next, the unsaturated polyester resins are curable resins obtained by the polycondensation of α,β-unsaturated dibasic acids or acid anhydrides thereof, or aromatic saturated dibasic acids or acid anhydrides thereof, and glycols. Examples of the α,β-unsaturated dibasic acids or acid anhydrides thereof include maleic acid, maleic anhydride, fumaric acid, itaconic acid, citraconic acid, chloromaleic acid, and esters thereof. Examples of the aromatic saturated dibasic acids or acid anhydrides thereof include phthalic acid, phthalic anhydride, isophthalic acid, terephthalic acid, nitrophthalic acid, tetrahydrophthalic anhydride, endomethylenetetrahydrophthalic anhydride, halogenated phthalic anhydride, and esters thereof. Examples of the aliphatic or alicyclic saturated dibasic acids include oxalic acid, malonic acid, succinic acid, adipic acid, sebacic acid, azelaic acid, glutaric acid, hexahydrophthalic anhydride, and esters thereof. Examples of the glycols include ethylene glycol, propylene glycol, diethylene glycol, dipropylene glycol, 1,3-butanediol, 1,4-butanediol, 2-methylpropane-1,3-diol, neopentyl glycol, triethylene glycol, tetraethylene glycol, 1,5-pentanediol, 1,6-hexanediol, bisphenol A, hydrogenated bisphenol A, ethylene glycol carbonate and 2,2-di-(4-hydroxypropoxydiphenyl)propane. Oxides such as ethylene oxide and propylene oxide may be similarly used.

Next, examples of the epoxy vinyl ester resins include those obtained by reacting (meth)acrylic acid on the epoxy group of an epoxy resin such as bisphenol A epoxy resin, bisphenol F epoxy resin, phenol novolac epoxy resin or cresol novolac epoxy resin.

Examples of the maleimide group-containing resins include difunctional maleimide urethanes obtained by urethanizing N-hydroxyethyl maleimide and isophorone diisocyanate, difunctional maleimide esters obtained by esterifying maleimidoacetic acid and polytetramethylene glycol, tetrafunctional maleimide esters obtained by esterifying maleimidocaproic acid and pentaerythritol tetraethylene oxide adduct, and polyfunctional maleimide esters obtained by esterifying maleimidoacetic acid and polyhydric alcohol. The active energy ray curable resins may be used singly, or two or more may be used in combination.

Examples of the active energy ray curable monomers include ethylene glycol di(meth)acrylate, diethylene glycol di(meth)acrylate, triethylene glycol di(meth)acrylate, polyethylene glycol di(meth)acrylate having a number average molecular weight in the range of 150 to 1000, propylene glycol di(meth)acrylate, dipropylene glycol di(meth)acrylate, tripropylene glycol di(meth)acrylate, polypropylene glycol di(meth)acrylate having a number average molecular weight in the range of 150 to 1000, neopentyl glycol di(meth)acrylate, 1,3-butanediol di(meth)acrylate, 1,4-butanediol di(meth)acrylate, 1,6-hexanediol di(meth)acrylate, hydroxypivalate ester neopentyl glycol di(meth)acrylate, bisphenol A di(meth)acrylate, trimethylolpropane tri(meth)acrylate, pentaerythritol tri(meth)acrylate, dipentaerythritol hexa(meth)acrylate, pentaerythritol tetra(meth)acrylate, trimethylolpropane di(meth)acrylate, dipentaerythritol penta (meth)acrylate, dicyclopentenyl (meth)acrylate, aliphatic alkyl (meth)acrylates such as methyl (meth)acrylate, propyl (meth)acrylate, butyl (meth)acrylate, t-butyl (meth)acrylate, 2-ethylhexyl (meth)acrylate, octyl (meth)acrylate, decyl (meth)acrylate, isodecyl (meth)acrylate, lauryl (meth)acrylate, stearyl (meth)acrylate and isostearyl (meth)acrylate, glycerol (meth) acrylate, 2-hydroxyethyl (meth) acrylate, 3-chloro-2-hydroxypropyl (meth)acrylate, glycidyl (meth) acrylate, allyl (meth)acrylate, 2-butoxyethyl (meth)acrylate, 2-(diethylamino)ethyl (meth)acrylate, 2-(dimethylamino) ethyl (meth) acrylate, γ-(meth)acryloxypropyltrimethoxysilane, 2-methoxyethyl (meth) acrylate, methoxydiethylene glycol (meth) acrylate, methoxydipropylene glycol (meth) acrylate, nonylphenoxypolyethylene glycol (meth) acrylate, nonylphenoxypolypropylene glycol (meth) acrylate, phenoxyethyl (meth) acrylate, phenoxydipropylene glycol (meth) acrylate, phenoxypolypropylene glycol (meth) acrylate, polybutadiene (meth)acrylate, polyethylene glycol-polypropylene glycol (meth)acrylate, polyethylene glycol-polybutylene glycol (meth) acrylate, polystyrylethyl (meth) acrylate, benzyl (meth)acrylate, cyclohexyl (meth) acrylate, dicyclopentanyl (meth) acrylate, dicyclopentenyl (meth) acrylate, isobornyl (meth) acrylate, methoxylated cyclodecatriene (meth) acrylate, phenyl (meth)acrylate; and maleimides such as maleimide, N-methylmaleimide, N-ethylmaleimide, N-propylmaleimide, N-butylmaleimide, N-hexylmaleimide, N-octylmaleimide, N-dodecylmaleimide, N-stearylmaleimide, N-phenylmaleimide, N-cyclohexylmaleimide, 2-maleimidoethyl-ethyl carbonate, 2-maleimidoethyl-propyl carbonate, N-ethyl-(2-maleimidoethyl) carbamate, N,N-hexamethylenebismaleimide, polypropylene glycol-bis(3-maleimidopropyl) ether, bis(2-maleimidoethyl) carbonate and 1,4-dimaleimidocyclohexane.

Of these, difunctional and polyfunctional (meth)acrylates such as trimethylolpropane tri(meth)acrylate, pentaerythritol tri(meth)acrylate, dipentaerythritol hexa(meth)acrylate and pentaerythritol tetra(meth)acrylate are particularly preferable for the reason that cured coatings attain excellent hardness. The active energy ray curable monomers may be used singly, or two or more may be used in combination.

The active energy ray curable composition of the present invention may be applied onto a substrate and be irradiated with an active energy ray to give a cured coating. The active energy rays are ionizing radiations such as UV light, electron beams, α rays, β rays and γ rays.

When the composition is cured into a coating with UV light as the active energy ray, it is preferable that a photopolymerization initiator be added to the active energy ray curable composition to enhance the curability. Where necessary, a photosensitizer may be further added to enhance the curability. When other ionizing radiations such as electron beams, α rays, β rays and γ rays are used, the composition is cured quickly even in the absence of a photopolymerization initiator or a photosensitizer, and thus the addition of a photopolymerization initiator or a photosensitizer is not necessary.

Examples of the photopolymerization initiators include intramolecular cleavage-type photopolymerization initiators and hydrogen abstraction-type photopolymerization initiators. Examples of the intramolecular cleavage-type photopolymerization initiators include acetophenone compounds such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl) ketone, 1-hydroxycyclohexyl-phenyl ketone, 2-methyl-2-morpholino(4-thiomethylphenyl)propan-1-one and 2-benzyl-2-dimethylamino-1-(4-morpholinophenyl)-butanone; benzoins such as benzoin, benzoin methyl ether and benzoin isopropyl ether; acylphosphine oxide compounds such as 2,4,6-trimethylbenzoin diphenylphosphine oxide and bis(2,4,6-trimethylbenzoyl)-phenylphosphine oxide; benzil and methyl phenylglyoxylate ester.

Examples of the hydrogen abstraction-type photopolymerization initiators include benzophenone compounds such as benzophenone, methyl-4-phenylbenzophenone o-benzoylbenzoate, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl)benzophenone and 3,3'-dimethyl-4-methoxybenzophenone; thioxanthone compounds such as 2-isopropylthioxanthone, 2,4-dimethylthioxanthone, 2,4-diethylthioxanthone and 2,4-dichlorothioxanthone; aminobenzophenone compounds such as Michler's ketone and 4,4'-diethylaminobenzophenone; 10-butyl-2-chloroacridone, 2-ethylanthraquinone, 9,10-phenanthrenequinone and camphorquinone.

Of the photopolymerization initiators, 1-hydroxycyclohexyl phenyl ketone and benzophenone are preferable because of their excellent compatibility with the active energy ray curable resin and the active energy ray curable monomer in the active energy ray curable composition. In particular, 1-hydroxycyclohexyl phenyl ketone is preferable. The photopolymerization initiators may be used singly, or two or more may be used in combination.

Examples of the photosensitizers include amines such as aliphatic amines and aromatic amines, ureas such as o-tolylthiourea, and sulfur compounds such as sodium diethyl dithiophosphate and s-benzylisothiuronium-p-toluenesulfonate.

The amount of the photopolymerization initiator and that of the photosensitizer are preferably each 0.01 to 20 parts by mass per 100 parts by mass of the nonvolatile components in the active energy ray curable composition, and more preferably 0.1 to 15 parts by mass, and still more preferably 0.3 to 7 parts by mass.

When the active energy ray curable composition of the invention is used as a paint or the like, a colorant may be used. The colorant that is used may be a dye or a pigment. When the colorant is added, it is preferable that a known dispersant be used as required.

Examples of the dyes include direct dyes, acid dyes, food dyes, basic dyes, reactive dyes, disperse dyes, vat dyes, soluble vat dyes and reactive disperse dyes.

The pigment may be an inorganic pigment or an organic pigment. Examples of the inorganic pigments include chrome yellow, Prussian blue, barium sulfate, cadmium red, titanium oxide, zinc white, alumina white, calcium carbonate, ultramarine, carbon black, graphite, red oxide, iron oxide, and carbon black produced by known processes such as contact process, furnace process and thermal process. Various known pigments may be used as the organic pigments, with examples including azo pigments (including azo lakes, insoluble azo pigments, condensed azo pigments and chelate azo pigments), polycyclic pigments (for example, phthalocyanine pigments, perylene pigments, perinone pigments, anthraquinone pigments, quinacridone pigments, dioxazine pigments, thioindigo pigments, isoindolinone pigments and quinophthalone pigments), dye chelates (for example, basic dye chelates and acid dye chelates), nitro pigments, nitroso pigments, aniline black, various fluorescent pigments and metallic powder pigments.

When the pigment is used, it is preferable to use a pigment dispersant for the purpose of enhancing the dispersion stability with respect to the components such as the active energy ray curable compound. Specific examples include, but are not limited to, AJISPER PB821, PB822 and PB817 manufactured by Ajinomoto Fine-Techno Co., Inc., Solsperse 5000, 24000GR, 32000, 33000, 36000, 39000 and 44000 manufactured by Lubrizol Corporation, DISPARLON DA-703-50, DA-705 and DA-725 manufactured by Kusumoto Chemicals, Ltd., and DISPER BYK 111, 168 and 180 manufactured by BYK. The amount of the pigment dispersant is preferably in the range of 3 to 80 mass % relative to the pigment, and is particularly preferably in the range of 5 to 60 mass %.

Where necessary, other components may be added without departing from the objects of the present invention, in particular, without impairing the performance such as storage stability, heat resistance and solvent resistance. Examples of such additional components include various coupling agents; antioxidants; polymerization inhibitors; stabilizers; and fillers.

The coupling agents are compounds which chemically join inorganic materials and organic materials or which improve the affinity between these materials by chemical reaction so as to enhance the functionality of the composite materials. Examples thereof include silane compounds such as γ-(2-aminoethyl)aminopropyltrimethoxysilane, γ-(2-aminoethyl)aminopropylmethyldimethoxysilane, γ-methacryloxypropyltrimethoxysilane and γ-glycidoxypropyltrimethoxysilane, titanium compounds such as tetraisopropoxytitanium and tetra-n-butoxytitanium, and aluminum compounds such as aluminum isopropylate. The amount thereof is 0.1 to 10 parts by mass, and preferably 0.2 to 5 parts by mass per 100 parts by mass of the active energy ray curable composition of the invention.

Examples of the antioxidants include phenolic antioxidants such as 2,6-di-t-butyl-p-cresol, butylated hydroxyanisole, 2,4,6-tri-t-butylphenol and 2,2'-methylene-bis(4-methyl-6-t-butylphenol), 2,2,6,6-tetramethylpiperidine derivative (HALS) antioxidants, and phosphorous or sulfurous secondary antioxidants. Examples of the polymerization inhibitors include nitrosamine salts, but are not limited thereto. The antioxidants and the polymerization inhibitors may be used singly, or two or more may be used in combination. The amounts thereof are 0.01 to 2.0 parts by mass, and preferably 0.03 to 1.0 part by mass per 100 parts by mass of the active energy ray curable composition of the invention.

The active energy ray curable composition of the invention may be used without a solvent, or may contain an appropriate solvent as required. The solvent is not particularly limited as long as it does not react with the components described hereinabove. A single, or two or more kinds of solvents may be used.

The active energy ray curable resin composition of the invention may be obtained by mixing the components in any order and in any manner without limitation. For example, the components may be mixed together at a temperature between room temperature and 100° C. using a kneading, mixing or appropriate machine such as a kneader, a three-roll mill, a sand mill, a gate mixer, an ultrasonic homogenizer, a high pressure homogenizer, a paint shaker, a sand grinder, DYNO MILL, DISPERMAT, a bead mill, SC-MILL or a nanomizer.

As described earlier, the compositions including the fluoroadditive of the present invention are applicable to various uses, for example, inks or inkjet inks for gravure printing hardcoat materials on various display screens such as liquid crystal displays, plasma displays and organic EL displays (PDP); paints or hardcoat materials for mobile phone chassis; hardcoat materials for mobile phone screens; hardcoat materials for optical recording media such as CD, DVD and Blu-ray Discs; hardcoat materials for transfer films for insert molds (IMD, IMF); inks or paints for printing on various building materials such as decorative boards; coating materials for house window glasses; paints for wood such as furniture; coating materials for artificial or synthetic leather; paints or coating materials for various plastic shaped articles such as household electrical appliance chassis; paints or coating materials for FRP bathtubs; color resists for forming pixels in RGB or black resists for forming black matrixes, used in liquid crystal display color filters; photoresists used in semiconductor manufacturing; photosensitive materials for presensitized plates (PS plates); and monolayer or multilayer coating compositions used in other processes such as photofabrication processes.

EXAMPLES

Hereinbelow, the present invention will be described in greater detail based on EXAMPLES. However, it should be construed that the scope of the present invention is not limited to such EXAMPLES.

[$^1$H-NMR Measurement Conditions]
Apparatus: FT-NMR, JEOL Ltd. JNM-ECM400S (400 MHz)
Measurement solvent: deuterated chloroform ($CDCl_3$-d1)
Internal standard: tetramethylsilane (TMS)

[Synthesis of Michael Addition Donors]

Hereinbelow, examples of the synthesis of Michael addition donors which are α-aminoacetophenone derivatives will be described.

Synthetic Example 1: Synthesis of Compound (D1)

[Chem. 53]

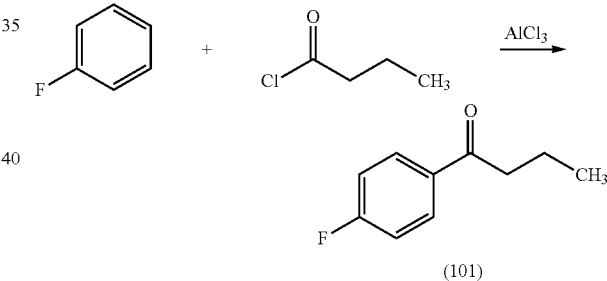

(101)

A 1-L four-necked flask equipped with a stirrer, a thermometer, a nitrogen inlet tube, an alkali trap and a dropping funnel was loaded with 121.8 g of (anhydrous) aluminum chloride and 300 mL of dehydrated dichloromethane. Under a stream of nitrogen, the mixture was ice-cooled using an ice bath. There was added 92.7 g of butyryl chloride. A mixture solution including 83.6 g of fluorobenzene and 100 mL of dehydrated dichloromethane was added dropwise to the flask through the dropping funnel over a period of 20 minutes. After the completion of the dropwise addition, the ice bath was removed. The system was stirred as such for 2 hours, and the reaction was completed. The reaction liquid was poured into 1 L of ice water, and the mixture was stirred for 2 hours, and was allowed to stand and to separate. The lower layer was recovered, washed twice with 2 N hydrochloric acid, washed once with saturated aqueous sodium hydrogen carbonate solution, and washed twice with saturated brine. The liquid was dried with magnesium sulfate for a whole day and night, and the dichloromethane was distilled off under reduced pressure. Intermediate (101) was thus obtained. Weight: 144.5 g, yield: 100%.

[Chem. 54]

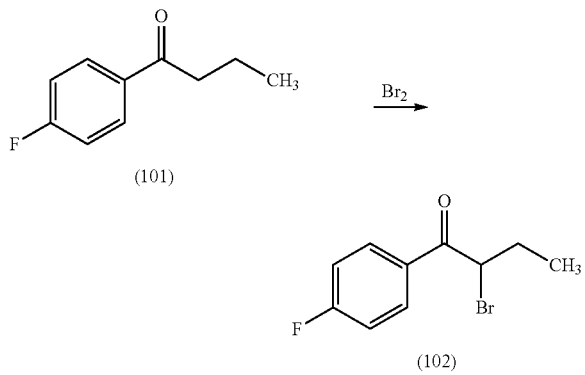

A 5-L four-necked flask equipped with a stirrer, a thermometer, a nitrogen inlet tube, an alkali trap and a dropping funnel was loaded with 989 g of Intermediate (101), 1500 mL of dehydrated dichloromethane and 125 mL of acetic acid. Under a stream of nitrogen, 1000 g of bromine was added dropwise at 20 to 30° C., and the reaction was performed for 1 hour. After the completion of the reaction, the system was neutralized with 8 M sodium hydroxide, washed twice with water, and washed once with saturated brine. The liquid was dried with magnesium sulfate for a whole day and night, and the dichloromethane was distilled off under reduced pressure. Intermediate (102) was thus obtained. Weight: 1459 g, yield: 100%.

[Chem. 55]

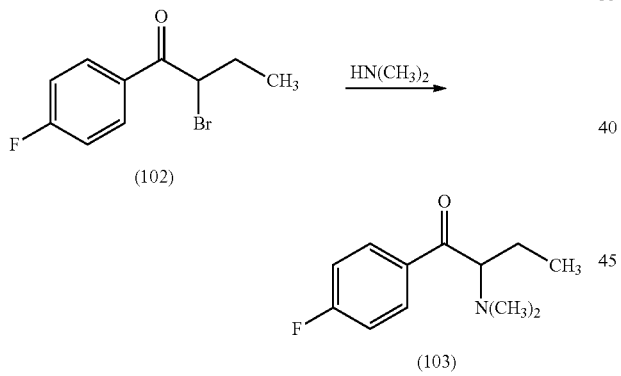

A 3-L four-necked flask equipped with a stirrer and a thermometer was loaded with 402 g of 50% aqueous dimethylamine solution and 1000 mL of methyl ethyl ketone. The mixture was ice-cooled using an ice bath. Through a dropping funnel, 490 g of Intermediate (102) was added dropwise over a period of 30 minutes. After the completion of the dropwise addition, the ice bath was removed. The system was stirred as such for a whole day and night. After the completion of the stirring, the methyl ethyl ketone was distilled off under reduced pressure, and the concentrated residue was extracted with toluene. The extract was washed twice with water and was washed once with saturated brine, and the toluene layer was dried with magnesium sulfate for a whole day and night. The toluene was distilled off under reduced pressure. Intermediate (103) which was a light yellow liquid was thus obtained. Weight: 402 g, yield: 96%.

[Chem. 56]

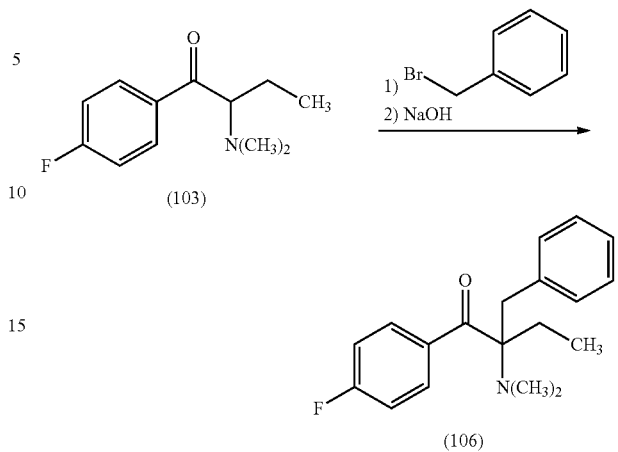

A 3-L four-necked flask equipped with a stirrer, a thermometer and a cooling tube was loaded with 209 g of Intermediate (103) and 400 mL of methyl ethyl ketone. Further, 205 g of benzyl bromide was added dropwise. The mixture was stirred at 40° C. for 2 hours. Next, 188 mL of 8 M aqueous sodium hydroxide solution was added, and the mixture was stirred at 50° C. for 2 hours. The reaction solution was washed with water three times, and washed once with saturated aqueous sodium chloride solution. The organic layer was dried with magnesium sulfate for a whole day and night. The methyl ethyl ketone was distilled off under reduced pressure. The concentrated residue was recrystallized from methanol. Intermediate (106) which was a light yellow crystal was thus obtained. Weight: 254 g, yield: 85%.

[Chem. 57]

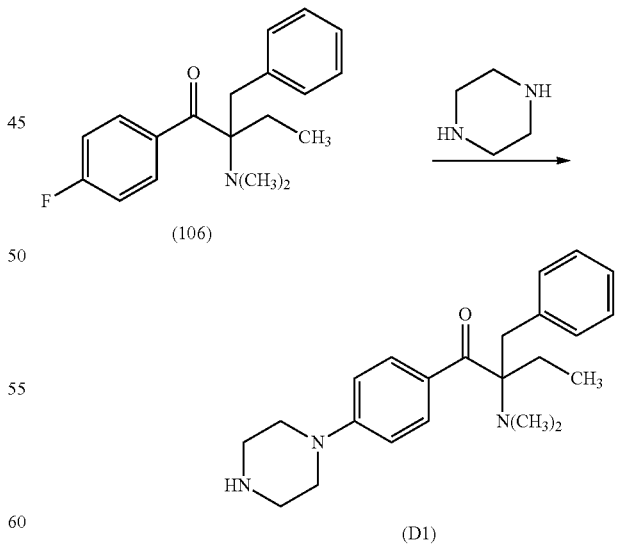

A 500-mL four-necked flask equipped with a stirrer and a thermometer was loaded with 30.0 g of Intermediate (106) and 25.8 g of anhydrous piperazine. In a nitrogen atmosphere, the mixture was heated at 120° C. for 15 hours. After the heating, distilled water was added and the reaction was terminated. Extraction was performed with dichloromethane. The extract was washed with water three times, and washed once with saturated aqueous sodium chloride solution. The organic layer was dried with magnesium sulfate for a whole day and night. The dichloromethane was distilled off under reduced pressure. Michael donor product (D1) which was a yellow oil-like product was thus obtained. ¹H-NMR chart of Michael donor product (D1) is shown in FIG. 1. Weight: 36.5 g, yield: 100%.

Synthetic Example 2: Synthesis of Compound (D2)

Michael donor product (D2) which was a yellow oil-like product was synthesized in accordance with the method described in SYNTHETIC EXAMPLE 1, except that 205 g of benzyl bromide used in SYNTHETIC EXAMPLE 1 was replaced by 222 g of α-bromo-p-xylene. ¹H-NMR chart of Michael donor product (D2) is shown in FIG. 2.

Synthetic Example 3: Synthesis of Compound (D9)

Michael donor product (D9) which was a yellow oil-like product was synthesized in accordance with the method described in SYNTHETIC EXAMPLE 1, except that 205 g of benzyl bromide used in SYNTHETIC EXAMPLE 1 was replaced by 300 g of 4-bromobenzyl bromide. ¹H-NMR chart of Michael donor product (D9) is shown in FIG. 3.

Synthetic Example 4: Synthesis of Compound (D16)

Michael donor product (D16) which was a yellow oil-like product was synthesized in accordance with the method described in SYNTHETIC EXAMPLE 1, except that 25.8 g of anhydrous piperazine used in SYNTHETIC EXAMPLE 1 was replaced by 26.4 g of N,N'-dimethylethylenediamine.

Synthetic Example 5: Synthesis of Compound (D17)

Michael donor product (D17) which was a yellow oil-like product was synthesized in accordance with the method described in SYNTHETIC EXAMPLE 1, except that the 50% aqueous dimethylamine solution used in SYNTHETIC EXAMPLE 1 was replaced by methyldodecylamine.

Synthetic Example 6: Synthesis of Compound (D18)

[Chem. 58]

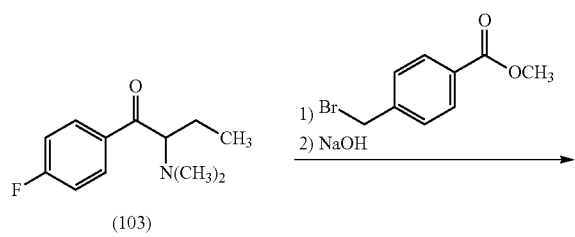

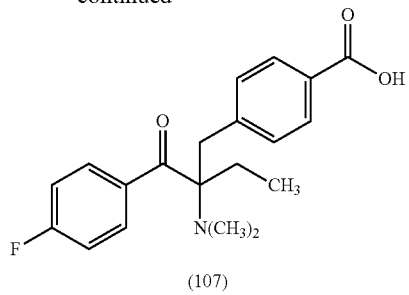

A 500-mL four-necked flask equipped with a stirrer, a thermometer and a cooling tube was loaded with 27.5 g of methyl α-bromomethylbenzoate and 40 mL of isopropyl alcohol, and 20.9 g of Intermediate (103) synthesized in SYNTHETIC EXAMPLE 1 was added. The mixture was stirred at 40° C. for 2 hours. Next, 31 mL of 8 M aqueous sodium hydroxide solution was added, and the mixture was stirred at 50° C. for 2 hours. The isopropyl alcohol was distilled off under reduced pressure, and the residual reaction mixture was adjusted to pH 5 with 6 N hydrochloric acid. The mixture was extracted with toluene. The extract was washed twice with water, and washed once with saturated brine. The organic layer was dried with magnesium sulfate for a whole day and night. The organic solvent was distilled off under reduced pressure, and the concentrated residue was recrystallized from ethyl acetate and hexane. Intermediate (107) which was a light yellow powder was thus obtained. Weight: 27.8 g, yield: 81%.

[Chem. 59]

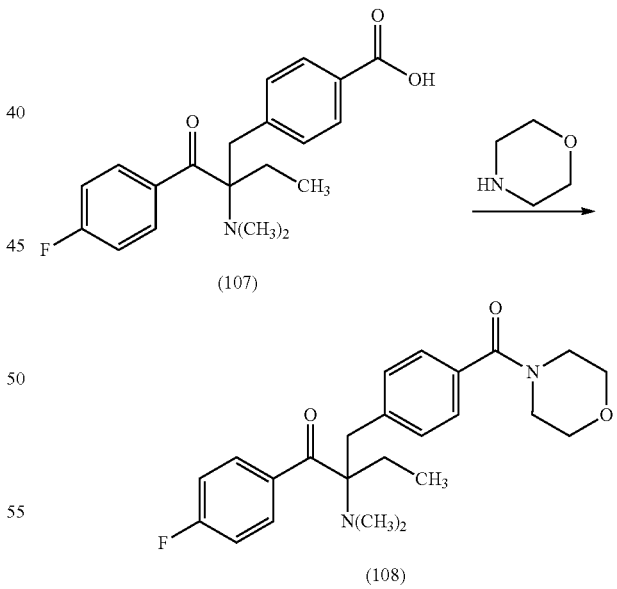

A 200-mL flask equipped with a stirrer, a thermometer and a dropping funnel was loaded with 3.43 g of Intermediate (107), 0.1 mL of N,N-dimethylformamide (DMF) and 15 mL of methylene chloride. A solution was thus prepared. Further, 1.79 g of thionyl chloride was added dropwise, and the reaction was performed for 2 hours. The reaction solution was concentrated under reduced pressure. The concentrated residue was dissolved into 30 mL of dichloromethane to give a dichloromethane solution of the acid chloride. A 300-mL flask equipped with a stirrer, a thermometer and a dropping funnel was loaded with 2 mL of morpholine and 30 mL of methylene chloride, thereby preparing a solution. The dichloromethane solution of the acid chloride was added thereto dropwise over a period of 20 minutes. Stirring was then performed for 30 minutes, and the reaction completed. The reaction was terminated by the addition of 1 M aqueous sodium hydroxide solution. The reaction liquid was transferred to a separatory funnel, and the organic layer was washed twice with water and was dried with magnesium sulfate for a whole day and night. The dichloromethane was distilled off under reduced pressure, and the residue was purified by silica gel chromatography. Intermediate (108) which was a yellow oil-like product was thus obtained. Weight: 3.22 g, yield: 78%.

[Chem. 60]

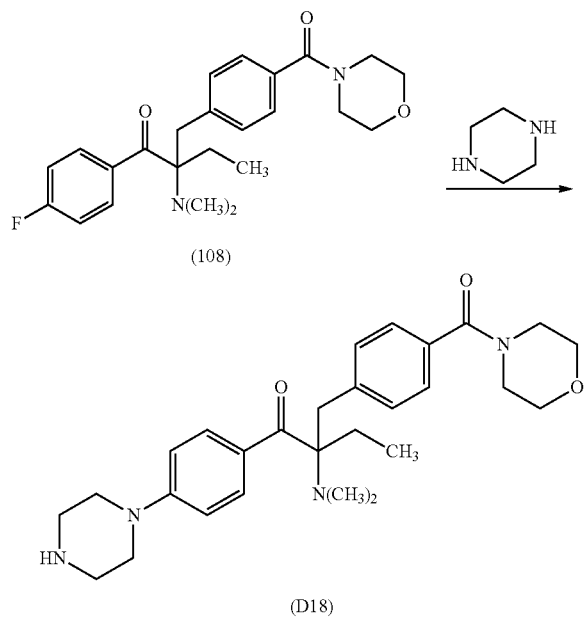

A 50-mL three-necked flask equipped with a stirrer and a thermometer was loaded with 2.06 g of Intermediate (108) and 1.29 g of anhydrous piperazine. In a nitrogen atmosphere, the mixture was heated at 120° C. for 15 hours. After the heating, distilled water was added and the reaction was terminated. Extraction was performed with dichloromethane. The extract was washed with water three times, and washed once with saturated aqueous sodium chloride solution. The organic layer was dried with magnesium sulfate for a whole day and night. The dichloromethane was distilled off under reduced pressure. Michael donor product (D18) which was a yellow oil-like product was thus obtained. $^{1}$H-NMR chart of Michael donor product (D18) is shown in FIG. 4. Weight: 2.39 g, yield: 100%.

Synthetic Example 7: Synthesis of Compound (D20)

Michael donor product (D20) which was a yellow oil-like product was synthesized in accordance with the method described in SYNTHETIC EXAMPLE 6, except that mor-pholine used in SYNTHETIC EXAMPLE 6 was replaced by dioctylamine. $^{1}$H-NMR chart of Michael donor product (D20) is shown in FIG. 5.

Synthetic Example 8: Synthesis of Compound (D23)

[Chem. 61]

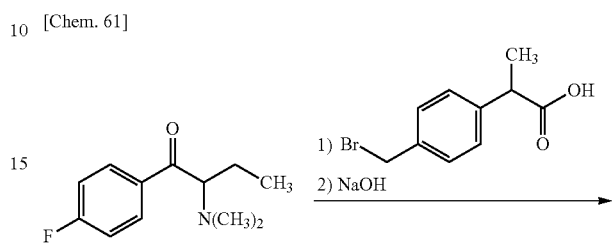

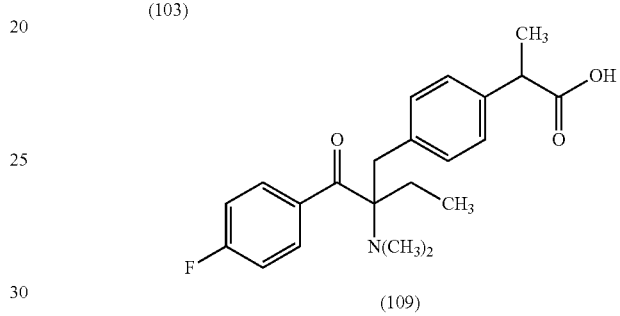

A 500-mL four-necked flask equipped with a stirrer, a thermometer and a cooling tube was loaded with 29.2 g of 2-[4-(bromomethyl)phenyl]propionic acid and 40 mL of isopropyl alcohol. While performing ice cooling, 15 mL of 8 M aqueous sodium hydroxide solution was added, and stirring was performed at the temperature for 30 minutes. 20.9 g of Intermediate (103) synthesized in SYNTHETIC EXAMPLE 1 was added. The mixture was stirred at 20° C. for 3 hours. Next, 22 mL of 8 M aqueous sodium hydroxide solution was added, and the mixture was stirred at 50° C. for 2 hours. The isopropyl alcohol was distilled off under reduced pressure, and the residual reaction mixture was adjusted to pH 5 with 6 N hydrochloric acid. The mixture was extracted with toluene. The extract was washed twice with water, and washed once with saturated brine. The organic layer was dried with magnesium sulfate for a whole day and night. The organic solvent was distilled off under reduced pressure, and the concentrated residue was purified by silica gel column chromatography. Intermediate (109) which was a yellow oil-like product was thus obtained. Weight: 24.1 g, yield: 65%.

[Chem. 62]

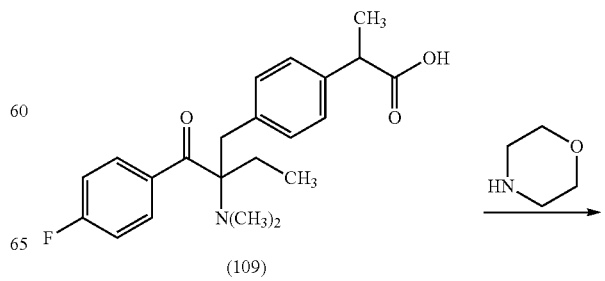

-continued

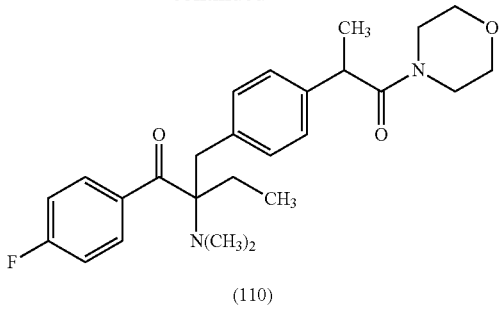

(110)

A 200-mL flask equipped with a stirrer, a thermometer and a dropping funnel was loaded with 3.71 g of Intermediate (109), 0.1 mL of N,N-dimethylformamide (DMF) and 15 mL of methylene chloride. A solution was thus prepared. Further, 1.79 g of thionyl chloride was added dropwise, and the reaction was performed for 2 hours. The reaction solution was concentrated under reduced pressure. The concentrated residue was dissolved into 30 mL of dichloromethane to give a dichloromethane solution of the acid chloride. A 300-mL flask equipped with a stirrer, a thermometer and a dropping funnel was loaded with 2 mL of morpholine and 30 mL of methylene chloride, thereby preparing a solution. The dichloromethane solution of the acid chloride was added thereto dropwise over a period of 20 minutes. Stirring was then performed for 30 minutes, and the reaction completed. The reaction was terminated by the addition of 1 M aqueous sodium hydroxide solution. The reaction liquid was transferred to a separatory funnel, and the organic layer was washed twice with water and was dried with magnesium sulfate for a whole day and night. The dichloromethane was distilled off under reduced pressure, and the residue was purified by silica gel chromatography. Intermediate (110) which was a yellow oil-like product was thus obtained. Weight: 3.65 g, yield: 83%.

[Chem. 63]

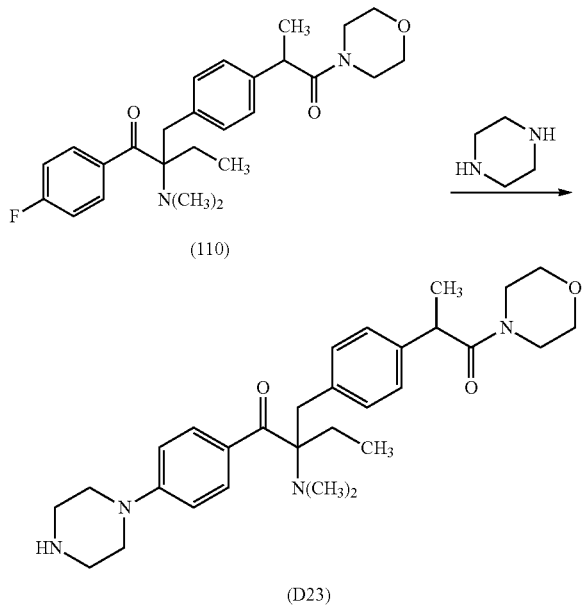

A 50-mL three-necked flask equipped with a stirrer and a thermometer was loaded with 2.20 g of Intermediate (110) and 1.29 g of anhydrous piperazine. In a nitrogen atmosphere, the mixture was heated at 120° C. for 15 hours. After the heating, distilled water was added and the reaction was terminated. Extraction was performed with dichloromethane. The extract was washed with water three times, and washed once with saturated aqueous sodium chloride solution. The organic layer was dried with magnesium sulfate for a whole day and night. The dichloromethane was distilled off under reduced pressure. Michael donor product (D23) which was a yellow oil-like product was thus obtained. Weight: 2.53 g, yield: 100%.

Synthetic Example 9: Synthesis of Compound (D24)

Michael donor product (D24) which was a yellow oil-like product was synthesized in accordance with the method described in SYNTHETIC EXAMPLE 8, except that morpholine used in SYNTHETIC EXAMPLE 8 was replaced by dioctylamine.

[Synthesis of Michael Addition Acceptors]

Hereinbelow, examples will be described which illustrate the synthesis of Michael addition acceptors having acrylate groups as Michael addition accepting sites at both terminals of a perfluoropolyether (PFPE) group.

Synthetic Example 10

A glass flask equipped with a stirrer, a thermometer, a cooling tube and a dropping device was loaded with 20 g of a hydroxyl-diterminated perfluoropolyether compound represented by the structural formula (A-1) below, 20 g of diisopropyl ether as a solvent, 0.02 g of p-methoxyphenol as a polymerization inhibitor and 3.1 g of triethylamine as a neutralizer. Under a stream of air, stirring was initiated. While maintaining the temperature in the flask at 10° C., 2.7 g of acryloyl chloride was added dropwise over a period of 1 hour. After the completion of the dropwise addition, the mixture was stirred at 10° C. for 1 hour, stirred at an elevated temperature of 30° C. for 1 hour, and stirred at an elevated temperature of 50° C. for 10 hours. After the reaction was performed in this manner, the mixture was analyzed by gas chromatography to confirm the disappearance of the acryloyl chloride. Next, 40 g of diisopropyl ether as a solvent was added, and thereafter 80 g of ion exchange water was added. The mixture was stirred and was allowed to stand. The aqueous layer that had been separated was removed. This washing was repeated three times. Next, 0.02 g of p-methoxyphenol as a polymerization inhibitor was added, and 8 g of magnesium sulfate as a desiccant was added. The mixture was allowed to stand for one day and was thereby completely dehydrated. The desiccant was then removed by filtration.

[Chem. 64]

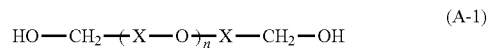

(A-1)

(In the formula, X denotes a perfluoromethylene group and a perfluoroethylene group. The average number of perfluoromethylene groups and that of perfluoroethylene groups per molecule are 7 and 8, respectively. The average number of fluorine atoms per molecule is 46. The number average molecular weight measured by GPC is 1,500.)

Next, the solvent was distilled off under reduced pressure. Thus, a Michael addition acceptor with a poly(perfluoroalkylene ether) chain represented by the following structural formula (A-2) was obtained.

[Chem. 65]

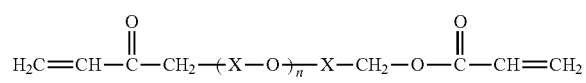

(A-2)

(In the formula, X denotes a perfluoromethylene group and a perfluoroethylene group. The average number of perfluoromethylene groups and that of perfluoroethylene groups per molecule are 7 and 8, respectively. The average number of fluorine atoms per molecule is 46.)

Synthetic Example 11

A glass flask equipped with a stirrer, a thermometer, a cooling tube and a dropping device was loaded with 55.88 g of 1,3-bis(trifluoromethyl)benzene, 50 g of a hydroxyl-diterminated perfluoropolyether compound represented by the structural formula (A-3) below, 0.022 g of p-methoxyphenol, 0.168 g of dibutylhydroxytoluene and 0.017 g of tin octylate. Under a stream of air, stirring was initiated. While maintaining the temperature at 75° C., 5.87 g of 1,1-(bisacryloyloxymethyl)ethyl isocyanate was added dropwise over a period of 1 hour. After the completion of the dropwise addition, the mixture was stirred at 75° C. for 1 hour, and stirred at an elevated temperature of 80° C. for 10 hours. The mixture was analyzed by IR spectroscopy to confirm the disappearance of the isocyanate groups.

[Chem. 66]

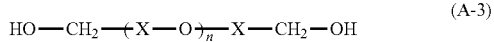

(A-3)

(In the formula, X denotes a perfluoromethylene group and a perfluoroethylene group. The average number of perfluoromethylene groups per molecule is 19, and that of perfluoroethylene groups is 19. The average number of fluorine atoms per molecule is 114.)

The organic solvent was distilled off under reduced pressure. Thus, a Michael addition acceptor with a poly(perfluoroalkylene ether) chain represented by the following structural formula (A-4) was obtained.

[Chem. 67]

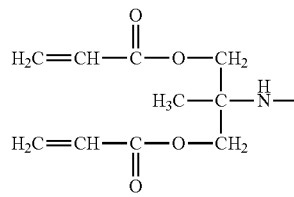

(A-4)

(In the formula, X denotes a perfluoromethylene group and a perfluoroethylene group. The average number of perfluoromethylene groups per molecule is 19, and that of perfluoroethylene groups is 19. The average number of fluorine atoms per molecule is 114.)

Synthetic Example 12

A glass flask equipped with a stirrer, a thermometer, a cooling tube and a dropping device was loaded with 53.57 g of 1,3-bis(trifluoromethyl)benzene, 50 g of a hydroxyl-monoterminated perfluoropolyether compound represented by the structural formula (A-5) below, 0.021 g of p-methoxyphenol, 0.161 g of dibutylhydroxytoluene, 0.016 g of tin octylate and 3.1 g of triethylamine as a neutralizer. Under a stream of air, stirring was initiated. While maintaining the temperature in the flask at 10° C., 1.40 g of acryloyl chloride was added dropwise over a period of 1 hour. After the completion of the dropwise addition, the mixture was stirred at 10° C. for 1 hour, stirred at an elevated temperature of 30° C. for 1 hour, and stirred at an elevated temperature of 50° C. for 10 hours. After the reaction was performed in this manner, the mixture was analyzed by gas chromatography to confirm the disappearance of the acryloyl chloride. Next, 40 g of diisopropyl ether as a solvent was added, and thereafter 80 g of ion exchange water was added. The mixture was stirred and was allowed to stand. The aqueous layer that had been separated was removed. This washing was repeated three times. Next, 0.02 g of p-methoxyphenol as a polymerization inhibitor was added, and 8 g of magnesium sulfate as a desiccant was added. The mixture was allowed to stand for one day and was thereby completely dehydrated. The desiccant was then removed by filtration.

[Chem. 68]

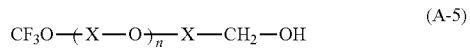

(A-5)

(In the formula, X denotes a perfluoromethylene group and a perfluoroethylene group. The average number of perfluoromethylene groups and that of perfluoroethylene groups per molecule are 18 and 21, respectively. The average number of fluorine atoms per molecule is 120.)

Next, the solvent was distilled off under reduced pressure. Thus, a Michael addition acceptor with a poly(perfluoroalkylene ether) chain represented by the following structural formula (A-6) was obtained.

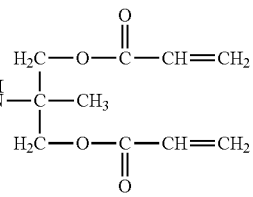

[Chem. 69]

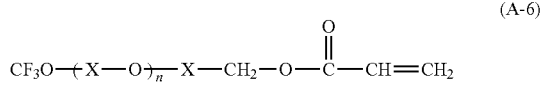
(A-6)

(In the formula, X denotes a perfluoromethylene group and a perfluoroethylene group. The average number of perfluoromethylene groups and that of perfluoroethylene groups per molecule are 18 and 21, respectively. The average number of fluorine atoms per molecule is 120.)

Synthetic Example 13

A glass flask equipped with a stirrer, a thermometer, a cooling tube and a dropping device was loaded with 53.57 g of 1,3-bis(trifluoromethyl)benzene, 50 g of a hydroxyl-monoterminated perfluoropolyether compound represented by the structural formula (A-5), 0.021 g of p-methoxyphenol, 0.161 g of dibutylhydroxytoluene and 0.016 g of tin octylate. Under a stream of air, stirring was initiated. While maintaining the temperature at 75° C., 3.57 g of 1,1-(bisacryloyloxymethyl)ethyl isocyanate was added dropwise over a period of 1 hour. After the completion of the dropwise addition, the mixture was stirred at 75° C. for 1 hour, and stirred at an elevated temperature of 80° C. for 10 hours. The mixture was analyzed by IR spectroscopy to confirm the disappearance of the isocyanate groups.

Next, the solvent was distilled off under reduced pressure. Thus, a Michael addition acceptor with a poly(perfluoroalkylene ether) chain represented by the following structural formula (A-7) was obtained.

[Chem. 70]

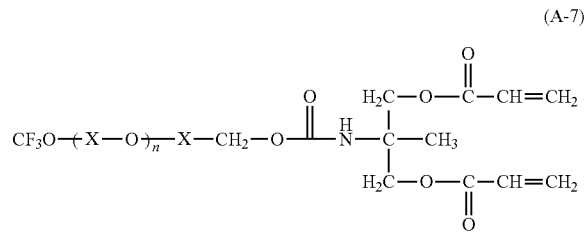
(A-7)

(In the formula, X denotes a perfluoromethylene group and a perfluoroethylene group. The average number of perfluoromethylene groups and that of perfluoroethylene groups per molecule are 18 and 21, respectively. The average number of fluorine atoms per molecule is 120.)
[Synthesis of Michael Addition Products]

Hereinbelow, examples will be described which illustrate the synthesis of Michael addition products from a Michael addition donor with an α-aminoacetophenone structure, and a Michael addition acceptor with a perfluoropolyether (PFPE) group.

Example 1

A 100-mL three-necked flask equipped with a stirrer, a condenser and a thermocouple was loaded with 15.0 g of the Michael addition acceptor (A-2) synthesized in SYNTHETIC EXAMPLE 10, 7.3 g of the Michael addition donor (D1) obtained in SYNTHETIC EXAMPLE 1, and 15 mL of acetonitrile. The mixture was stirred at room temperature for 24 hours. The reaction mixture was concentrated under reduced pressure. Thus, 22.3 g of a fluorine-containing acetophenone derivative [Compound (M1) illustrated hereinabove] of the present invention was obtained. $^1$H-NMR chart of Compound (M1) is shown in FIG. 6.

Example 2

A 100-mL three-necked flask equipped with a stirrer, a condenser and a thermocouple was loaded with 15.0 g of the Michael addition acceptor (A-2) synthesized in SYNTHETIC EXAMPLE 10, 7.6 g of the Michael addition donor (D2) obtained in SYNTHETIC EXAMPLE 2, and 15 mL of acetonitrile. The mixture was stirred at room temperature for 24 hours. The reaction mixture was concentrated under reduced pressure. Thus, 22.6 g of a fluorine-containing acetophenone derivative [Compound (M2) illustrated hereinabove] of the present invention was obtained. $^1$H-NMR chart of Compound (M2) is shown in FIG. 7.

Example 3

A 100-mL three-necked flask equipped with a stirrer, a condenser and a thermocouple was loaded with 15.0 g of the Michael addition acceptor (A-2) synthesized in SYNTHETIC EXAMPLE 10, 8.9 g of the Michael addition donor (D9) obtained in SYNTHETIC EXAMPLE 3, and 15 mL of acetonitrile. The mixture was stirred at room temperature for 24 hours. The reaction mixture was concentrated under reduced pressure. Thus, 23.9 g of a fluorine-containing acetophenone derivative [Compound (M9) illustrated hereinabove] of the present invention was obtained. $^1$H-NMR chart of Compound (M9) is shown in FIG. 8.

Example 4

A 100-mL three-necked flask equipped with a stirrer, a condenser and a thermocouple was loaded with 15.0 g of the Michael addition acceptor (A-2) synthesized in SYNTHETIC EXAMPLE 10, 7.4 g of the Michael addition donor (D16) obtained in SYNTHETIC EXAMPLE 4, and 15 mL of acetonitrile. The mixture was stirred at room temperature for 24 hours. The reaction mixture was concentrated under reduced pressure. Thus, 22.4 g of a fluorine-containing acetophenone derivative [Compound (M16) illustrated hereinabove] of the present invention was obtained.

Example 5

A 100-mL three-necked flask equipped with a stirrer, a condenser and a thermocouple was loaded with 15.0 g of the Michael addition acceptor (A-2) synthesized in SYNTHETIC EXAMPLE 10, 10.4 g of the Michael addition donor (D17) obtained in SYNTHETIC EXAMPLE 5, and 15 mL of acetonitrile. The mixture was stirred at room temperature for 24 hours. The reaction mixture was concentrated under reduced pressure. Thus, 25.4 g of a fluorine-containing acetophenone derivative [Compound (M17) illustrated hereinabove] of the present invention was obtained.

Example 6

A 100-mL three-necked flask equipped with a stirrer, a condenser and a thermocouple was loaded with 15.0 g of the Michael addition acceptor (A-2) synthesized in SYNTHETIC EXAMPLE 10, 9.6 g of the Michael addition donor (D18) obtained in SYNTHETIC EXAMPLE 6, and 15 mL of acetonitrile. The mixture was stirred at room temperature for 24 hours. The reaction mixture was concentrated under reduced pressure. Thus, 24.6 g of a fluorine-containing acetophenone derivative [Compound (M18) illustrated hereinabove] of the present invention was obtained. $^1$H-NMR chart of Compound (M18) is shown in FIG. 9.

Example 7

A 100-mL three-necked flask equipped with a stirrer, a condenser and a thermocouple was loaded with 15.0 g of the Michael addition acceptor (A-2) synthesized in SYNTHETIC EXAMPLE 10, 12.6 g of the Michael addition donor (D20) obtained in SYNTHETIC EXAMPLE 7, and 15 mL of acetonitrile. The mixture was stirred at room temperature for 24 hours. The reaction mixture was concentrated under reduced pressure. Thus, 27.6 g of a fluorine-containing acetophenone derivative [Compound (M20) illustrated hereinabove] of the present invention was obtained. $^1$H-NMR chart of Compound (M20) is shown in FIG. 10.

Example 8

A 100-mL three-necked flask equipped with a stirrer, a condenser and a thermocouple was loaded with 15.0 g of the Michael addition acceptor (A-2) synthesized in SYNTHETIC EXAMPLE 10, 10.1 g of the Michael addition donor (D23) obtained in SYNTHETIC EXAMPLE 8, and 15 mL of acetonitrile. The mixture was stirred at room temperature for 24 hours. The reaction mixture was concentrated under reduced pressure. Thus, 25.1 g of a fluorine-containing acetophenone derivative [Compound (M23) illustrated hereinabove] of the present invention was obtained.

Example 9

A 100-mL three-necked flask equipped with a stirrer, a condenser and a thermocouple was loaded with 15.0 g of the Michael addition acceptor (A-2) synthesized in SYNTHETIC EXAMPLE 10, 13.2 g of the Michael addition donor (D24) obtained in SYNTHETIC EXAMPLE 9, and 15 mL of acetonitrile. The mixture was stirred at room temperature for 24 hours. The reaction mixture was concentrated under reduced pressure. Thus, 28.2 g of a fluorine-containing acetophenone derivative [Compound (M24) illustrated hereinabove] of the present invention was obtained.

Example 10

A 300-mL three-necked flask equipped with a stirrer, a condenser and a thermocouple was loaded with 45.0 g of the Michael addition acceptor (A-4) synthesized in SYNTHETIC EXAMPLE 11, 14.6 g of the Michael addition donor (D1) obtained in SYNTHETIC EXAMPLE 1, and 100 mL of acetonitrile. The mixture was stirred at room temperature for 24 hours. The reaction mixture was concentrated under reduced pressure. Thus, 59.6 g of a fluorine-containing acetophenone derivative [Compound (M37) illustrated hereinabove] of the present invention was obtained.

Example 11

A 200-mL three-necked flask equipped with a stirrer, a condenser and a thermocouple was loaded with 15.0 g of the Michael addition acceptor (A-4) synthesized in SYNTHETIC EXAMPLE 11, 5.1 g of the Michael addition donor (D2) obtained in SYNTHETIC EXAMPLE 2, and 50 mL of acetonitrile. The mixture was stirred at room temperature for 24 hours. The reaction mixture was concentrated under reduced pressure. Thus, 20.1 g of a fluorine-containing acetophenone derivative [Compound (M38) illustrated hereinabove] of the present invention was obtained.

Example 12

A 100-mL three-necked flask equipped with a stirrer, a condenser and a thermocouple was loaded with 13.1 g of the Michael addition acceptor (A-6) synthesized in SYNTHETIC EXAMPLE 12, 1.5 g of the Michael addition donor (D1) obtained in SYNTHETIC EXAMPLE 1, and 15 mL of acetonitrile. The mixture was stirred at room temperature for 24 hours. The reaction mixture was concentrated under reduced pressure. Thus, 14.6 g of a fluorine-containing acetophenone derivative [Compound (M60) illustrated hereinabove] of the present invention was obtained.

Example 13

A 300-mL three-necked flask equipped with a stirrer, a condenser and a thermocouple was loaded with 50.0 g of the Michael addition acceptor (A-7) synthesized in SYNTHETIC EXAMPLE 13, 10.1 g of the Michael addition donor (D1) obtained in SYNTHETIC EXAMPLE 1, and 100 mL of acetonitrile. The mixture was stirred at room temperature for 24 hours. The reaction mixture was concentrated under reduced pressure. Thus, 60.1 g of a fluorine-containing acetophenone derivative [Compound (M96) illustrated hereinabove] of the present invention was obtained.

Synthetic Example 11: Synthesis of Compound (II-a) Having Poly(Perfluoroalkylene Ether) Chain and Polymerizable Unsaturated Group A glass flask equipped with a stirrer, a thermometer, a cooling tube and dropping devices was loaded with 63 g of methyl isobutyl ketone. While performing stirring under a stream of nitrogen, the temperature was increased to 105° C. Next, three kinds of dropping liquids were set into the respective dropping devices. One was 21.5 g of the diacrylate compound (A-2) with a poly(perfluoroalkylene ether) chain synthesized in SYNTHETIC EXAMPLE 10. Another was 41.3 g of 2-hydroxyethyl methacrylate. The other was 135.4 g of a radical polymerization initiator solution containing 9.4 g of t-butyl peroxy-2-ethylhexanoate and 126 g of methyl isobutyl ketone. While maintaining the temperature in the flask at 105° C., the liquids were added dropwise concurrently over a period of 2 hours. After the completion of the dropwise addition, the mixture was stirred at 105° C. for 10 hours, and the solvent was distilled off under reduced pressure. Thus, 67.5 g of Polymer (P-1) was obtained.

Next, 74.7 g of methyl ethyl ketone as a solvent, 0.1 g of p-methoxyphenol as a polymerization inhibitor and 0.06 g of dibutyltin dilaurate as a urethane-forming catalyst were fed. Stirring was initiated under a stream of air, and 44.8 g of 2-acryloyloxyethyl isocyanate was added dropwise in 1 hour while keeping the temperature at 60° C. After the completion of the dropwise addition, the mixture was stirred at 60° C. for 1 hour and was stirred at an elevated temperature of 80° C. for 10 hours. After the reaction was performed as described above, the mixture was analyzed by IR spectroscopy to confirm the disappearance of the isocyanate groups. Next, 37.4 g of methyl ethyl ketone was added. Thus, 224.6 g of methyl ethyl ketone solution was obtained which contained 50% of Resin (II-a) having a PFPE chain and a polymerizable unsaturated group. The molecular weight of Resin (II-a) having a PFPE chain and a polymerizable unsaturated group was measured by GPC (relative to polystyrenes). The measurement showed that the number average molecular weight was 2,400, the weight average molecular weight was 7,100, and the maximum molecular weight was 200,000.

Comparative Synthetic Example 1

Fluorine-containing photoinitiator (C-1) illustrated below was synthesized in accordance with EXAMPLE 12 of Japanese Unexamined Patent Application Publication (Translation of PCT Application) No. 2004-525994.

[Chem. 71]

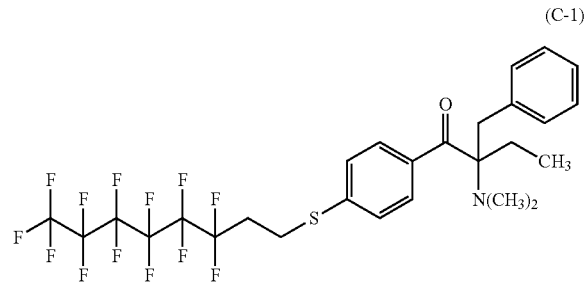

(C-1)

Comparative Synthetic Example 2

Radically polymerizable resin (C-2) having a poly(perfluoroalkylene ether) chain, a radically polymerizable unsaturated group and a photopolymerization initiating functional group in the resin structure was synthesized in accordance with EXAMPLE 1 of Japanese Unexamined Patent Application Publication No. 2011-89052.

The components described in Tables 13~15 were mixed together to give active energy ray curable compositions. The compositions were applied onto films to form a hardcoat layer, and the surface was tested to evaluate wear resistance, antifouling properties and slip properties.

The materials and abbreviations used in the preparation of the compositions are described below.

UNIDIC 17-806: Urethane acrylate resin manufactured by DIC Corporation.

Irg 184: Photopolymerization initiator 1-hydroxycyclohexyl phenyl ketone manufactured by BASF.

BYK UV 3505: UV curable silicone leveling agent manufactured by BYK.

BYK 333: Silicone leveling agent manufactured by BYK.

MEK: Methyl ethyl ketone.

Method for Forming Hardcoat Layers

The composition was applied onto a PET film (COSMOSHINE A4300 manufactured by TOYOBO Co., LTD., 188 μm) using a bar coater so that the dry coating thickness would be 5 μm. The solvent was dried at 80° C. for 1 minute. In an air atmosphere, the film was UV irradiated with use of a high-pressure mercury lamp (80 W/cm) with a cumulative dose of 200 mJ/cm$^2$, thus forming a hardcoat layer.

Method for Evaluating Wear Resistance

Reciprocating wear tester TYPE: 30S manufactured by SHINTO Scientific Co., Ltd. was used. Steel wool #0000 was attached to a 2 cm×2 cm indenter, and the indenter was reciprocated 1000 times with a load of 1 kg. The haze value of the test film before and after the testing was measured with haze meter NDH-5000 manufactured by NIPPON DENSHOKU INDUSTRIES CO., LTD. The wear resistance was evaluated based on the difference between the haze values.

Method for Evaluating Antifouling Properties

Antifouling properties were evaluated by measuring the water contact angle of the surface using contact angle measuring device PCA-1 manufactured by Kyowa Interface Science, Inc. The higher the contact angle, the higher the antifouling properties.

Method for Evaluating Slip Properties

With a surface property tester manufactured by SHINTO Scientific Co., Ltd. ("TriboGear TYPE-14" manufactured by SHINTO Scientific Co., Ltd.), the coefficient of kinetic friction was determined by performing the measurement under a load of 200 g and at a travel speed of 100 mm/min.

TABLE 13

| | Examples (Parts by mass) | | | | | | | | | |
|---|---|---|---|---|---|---|---|---|---|---|
| | 10 | 11 | 12 | 13 | 14 | 15 | 16 | 17 | 18 | 19 |
| UNIDIC 17-806 | 100 | 100 | 100 | 100 | 100 | 100 | 100 | 100 | 100 | 100 |
| Irg.184 | 4.0 | 4.0 | 4.0 | 4.0 | 4.0 | 4.0 | 4.0 | 4.0 | 4.0 | 4.0 |
| M-1 | 0.08 | 0.04 | 0.008 | 0.008 | | | | | | |
| M-2 | | | | | 0.08 | 0.008 | | | | |
| M-9 | | | | | | | 0.08 | | | |
| M-18 | | | | | | | | 0.08 | 0.08 | |
| M-20 | | | | | | | | | | 0.08 |
| (II-a) | 1.0 | 1.0 | 1.0 | | 1.0 | | 1.0 | 1.0 | | 1.0 |
| MEK | 99 | 99 | 99 | 99 | 99 | 99 | 99 | 99 | 99 | 99 |
| Coating thickness (μm) | 5 | 5 | 5 | 5 | 5 | 5 | 5 | 5 | 5 | 5 |
| ΔHaze | 0.12 | 0.13 | 0.32 | 0.90 | 0.11 | 0.85 | 0.13 | 0.85 | 1.52 | 0.53 |
| Water contact angle (°) | 111 | 108 | 106 | 107 | 110 | 108 | 109 | 104 | 102 | 104 |
| Coefficient of kinetic friction | 0.106 | 0.107 | 0.110 | 0.109 | 0.103 | 0.113 | 0.110 | 0.091 | 0.118 | 0.075 |

TABLE 14

| | Examples (Parts by mass) | | | | | |
|---|---|---|---|---|---|---|
| | 20 | 21 | 22 | 23 | 24 | 25 |
| UNIDIC 17-806 | 100 | 100 | 100 | 100 | 100 | 100 |
| Irg.184 | 4.0 | 4.0 | 4.0 | 4.0 | 4.0 | 4.0 |
| M-37 | 0.08 | 0.01 | | | | |
| M-38 | | | 0.08 | 0.08 | | |
| M-60 | | | | | 0.08 | |
| M-96 | | | | | | 0.08 |
| (II-a) | 1.0 | 1.0 | 1.0 | | 1.0 | 1.0 |
| MEK | 99 | 99 | 99 | 99 | 99 | 99 |
| Coating thickness (μm) | 5 | 5 | 5 | 5 | 5 | 5 |
| ΔHaze | 0.10 | 0.15 | 0.11 | 0.65 | 0.95 | 0.25 |
| Water contact angle (°) | 110 | 109 | 110 | 108 | 110 | 113 |
| Coefficient of kinetic friction | 0.107 | 0.109 | 0.105 | 0.123 | 0.109 | 0.121 |

TABLE 15

| | Comparative Examples (Parts by mass) | | | | | |
|---|---|---|---|---|---|---|
| | 1 | 2 | 3 | 4 | 5 | 6 |
| UNIDIC 17-806 | 100 | 100 | 100 | 100 | 100 | 100 |
| Irg.184 | 4.0 | 4.0 | 4.0 | 4.0 | 4.0 | 4.0 |
| (II-a) | 1.0 | 1.0 | | | | |
| C-1 | | | 0.08 | 0.08 | | |
| C-2 | | | | 0.16 | | |
| BYK UV3505 | | | | | 0.2 | |
| BYK333 | | | | | | 0.4 |
| MEK | 99 | 99 | 99 | 99 | 99 | 99 |
| Coating thickness (μm) | 5 | 5 | 5 | 5 | 5 | 5 |
| ΔHaze | 2.70 | 3.56 | 3.42 | 2.83 | 3.52 | 3.71 |
| Water contact angle (°) | 108 | 107 | 109 | 105 | 89 | 86 |
| Coefficient of kinetic friction | 0.207 | 0.215 | 0.209 | 0.110 | 0.101 | 0.13 |

The invention claimed is:

1. A fluorine-containing acetophenone derivative represented by the following general formula (1) or (2):

[Chem. 1]

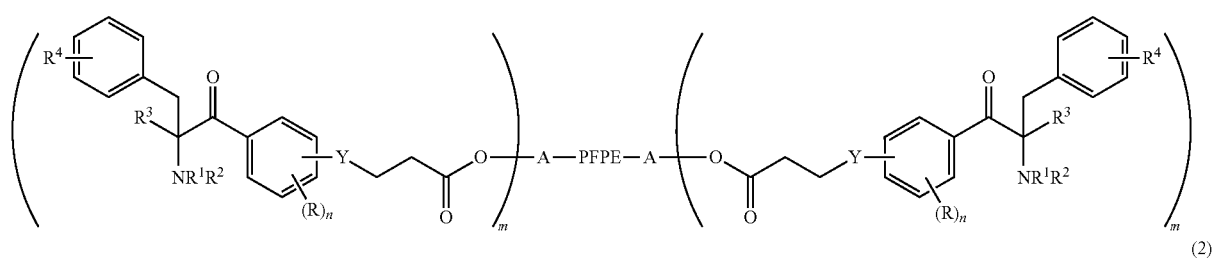

(1)

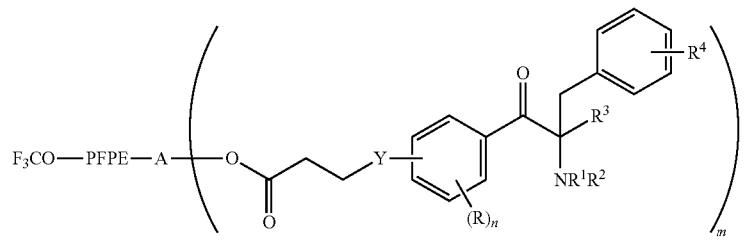

(2)

in the formulae (1) and (2), A is a direct bond or a linking group represented by any of the following formulae:

[Chem. 2]

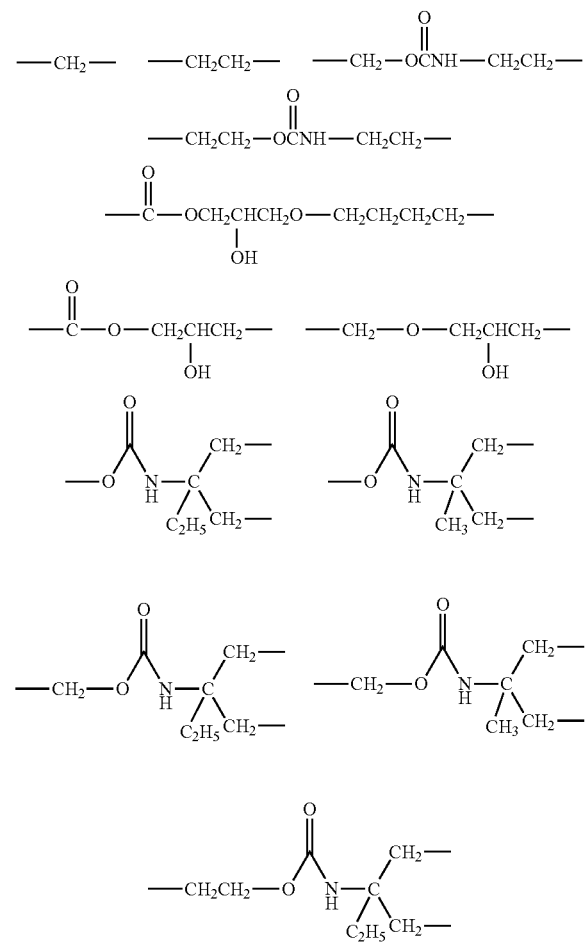

-continued

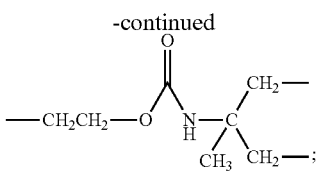

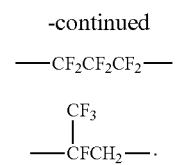

m is 1 when A is a direct bond or a divalent linking group, and is 2 when A is a trivalent linking group; Y is represented by the following general formula (3) or (4):

[Chem. 3]

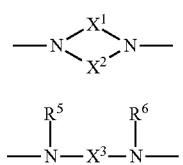 (3)

(4)

$X^1$ and $X^2$ are each independently an optionally substituted C2-C6 linear or branched alkylene group; the carbon atoms constituting $X^1$ and $X^2$ may be bonded to one another directly or via an optionally substituted C2-C6 linear or branched alkylene group; $X^3$ is an optionally substituted C2-C6 linear or branched alkylene group; and $R^5$ and $R^6$ are each independently an optionally substituted aliphatic group;

R independently at each occurrence is a hydrogen atom, a halogen atom or an optionally substituted aliphatic group; n independently at each occurrence is an integer of 0 to 4; $R^1$ and $R^2$ are each independently an optionally substituted aliphatic group; $R^1$ and $R^2$ may be bonded together to form a ring; $R^3$ is an optionally substituted aliphatic group; $R^4$ is a hydrogen atom, a halogen atom or a monovalent organic group; and PFPE is a poly(perfluoroalkylene ether) chain represented by the following structural formula 1:

[Chem. 4]

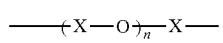 1 in the structural formula 1, X is any of the structural formulae a to f below; the structures X in the structural formula 1 may be all the same, and a plurality of structures may be arranged randomly or blockwise; and the letter n indicates the number of repeating units, and is 1 or greater

[Chem. 5]

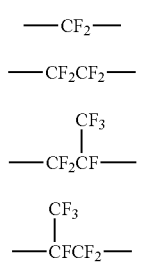

a
b
c
d

2. The fluorine-containing acetophenone derivative according to claim 1, wherein $R^4$ in the general formulae (1) and (2) is a C1-C6 alkyl group, a C1-C6 alkyloxy group, an aryl group, an aryloxy group, or an organic group represented by —$X^4$—$X^5$—$X^6$ wherein $X^4$ is a single bond or an optionally substituted C1-C6 alkylene chain, $X^5$ is a carbonyl group, a thiocarbonyl group, —OCONH—, —NHCOO— or —NHCONH—, and $X^6$ is —$NR^7R^8$ wherein $R^7$ and $R^8$ are each independently an optionally substituted aliphatic group or an optionally substituted aryl group or the following general formula (5):

[Chem. 6]

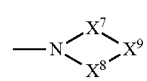 (5)

wherein $X^7$ and $X^8$ are each independently an optionally substituted C2-C6 linear or branched, alkylene or oxyalkylene group; the carbon atoms constituting $X^7$ and $X^8$ may be bonded to one another directly or via an optionally substituted C2-C6 linear or branched alkylene group; and $X^9$ is a single bond, an oxygen atom or —$NR^9$— wherein $R^9$ is an optionally substituted C2-C6 linear or branched alkyl group.

3. The fluorine-containing acetophenone derivative according to claim 1, wherein in the general formulae (1) and (2), Y is represented by the following formula (6):

[Chem. 7]

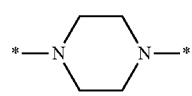 [SMILES: *N1CCN(*)CC1] (6)

R is a hydrogen atom, $R^1$ and $R^2$ are methyl groups, $R^3$ is a C1-C4 alkyl group, $R^4$ is a hydrogen atom, a methyl group, an ethyl group, a chloro group, a bromo group or any of the following formulae (7) to (9):

[Chem. 8]

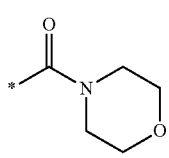 (7)

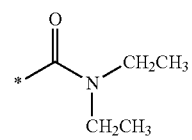 (8)

e
f

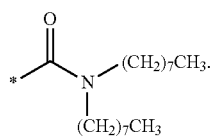
(9)

4. A fluoroadditive comprising the fluorine-containing acetophenone derivative described in claim 1, and a fluorinated surfactant other than the fluorine-containing acetophenone derivative.

5. The fluoroadditive according to claim 4, wherein the fluorinated surfactant is a compound (II) having a poly(perfluoroalkylene ether) chain and a polymerizable unsaturated group.

6. The fluoroadditive according to claim 5, wherein the compound (II) having a poly(perfluoroalkylene ether) chain and a polymerizable unsaturated group is a product of reaction of a copolymer from monomers essentially including a compound (II-1) which has a structural moiety including a poly(perfluoroalkylene ether) chain and, at both terminals thereof, a polymerizable unsaturated group, and a polymerizable unsaturated monomer (II-2) having a reactive functional group (α), with a compound (II-3) having a polymerizable unsaturated group and a reactive functional group (β) that is reactive to the reactive functional group (α).

7. The fluoroadditive according to claim 4, wherein the proportions of the fluorine-containing acetophenone derivative described as:

a fluorine-containing acetophenone derivative represented by the following general formula (1) or (2):

in the formulae (1) and (2), A is a direct bond or a linking group represented by any of the following formulae:

[Chem. 2]

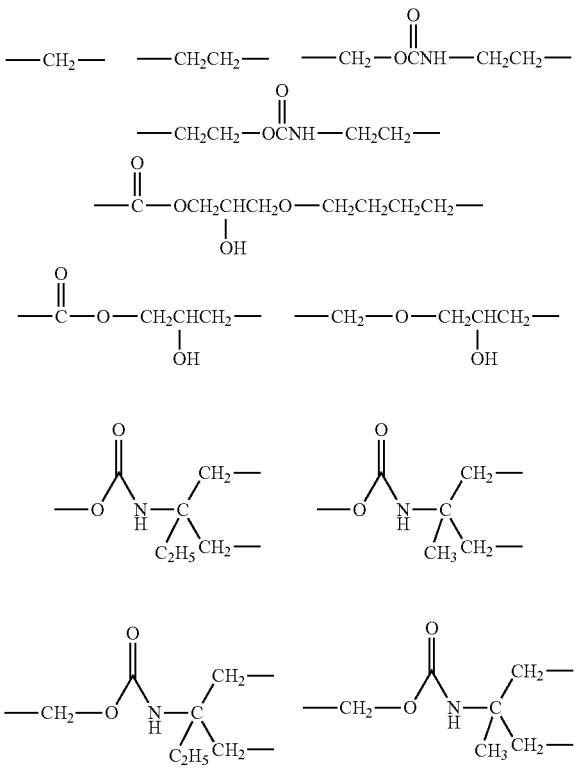

[Chem. 1]

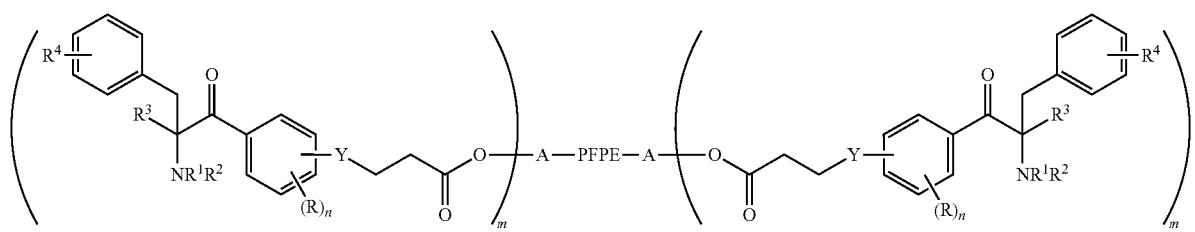

(1)

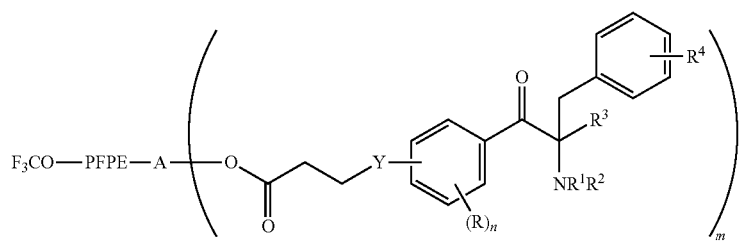

(2)

-continued

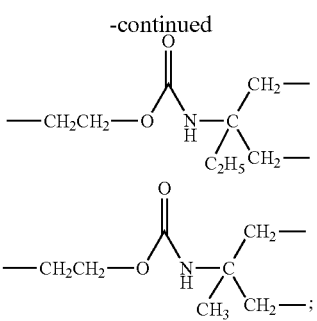

m is 1 when A is a direct bond or a divalent linking group, and is 2 when A is a trivalent linking group; Y is represented by the following general formula (3) or (4):

[Chem. 3]

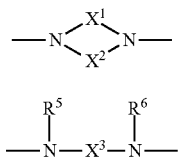

(3)

(4)

X¹ and X² are each independently an optionally substituted C2-C6 linear or branched alkylene group; the carbon atoms constituting X¹ and X² may be bonded to one another directly or via an optionally substituted C2-C6 linear or branched alkylene group; X³ is an optionally substituted C2-C6 linear or branched alkylene group; and R⁵ and R⁶ are each independently an optionally substituted aliphatic group;

R independently at each occurrence is a hydrogen atom, a halogen atom or an optionally substituted aliphatic group; n independently at each occurrence is an integer of 0 to 4; R¹ and R² are each independently an optionally substituted aliphatic group;

R¹ and R² may be bonded together to form a ring; R³ is an optionally substituted aliphatic group; R⁴ is a hydrogen atom, a halogen atom or a monovalent organic group; and PFPE is a poly(perfluoroalkylene ether) chain represented by the following structural formula 1:

[Chem. 4]

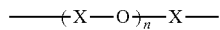

1 in the structural formula 1, X is any of the structural formulae a to f below; the structures X in the structural formula 1 may be all the same, and a plurality of structures may be arranged randomly or blockwise; and the letter n indicates the number of repeating units, and is 1 or greater,

[Chem. 5]

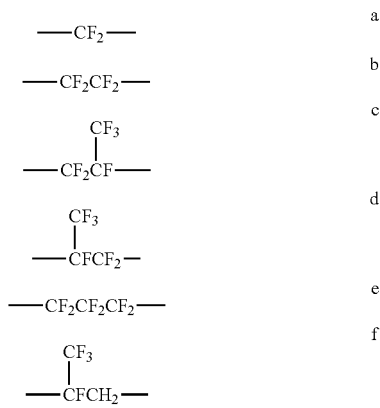

and of the fluorinated surfactant are such that the mass ratio represented by fluorine-containing acetophenone derivative/fluorinated surfactant is in the range of 1/1 to 1/1000.

8. A curable composition comprising the fluorine-containing acetophenone derivative described in claim 1.

9. A cured product of the curable composition described in claim 8.

10. An active energy ray curable composition comprising the fluoroadditive described in claim 4.

11. The active energy ray curable composition according to claim 10, further comprising a fluorine-free active energy ray curable compound.

12. A cured product of the active energy ray curable composition described in claim 10.

13. An article comprising a cured coating comprising the active energy ray curable composition described in claim 10.

14. A curable composition comprising the flourine-containing acetophenone derivative described in claim 2.

15. A curable composition comprising the flourine-containing acetophenone derivative described in claim 3.

16. A active energy ray curable composition comprising the fluoroadditive described in claim 5.

17. An active energy ray curable composition comprising the fluoroadditive described in claim 6.

18. An active energy ray curable composition comprising the fluoroadditive described in claim 7.

19. A cured product of the active energy ray curable composition described in claim 11.

20. An article comprising a cured coating comprising the active energy ray curable composition described in claim 11.

* * * * *